(12) United States Patent
Karamanos et al.

(10) Patent No.: US 10,444,771 B2
(45) Date of Patent: Oct. 15, 2019

(54) FLUID CONTROL MEASURING DEVICE

(71) Applicant: John C. Karamanos, San Jose, CA (US)

(72) Inventors: John C. Karamanos, San Jose, CA (US); Michael F. Lynn, Green Oaks, IL (US); Herbert L. Wilke, Jr., New York, NY (US)

( * ) Notice: Subject to any disclaimer, the term of this patent is extended or adjusted under 35 U.S.C. 154(b) by 701 days.

(21) Appl. No.: 14/330,941

(22) Filed: Jul. 14, 2014

(65) Prior Publication Data

US 2015/0019022 A1 Jan. 15, 2015

Related U.S. Application Data

(60) Provisional application No. 61/845,665, filed on Jul. 12, 2013, provisional application No. 61/872,576, filed on Aug. 30, 2013.

(51) Int. Cl.
*G06F 19/00* (2018.01)
*G05D 7/06* (2006.01)
(Continued)

(52) U.S. Cl.
CPC ............ *G05D 7/0647* (2013.01); *G01F 1/42* (2013.01); *G01F 15/003* (2013.01); *F24F 2110/30* (2018.01)

(58) Field of Classification Search
None
See application file for complete search history.

(56) References Cited

U.S. PATENT DOCUMENTS 2,462,182 A * 2/1949 Guerdan ................. H02K 23/60
114/20.2
3,934,851 A * 1/1976 Illing ........................ F16K 1/22
251/248

(Continued)

FOREIGN PATENT DOCUMENTS

FR 2956182 A1 * 8/2011 ............ F16K 1/221
WO 2009/121145 10/2009

OTHER PUBLICATIONS

International Search Report and Written Opinion dated Jan. 21, 2015 for PCT Application Serial No. PCT/US2014/046554, 9 pages.
(Continued)

*Primary Examiner* — Thomas C Lee
*Assistant Examiner* — Hung H Dang
(74) *Attorney, Agent, or Firm* — Amin, Turocy & Watson, LLP

(57) ABSTRACT

Systems and methods for measuring and controlling fluid flow include an orifice plate defining a variable opening. The orifice plate includes an outer assembly comprising a central opening and an inner assembly extending through the central opening. The flow device regulates high and very low volumes of fluid with precision, inexpensively, with superior acoustics, reduced energy, and simpler design. The high turndown device permits use at lower velocities, thereby reducing noise generation and eliminating need for sound-attenuating liners. The high rangeability device combines several part numbers into fewer parts, thereby streamlining product portfolios. In some cases, cost benefits associated with the flow device allow equipment to be scaled back 100:1 rather than 10:1, providing energy savings, fewer product variations, simple and more robust applications. The device meets new and old building fresh air, comfort and energy codes. The flow device can be engineered, selected, and sized without sophisticated software programs.

27 Claims, 13 Drawing Sheets

(51) Int. Cl.
    *G01F 1/42*     (2006.01)
    *G01F 15/00*    (2006.01)
    *F24F 110/30*   (2018.01)

(56) References Cited

U.S. PATENT DOCUMENTS

| | | | | |
|---|---|---|---|---|
| 4,223,832 | A * | 9/1980 | Gorchev | F24F 13/1406 236/49.5 |
| 4,836,096 | A | 6/1989 | Avery | |
| 5,307,288 | A | 4/1994 | Haines | |
| 5,458,148 | A | 10/1995 | Zelczer et al. | |
| 5,461,932 | A * | 10/1995 | Hall | G01F 1/363 138/40 |
| 5,579,993 | A | 12/1996 | Ahmed et al. | |
| 5,860,592 | A | 1/1999 | Dozier et al. | |
| 6,176,435 | B1 | 1/2001 | Nielsen | |
| 6,209,792 | B1 | 4/2001 | Boorer | |
| 6,481,463 | B1 | 11/2002 | Harms | |
| 6,527,194 | B1 | 3/2003 | Burke | |
| 6,832,951 | B2 | 12/2004 | Orendorff | |
| 7,177,776 | B2 | 2/2007 | Whitehead | |
| 7,255,012 | B2 | 8/2007 | Hedtke | |
| 7,815,327 | B2 | 10/2010 | Shamshoian | |
| 8,038,075 | B1 | 10/2011 | Walsh | |
| 8,561,738 | B2 * | 10/2013 | Charnesky | B60K 11/085 180/68.1 |
| 8,669,730 | B2 | 3/2014 | Nakajima et al. | |
| 2002/0069922 | A1 * | 6/2002 | Johnson | F16L 55/02718 138/43 |
| 2002/0179159 | A1 * | 12/2002 | Zelczer | F15B 15/1428 137/601.09 |
| 2003/0171092 | A1 | 9/2003 | Karamanos et al. | |
| 2005/0173547 | A1 * | 8/2005 | George | F24F 13/1413 236/49.3 |
| 2006/0112773 | A1 * | 6/2006 | Hedtke | F16K 3/03 73/861.61 |
| 2007/0044787 | A1 * | 3/2007 | Brice | A01K 1/0058 126/91 A |
| 2007/0262162 | A1 | 11/2007 | Karamanos | |
| 2011/0198404 | A1 | 8/2011 | Dropmann | |
| 2012/0042955 | A1 * | 2/2012 | Gierszewski | F02D 9/1055 137/1 |
| 2012/0064818 | A1 | 3/2012 | Kurelowech | |
| 2013/0068313 | A1 * | 3/2013 | George | F16K 37/0041 137/14 |
| 2016/0218807 | A1 | 7/2016 | Tran | |
| 2016/0223221 | A1 | 8/2016 | Harris | |

OTHER PUBLICATIONS

Supplementary Partial European Search Report for EP Application No. 14823799.3 dated May 3, 2017, 11 pages.
Non-Final Office Action dated Sep. 21, 2017 for U.S. Appl. No. 15/146,447, 31 pages.
Extended European Search Report for EP Application No. 14823799.3 dated Aug. 16, 2017, 11 pages.
Communication Pursuant to Rules 70(2) and 70a(2) EPC dated Sep. 1, 2017 for European Application No. 14823799.3, 1 page.
Non-Final Office Action dated Nov. 20, 2017 for U.S. Appl. No. 15/225,482, 27 pages.
Restriction Requirement dated Dec. 29, 2017 for U.S. Appl. No. 15/338,166, 9 pages.
Final Office Action dated Feb. 14, 2018 for U.S. Appl. No. 15/146,447, 32 pages.
Notice of Allowance dated Mar. 28, 2018 for U.S. Appl. No. 15/338,166, 36 pages.

* cited by examiner

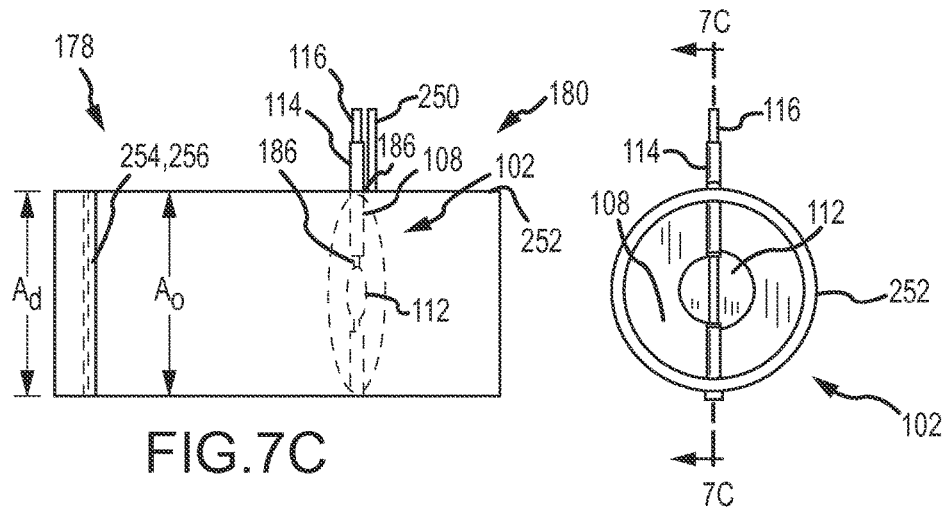
FIG.7C
FIG.7B
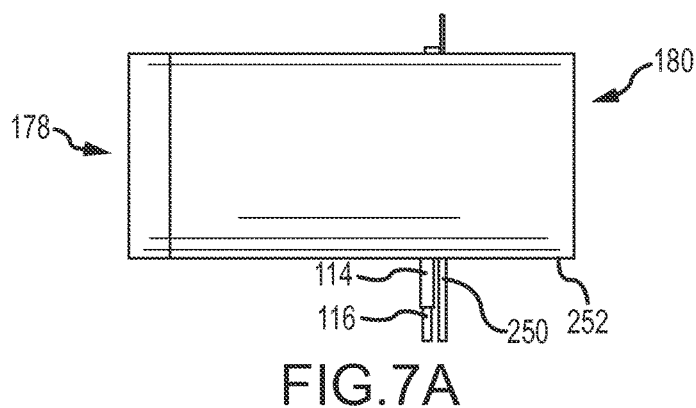
FIG.7A
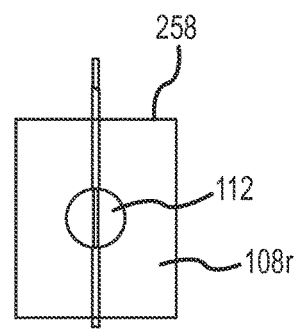
FIG.7D

FLUID CONTROL MEASURING DEVICE

CROSS-REFERENCE TO RELATED APPLICATIONS

This application claims priority to U.S. Provisional Patent Application No. 61/845,665 filed Jul. 12, 2013 and titled "LOW FLOW DAMPER" and to U.S. Provisional Patent Application No. 61/872,576 filed Aug. 30, 2013 and titled "LOW FLOW FLUID CONTROLLER". The entire contents of each of these disclosures is hereby incorporated by reference for all purposes, as if fully set forth herein.

BACKGROUND OF THE INVENTION

Measuring and regulating fluid flows, such as air or water flow, is common, but typically expensive, particularly for low fluid flows. In many cases, costs for measuring low fluid flows may be prohibitive and not commercially viable. Further, current flow measurement devices provide limited turndown ratio, typically less than 10:1, and therefore do not support accurate measuring functionality for fluid flows. For instance, typical heating, ventilation, air conditioning ("HVAC") systems do not perform with accuracy due to the high costs of measuring air flow and limited turndown. The only option is to turn them on or off. This causes the HVAC systems to consume needless amounts of energy and also hinders their purpose of providing comfort to people in a building.

There is a need for a practical way to measure fluid volumes and regulate the resulting fluid flow. Further, there is a need to do so in an economically viable manner. This disclosure is intended to address the above-noted concerns and to provide related advantages.

SUMMARY

This disclosure is generally directed to flow measurement devices, and more particularly, to a fluid flow measurement and control system.

Currently available fluid flow control mechanisms are often based on existing formulas or devices that characterize or measure fluid flow through an orifice. For example, various ducted orifice plate devices have been used to measure fluid flow for well over 100 years. Advantageously, the instant application discloses new formulas and techniques which can be implemented for use with fluid control systems and methods. For example, the instant application describes a new formula that in some applications can resolve certain contradictions observed between theory and practice dating back to the 1600's. For example, in some embodiments, the formulas and related techniques disclosed herein, including the Flow and Discharge Coefficient Equation, can be used to address contradictions, inconsistencies, and/or limitations with respect to the vena contracta and other flow phenomena in view of earlier observations, see e.g. Torricelli (1643), Newton (1713), Bernoulli (1738), Borda (1760), Weisback (1872), Kirchoff (1869), and/or Johansen (1930), as further discussed elsewhere herein.

According to some embodiments, a multi-stage damper can be used to address limitations of a standard butterfly damper, where the butterfly damper can be viewed as a variable orifice plate with projected open area $A_o = A_{duct} - A_{damper} * \cos(\theta)$. With a multi-stage damper such as a two-stage damper, the vena contracta of the inner disk can be controlled, not by the area projected normal to the duct as in the standard butterfly damper, but by the projection of the inner annulus opening $A_0$ normal of the faces of the annulus and opening disk itself.

In one embodiment, a flow device for measuring and controlling a fluid flow through a flow pathway is provided. The flow device may be incorporated in a duct of a heating, ventilation, and air conditioning (HVAC) system. The flow device may comprise an orifice plate positioned within the flow pathway and defining a variable opening for receiving flow therethrough. Further, the orifice plate may include an outer assembly comprising a central opening and an inner assembly extending through the central opening. The flow device may further have an actuator assembly operatively connected with the orifice plate.

The inner assembly may comprise a plurality of nested elements, whereby at least one of the plurality of nested elements includes an additional opening. In some embodiments, the inner assembly comprises an inner damper and the outer assembly comprises an outer damper. In another aspect, the variable opening comprises a plurality of additional openings that are arranged in parallel. In yet another aspect, at least one of the nested elements is 10 inches in diameter D and a neighboring nested element is 3.5 inches in diameter d, further wherein a ratio D:d is about 10:3.5 and scalable.

At least one of the inner and outer assemblies further comprises a plurality of additional assemblies disposed side-by-side in the flow pathway. The inner and outer assemblies may be offset to obtain enhanced flow measurement characteristics. Further, the inner assembly comprises a non-perforated plate or a perforated plate. In another aspect, at least one of the inner and outer assemblies defines a shape selected from a group consisting of a circle, triangle, diamond, trapezoid, rectangle, ellipse, sphere, half sphere, and quarter sphere.

A gasket may be disposed on the duct of the flow device and configured to compress and seal against the outer assembly. The inner and outer assemblies may overlap to define an overlap region, further wherein the overlap region includes a compressible gasket embedded on at least one of the inner and outer assemblies. Further, the flow device may include a gasket that provides a tight positive pressure seal between at least two members from the group consisting of an air valve stop, the inner assembly, and the outer assembly.

The flow device may further include a regain section defined by a tear drop nacelle defining at least a portion of the flow pathway downstream of the orifice plate, wherein the tear drop nacelle reduces losses from increased velocity venturi or Bernoulli effects imparted on the fluid flow upstream of the nacelle. In some embodiments, the flow device includes a hollow outer shaft extending from the outer assembly and an inner shaft extending from the inner assembly through the hollow outer shaft, wherein the inner and outer shafts are operatively connected with the actuator assembly. The actuator assembly may comprise a first actuator operatively coupled to the hollow outer shaft and a second actuator operatively coupled to the inner shaft. Furthermore, the first and second actuators may be collinear and ganged together to enable measurability and controllability over a wide flow range. In other embodiments, the first and second actuators are mounted in parallel or on opposite sides of the flow device.

The actuator assembly may comprise an actuator having a gearing with dual concentric output to rotate the inner and outer assemblies relative to one another, whereby the gearing comprises an inner track operatively coupled with the inner shaft and an outer track operatively coupled with the outer shaft. The actuator assembly may include an operating electro-mechanical or pneumatic mechanical device. Further, the actuator assembly may be incorporated with or into a smart device or a device having a programmable embedded controller. In a different aspect, the smart device includes an algorithm with at least one member selected from a group consisting of flow measuring, orifice metering and actuator metering element. The flow device may be a standalone flow measurement device.

Furthermore, the orifice plate increases a pressure of the fluid flow for the purpose of measuring and controlling fluid flow or mass fluid volume. The orifice plate may split the fluid flow into multiple streams for the purposes of increasing velocity pressure or recovering velocity pressure for a more accurate measurement. In some embodiments, the fluid flow measured and controlled by the flow device defines a flow velocity between about 5 feet per minute to about 3000 feet per minute.

In another embodiment, the present disclosure provides a controller in operative communication with the orifice plate. The controller comprises a processor and a memory communicatively coupled with and readable by the processor and having stored therein processor-readable instructions that, when executed by the processor, cause the processor to determine a pressure differential based on a first pressure measurement obtained by a first sensor, determine a position of the outer and inner assemblies based on a position feedback received from the actuator assembly, and regulate the variable opening based on the pressure differential the position of the outer and inner assemblies. The controller may be disposed remotely from the orifice plate and in operative communication with the orifice plate through a network connection or a building automation system (BAS).

In other aspects, the first sensor is disposed in the flow pathway upstream of the orifice plate. The pressure differential may further be based on a second pressure measurement obtained at a second sensor disposed in the flow pathway downstream of the first sensor. The second sensor may be placed behind the orifice plate in a flow wake or still air in the flow pathway. Further, at least one of the first and second sensors uses or comprises a shaft that operatively connects the outer or inner assembly with the actuator assembly. For instance, at least one of the first and second sensors may use the actuator shaft to convey pressure through a duct wall, or may incorporate the sensor opening itself into the shaft. The shaft provides at least one of an upstream or a downstream flow measuring device or sensor. In some aspects, at least one of the first and second sensors is a Pitot tube or a Pitot tube with an electronic embedded sensor transducer located upstream or a downstream side of the orifice plate. In other aspects, at least one of the first and second sensors comprises a plurality of transducers.

In some embodiments, it is contemplated that the first sensor measures a total pressure or an enlarged total pressure of the fluid flow and the second sensor measures a static pressure or a diminished representative static pressure of the fluid flow. A difference between first and second sensor measurements yields a large pressure differential that is capable of measuring smaller fluid flows of less than or equal to 25 CFM. In some aspects, the first sensor is embedded on an upstream surface of the orifice plate and the second sensor is embedded on a downstream surface of the orifice plate. Furthermore, the orifice plate comprises an inner assembly and an outer assembly surrounding the inner assembly, wherein the first sensor is embedded on an inner assembly of the orifice plate.

In another embodiment, the controller determines a magnification coefficient based on the position of the inner and outer assemblies, further wherein the magnification coefficient is determined based on a calculation or a look-up table. It is contemplated that the magnification coefficient is a non-constant coefficient. In some aspects, the look-up table comprises empirical test data. In another aspect, the controller determines a flow rate based on the pressure differential and a magnification coefficient, wherein the magnification coefficient is a square or function of a ratio of a variable opening area and a duct area. In a further aspect, the controller determines a flow rate further based on a flow coefficient that is applied at a maximum fluid flow to determine a maximum flow rate for use in calibration, further wherein the flow coefficient is a constant coefficient.

Still, in other embodiments, the controller compares the flow rate to a target flow that is based on a desired temperature setting and operates the actuator assembly to maintain or change the variable opening area defined by the inner and outer assemblies based on the comparison. The controller outputs the flow rate to a central controller at a central system that supplies the fluid flow to the flow device. The controller may further output the flow rate to at least one of a cloud-based system and a BAS building automation system, and/or the output the pressure differential to a room or local controller to manage a total flow in and out of a single room or laboratory. Still, in other aspects, the controller signals a variable frequency driver (VFD) or a motor of an air movement device to control of the air movement device. The controller operates an air flow movement device placed downstream or upstream of the orifice plate, further wherein the controller operates a motor of the air flow movement device based on the pressure differential. In some aspects, the air flow movement device comprises one or more fans. In another aspect, the controller regulates the variable opening based in part on a turndown ratio defined by a maximum volume of fluid flow through the orifice plate to a minimum volume of controllable fluid flow through the orifice plate, wherein the turndown ratio greater than 10:1. The turndown ratio, also known as a rangeability of the controller, may be greater than 100:1, and/or be a member selected from the group consisting of 25:1, 50:1, 75:1, 100:1, 125:1, 150:1, 175:1, 200:1, 225:1, 250:1, 275:1, and 300:1. In a particular aspect, the turndown ratio is between about 25:1 to about 300:1. Furthermore, the flow device is self-commissioning based on the turndown ratio.

In some embodiments, the controller is a single microelectronic controller in communication with a plurality of room sensors in a plurality of room zones to control the plurality of room zones. The controller operates the fluid device such that the HVAC system meets at least one prevailing energy code selected from a group consisting of ASHRAE Standard 55-2010, ASHRAE Standard 62.1-2010, ASHRAE Standard 90.1-2010, ASHRAE Standard 62.2-2010, ASHRAE Standard 90.1-2010, California Title 24, and CAL Green. At least one of the orifice plate and the actuator assembly are in communicative operation with another air distribution device selected from a group consisting of fan-powered devices, air handlers, chilled beams, VAV diffusers, unit ventilators, lights, fire or smoke dampers, control dampers, control valves, pumps, chillers, Direct Expansion Evaporative cooled air conditioning package units, and pre-piped hydronics. Furthermore, the flow device may be in communication or equipped with at least one ancillary component selected from a group consisting of controls, sensors, firmware, software, algorithms, air moving devices, fluid moving devices, motors, and variable frequency drives (VFDs). Even further, the flow device is in communication or equipped with additional linkages, gears or special actuators to turn additional concentric tubes, dampers, valves or rods to optimize air flow measurement performance. In yet another aspect, the flow device is configured with or as a multiple outlet plenum with two or more fluid device assemblies, wherein the multiple outlet plenum permits multiple accurate room or zone control of multiple rooms or zones simultaneously with at least member selected from a group consisting of a single self-contained BTUH generating device, a multiple thermal transfer device, an air to air HVAC system, and a fluid based system.

In other embodiments, the flow device is provided in combination with 5 to 180 degree symmetrical or flow-straightening elbows defining at least a portion of the flow pathway upstream or downstream of the orifice plate, wherein the elbows adapt the device to tight space constraints. In an alternative embodiment, a plurality of venturi valves of different sizes are ganged together to simulate multiple variable venturi flow measurement. In another aspect, the flow device includes a double-duct housing having two or more different sized inner and outer assemblies to replicate a two-stage assembly. The flow device may further be in combination with at least one thermal transfer unit installed upstream or downstream of the device where the duct is larger, thereby increasing a heat transfer surface and allowing for at least one of a member selected from a group consisting of a lower air pressure drop, a lower water pressure drop, a localized heating and cooling, a re-setting chiller, a re-setting boiler, and a reduced pump horsepower. In yet another aspect, the device is housed in or in communication with at least one member selected from a group consisting of a variable air volume (VAV) diffuser, a grill diffuser, and a linear diffuser. The VAV diffuser may be wireless or hardwired with the flow device.

In still other embodiments, the fluid flow downstream of the orifice plate is discharged directly into an ambient space of a room. The flow device may include an all-inclusive light. Still further, at least one of the all-inclusive light and an HVAC diffuser are controlled by one onboard controller. In yet another aspect, the flow device further comprises or is in communication with a built-in occupancy sensor, wherein the sensor is selected from a group consisting of an infrared sensor, a motion sensor, an ultrasonic sensor, a temperature sensor, a carbon dioxide sensor, and a humidity sensor. The flow device is in operative communication or housed in a smart self-balancing air distribution (SBAD) adjustable diffuser having a temperature sensor, further wherein the operative communication is wireless or hardwired. In some aspects, the flow device is in operative communication or housed in a smart self-balancing air distribution (SBAD) motorized diffuser.

In still further embodiments of the present disclosure, a controller is provided that is in communication with a damper assembly and configured to measure fluid flow through a flow pathway. The controller comprises a processor and a memory communicatively coupled with and readable by the processor and having stored therein processor-readable instructions that, when executed by the processor, cause the processor to determine at least one of the following: 1) a pressure differential based on a first pressure measured upstream of the damper assembly and a second pressure measured downstream of the damper assembly, wherein the damper assembly is disposed in the flow pathway; 2) a variable opening area defined by the damper assembly, wherein the variable opening area receives the fluid flow therethrough; 3) a magnification coefficient $M_F$ based on a square of, or a function of, a ratio of the variable opening area to a flow pathway area, wherein the magnification coefficient $M_F$ is $0 \geq M_F \leq 1$; and 4) a flow rate based on the pressure differential and the magnification coefficient.

It is contemplated that the processor further controls a flow velocity or feet per minute of the fluid flow while varying a flow rate or cubic feet per minute of the fluid flow throughout an entire turndown range defined by the processor. The flow rate is further based on a flow coefficient that is applied at a maximum fluid flow to determine a maximum flow rate, wherein the maximum flow rate is used for calibration purposes. The controller may further comprise a sensor for sensing the first pressure or the second pressure, wherein the sensor provides a fluid flow measurement amplification greater than 2.7 or greater than 3. The controller may comprise a sensor selected from a group consisting of an adjustable electronic transducer, a pressure sensing device, and a hot wire anemometer.

In other aspects, the controller controls the variable opening area of the damper assembly and the processor-readable instructions are programmed for optimal performance, acoustics, and energy of the controller and the controlled damper assembly. The controller may be in communication with at least one of a cloud-based control computing and wireless control components. In still other aspects, the controller is further monitored and controlled by building automation system (BAS) software of a BAS system. The controller further balances the damper assembly in real time from a front end software building automation system (BAS). Merely by way of example, the real-time balancing data is displayed at a member selected from a group comprising a front end software BAS system, a controller installed on self-contained compressor, a fluid moving device, and a room air discharge device to allow the moving device to be controlled and interface with another equipment controller.

In yet another aspect, the controller provides real-time turn down capabilities of a fluid moving device in operative communication with the damper assembly. The controller may include processor-readable instructions that further comprise an algorithm based on calculating fluid through orifices. The algorithm may be based on at least one member selected from a group consisting of an orifice metering device, a fluid sensing element, an actuator resolution, and a transducer. Furthermore, the controller automatically calculates the magnification coefficient $M_F$ based on a symmetry of the variable opening area. The magnification coefficient $M_F$ calculation is performed with a turndown ratio of 10:1 or greater. In other aspects, the controller determines the flow rate based on multiplying the magnification coefficient $M_F$ with a square root of the determined pressure differential and then calibrating to read mass fluid flows in desirable engineering units.

In still another embodiment of the present disclosure, an actuator assembly in operative communication with a damper assembly that is configured to measure and control fluid flow through a flow pathway comprises a first actuator in communication with a first gearing. The first gearing is adapted to receive at least one of a first and second shaft extending from at least one of an inner and an outer assembly of the damper assembly.

In some aspects, the first gearing comprises a dual concentric output to rotate the inner and outer assemblies. The first gearing comprises an inner track operatively coupled with the first shaft and an outer track operatively coupled with the second shaft. Furthermore, a second actuator is provided in communication with the first actuator, wherein the first actuator is operatively connected to the first shaft and the second actuator is operatively connected to the second shaft. The first and second actuators may be ganged together. At least one of the first and second actuators is in wireless communication with a controller that operates the actuator assembly. In still another aspect, the actuator assembly outputs feedback from at least one of the first and second actuators. In other embodiments, at least one of the first and second actuators is removably received on a mounting bracket that is adapted to engage an outer surface of a housing of the damper assembly.

In yet another embodiment of the present disclosure, a flow device for measuring fluid flow through a flow pathway comprises a damper assembly disposed in the flow pathway, wherein the damper assembly comprises a rotary damper plate positioned within the flow pathway and defining at least a portion of a variable opening. The flow device further comprises an actuator assembly operatively connected with the damper assembly and a controller in operative communication with the damper assembly, wherein the controller comprises a processor and a memory communicatively coupled with and readable by the processor and having stored therein processor-readable instructions that, when executed by the processor, cause the processor to determine at least one of the following: 1) a pressure differential based on a first pressure measured upstream of the damper assembly and a second pressure measured downstream of the damper assembly; 2) a variable opening area based on a position of the damper plate; 3) a magnification coefficient $M_F$ based on a function of a square of a ratio of the variable opening area to a flow pathway area, wherein the magnification coefficient $M_F$ is $0 \geq M_F \leq 1$; and 4) a flow rate based on the pressure differential and the magnification coefficient.

In some aspects, the flow pathway is defined by a housing having a hollow inner surface configured to removably receive the damper assembly and an opposing outer surface configured to removably mount the actuator assembly thereon. The housing may include a venturi valve defining a constriction section for the flow pathway. In other aspects, the housing further defines a door or plate covering an opening in the housing, wherein the opening permits access to the damper assembly in the housing for maintenance cleaning and replacement of parts.

The damper assembly may be a butterfly damper and the variable opening is defined between the damper plate and a surface defining the flow pathway. The butterfly damper includes a primary damper that is substantially circular or rectangular and the variable opening is a controllable opening that enables measurability and controllability over a wide flow range. In some aspects, the controllable opening is substantially circular or rectangular. The controllable opening may be a sliding or guillotine-type opening. Further, the primary damper may be a sliding or guillotine-type damper. In another aspect, the primary damper further includes regain fittings enabling measurability and controllability over a wide flow range. The regain fittings comprise at least one of a fairing placed upstream of the primary damper and a nacelle placed downstream of the primary damper.

The damper assembly may be a 2-stage damper assembly comprising a central opening in the damper plate and an inner rotary disk extending through the central opening to define the variable opening. The damper plate and the inner disk overlap to define an overlap region that may include a compressible gasket embedded on at least one of the damper plate and the inner disk. A plurality of damper assemblies may be provided in series or in parallel in the flow pathway and the pressure differential may be determined based on a first pressure measurement taken upstream of the damper assemblies and a second pressure measurement taken downstream of the damper assemblies. In another aspect, the controller determines a new position setting for the damper assembly based on the flow rate and signals the actuator assembly to adjust the damper assembly to the new position. The controller may output at least one of the pressure differential, the variable opening area, the magnification coefficient, and the flow rate to an external controller in communication with another controller. Further, the actuator assembly may further comprises an electro-mechanical or pneumatic mechanical device.

In yet another embodiment of the present disclosure, a method is provided for controlling fluid flow through a duct defining a cross-sectional area $A_d$. The method includes the step of providing a control element in the duct, wherein the control element defines a variable opening area $A_O$ that amplifies a velocity pressure of the fluid flow through the control element. The method further includes measuring a pressure differential $\Delta P$ across the control element, determining a magnification coefficient $M_F$ based on a square of, or a function of, a ratio of $A_O/A_d$, and determining a flow rate Q based on a product of the magnification coefficient $M_F$, the duct area $A_d$, and a square root of the pressure differential $\Delta P$. Further, the method includes comparing the flow rate Q to a predetermined target flow F. If Q=F, the method includes the step of maintaining a setting of the control element defining the variable opening area $A_O$. If Q≠F, the method includes the step of performing at least one of: 1) adjusting the setting of the control element to a new setting defining the variable opening area $A_O$; 2) notifying a central controller of a central system that supplies the fluid flow to the control element to increase or reduce the fluid flow; and 3) operating a speed of a fan disposed upstream or downstream of the control element based on the pressure differential $\Delta P$.

The method may further include the step of checking if the predetermined target flow F has changed, wherein if the target flow F has not changed and Q≠F, signaling an actuator to adjust the control element to the new setting. Further, the method comprises providing a plurality of control elements in series or in parallel in the flow pathway, measuring the pressure differential $\Delta P$ across the plurality of control elements, and determining the magnification coefficient $M_F$ based on the variable opening area $A_O$ of the control element that is furthest downstream in the plurality of control elements. Still further, the method includes enhancing or magnifying the measured pressure differential $\Delta P$ across the control element and calculating the flow rate Q based on the enhanced or magnified pressure differential $\Delta P$ along with the magnification coefficient to achieve a precise flow rate Q. In some embodiments, the control element is a thin blade control element and the pressure differential $\Delta P$ is measured across the blade to enhance readings.

In further embodiments of the present disclosure, a flow device for measuring and controlling a fluid flow through a flow pathway in a duct of a heating, ventilation, and air conditioning (HVAC) system is shown. The flow device comprises an orifice plate positioned within the flow pathway and defining a variable opening for receiving flow therethrough. The orifice plate comprises an outer assembly comprising a central opening and an inner assembly extending through the central opening. Further, the flow device includes an actuator assembly operatively connected with the orifice plate, a first sensor disposed in the flow pathway upstream of the orifice plate, and a controller in operative communication with the orifice plate. The controller comprises a processor and a memory communicatively coupled with and readable by the processor and having stored therein processor-readable instructions that, when executed by the processor, cause the processor to perform at least one of: 1) determine a pressure differential based on a first pressure measurement obtained by the first sensor; 2) determine a position of the outer and inner assemblies based on a position feedback received from the actuator assembly; and 3) regulate the variable opening based on the pressure differential the position of the outer and inner assemblies.

In yet another embodiment of the present disclosure, a central controls system for use in a heating, ventilation, and air conditioning (HVAC) system is provided. The central controls system includes a processor and a memory communicatively coupled with and readable by the processor and having stored therein processor-readable instructions that, when executed by the processor, cause the processor to receive data from a plurality of flow controllers, wherein each of the plurality of flow controllers operates a flow device positioned remotely from the central controls system. The data may comprise a pressure differential measured at each of the plurality of flow controllers, a variable opening area of a flow pathway provided by each flow device, a magnification coefficient $M_F$ based on square of a ratio of the variable opening area to a flow pathway area at each of the plurality of flow devices, wherein the magnification coefficient $M_F$ is a non-constant coefficient and $0 \geq M_F \leq 1$, and/or a flow rate based on the pressure differential and the magnification coefficient. The central controls system may further send operation parameters to each of the plurality of flow controllers independently. Such parameters may include duct static pressures for the purposes of controlling a neediest duct downstream of the flow device and/or for lowering overall system pressures to lower a fan horsepower requirement. Other operation parameters may include duct and/or zone CFM measurements for the purposes of balancing and meeting fresh air requirements. Furthermore, the central controls system may adjust a volume of a supply fluid flow to at least a portion of the plurality of flow devices based on the data received. In some embodiments, the processor is in wireless communication with the plurality of flow controllers. The data may be stored in real-time as it is collected by and sent from each of the plurality of flow controllers.

BRIEF DESCRIPTION OF THE DRAWINGS

FIG. 7A is a side view of a circular housing having the flow device of FIG. 1;

FIG. 7B is a front perspective view of FIG. 7A;

FIG. 7C is a cross-sectional view of FIG. 7B taken along line 7C-7C;

FIG. 7D is a front perspective view of a rectangular housing;

DETAILED DESCRIPTION OF THE INVENTION

Figure 1:
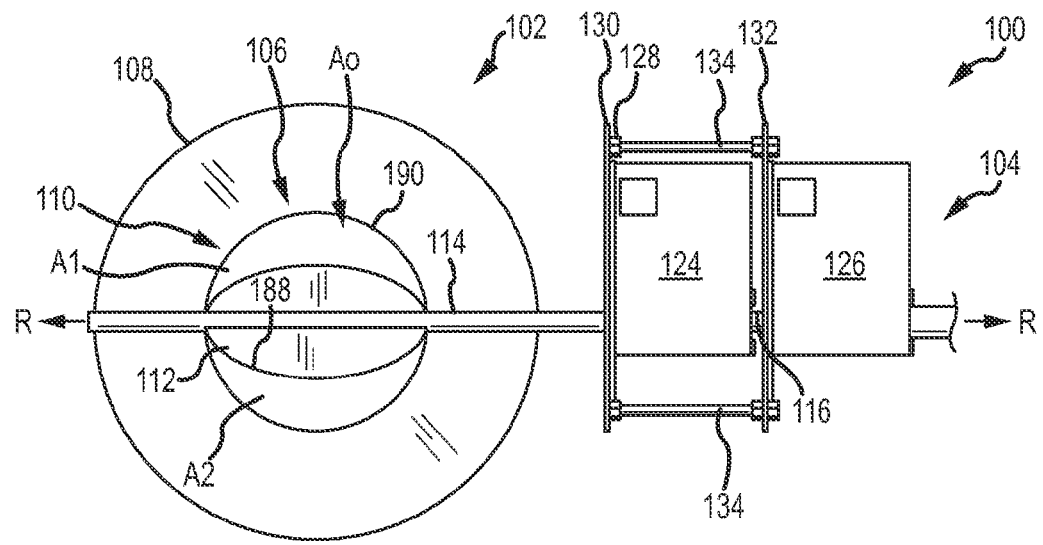
FIG. 1 is a front perspective view of a flow device according to various embodiments of the present invention.

The present disclosure describes a flow device, also referred to as a fluid control measuring device or a low flow fluid controller ("LFFC"), that offers a high turndown ratio for measuring and regulating various types of fluid flow, such as gaseous or liquid fluid flows having high or low velocity. It is noted that although the term LFFC may be used throughout the application, the flow device is applicable to a variety of fluid flows and is not limited to low flow. The LFFC can be incorporated into a duct, a self-contained heating, ventilation, and air conditioning ("HVAC") equipment, or any air or fluid discharge or distribution device. Further, the LFFC is a smart device capable of interacting with other devices through a variety of networks, including Bluetooth, WiFi, 3G, 4G, and the like.

In some embodiments, the LFFC is a circular plate-like device that includes one or more damper regulators and/or fluid control valves mounted in series and/or parallel in a flow pathway. The dampers and valves may be housed or un-housed in a tube or other geometric housing defining a portion of the flow pathway. Numerous other geometric configurations and materials for the LFFC may be utilized, as described below.

In practice, the LFFC may be implemented in conjunction with a method of control that applies the Flow and Discharge Coefficient Equation. This method provides a comprehensive orifice plate model that contributes to the high turndown ratio and facilitates the LFFC to measure or regulate very low volumes of fluid flow with precision inexpensively. Further, the LFFC offers superior acoustics by greatly reducing noise generation and eliminating the need for sound-attenuating liners such as fiberglass, double wall, armor flex, and the like. Eliminating such sound-attenuating components may reduce pressure drop of the fluid flow and contribute to energy savings.

Overview of Benefits of the LFFC

The LFFC described herein provides a practical means for measuring fluid flow, particularly low air and fluid volumes, and regulating the resulting flows. In practice, implementation of the LFFC in an HVAC building system offers building operators more options to provide fresh air to occupants, while meeting new energy standards and providing high zone controllability. The LFFC described herein simplifies current HVAC system designs. In this way, the LFFC eliminates or reduces prior needs for a plurality of device sizes in building construction. Furthermore, the LFFC allows for self-balancing and continuous commissioning of systems.

In another aspect, the high turndown ratio of the LFFC enables streamlining product portfolios by combining many product part numbers into a much smaller number of offerings, sometimes as much as 10,000 or more part numbers. In this way, the LFFC reduces manufacturing costs, engineering time, cataloguing, engineering documentation, drawings, acoustical calculations, and the like. It is further contemplated that in doing so, complex software programs are not required, thereby reducing overhead and mistakes for customers, manufacturers and sales channels. In addition, a streamlined product offering allows for more sensors, hardware, software and firmware to be installed on devices at low incremental cost, thus enhancing product technology and system integration.

In some embodiments described herein, the LFFC allows for a substantial reduction in fluid pressure of HVAC/process systems, which substantially reduces energy requirements. Furthermore, the LFFC redefines the current controls firmware/software architectures by making cloud computing of building control networks feasible and continuous commissioning of buildings applicable in an inexpensive manner. The LFFC has applications in multiple types of existing products, such as air distribution devices, air valves, fan coils, air handlers, thermal transfer devices using fluid, electric, chemical, gas, nano-fluid, process equipment as well as hybrid products that combine several existing products into one, while both encompassing mechanical systems and controls network architectures, software and firmware.

In further aspects, the LFFC may be introduced for new and retrofit construction into HVAC building equipment (commercial, residential and industrial), as well as other implementations such as burner and boiler equipment. For instance, the LFFC may be sized to those of existing valves for quick retrofit into existing installations. In another aspect, the LFFC may entail only two or three LFFC sizes for a new construction.

The LFFC is also applicable in residential settings, oil refineries, industrial, pharmaceutical, and process markets, and may be utilized for air and water, with direct expansion into hybrid electric reheat or other types of thermal conductivity, including nuclear, chemical and electrical. In a particular aspect, the LFFC may be incorporated into central systems and zone systems of building HVAC equipment. Central systems equipment tend to be large, while zone systems equipment tend to be located at the room level and sold in larger quantities. It is contemplated that the LFFC may replace or displace existing variable air volume ("VAV") terminal control boxes in zone systems, which are ubiquitous throughout buildings today. The LFFC may also be used on large systems, including air handlers/package rooftop units and other ancillary products in a HVAC system in a building. Even further, the LFFC can be used in fluid-based systems, such as variable refrigerant systems, chilled beams and in under floor applications and/or hybrid systems. In addition, the LFFC facilitates hybrid systems utilizing water and gas to become more feasible, including facilitating the use of nano-fluids and heat pipes in low static pressure systems.

Merely by way of example, the LFFC can be incorporated into under floor design and chilled beams to accurately measure or control primary air into the child beams. This optimizes the heat coefficient of chilled water coils commensurate with system requirements, occupant comfort, and zone performance. The LFFC can also be used on a device that heats or cools with a single controller, maintaining a set point within several separate zones simultaneously. In this way, chilled beams can be replaced altogether. Furthermore, doing so may replace fan-powered boxes and fan coils or small AHUs. In another aspect, the LFFC can be coupled with next-generation, smart "Lego" systems, thereby reducing installation costs by about 50% and utilizing energy savings of local water-based or refrigerant-based heating and cooling.

In another example, the LFFC can be used in fan coils and small AHUs. Fan coils utilize high pressure drops through the coils, filters, and the like, due to their compact foot print. Incorporation of the LFFC allows for mixing and matching of ancillary components in various geometric shapes and sizes. This may reduce space requirements, pressure drops, and deliver superior occupant comfort to various zones simultaneously, exactly per each zone's set point. Even further, product portfolios may be streamlined since the same portfolio may be applied to multiple vertical channels. In another aspect, the LFFC may provide a new device that replaces horizontal fan coils.

In still another example, the LFFC can provide new dampers, since the LFFC has lower pressure drops and improved air flow measurement at substantially less cost than existing damper technology. It is contemplated that various streamlined damper designs can be used with the LFFC to permit the LFFC to support various applications, such as packaged rooftop units, variable refrigerant flow ("VRF") applications, air handling units ("AHUs"), and the like. The LFFC can also be used on economizers and/or high humidity applications. Further, the LFFC can be incorporated in smart self-balancing air distribution ("SBAD") devices, which may use wireless technology and communicate directly with an equipment controller. Incorporation of the LFFC in SBAD devices can also yield pressure independent, pressure dependent, or hybrid devices. In yet another example, the LFFC may be incorporated residential markets with multiple outlet plenum designs to feed multiple zones and reduce equipment load requirements.

The high turndown LFFC makes it possible to more precisely measure air and water volumes to guarantee compliance with fresh air standards, while not breaking the energy bank. The key to improved LFFC operation is a high turndown ratio. Merely by way of example, current devices operate with 10-1 turndown ratio. The LFFC, by design and/or unlocking software code related to the functionality of the LFFC, can operate with a turndown ratio that can be increased to 100-1 or 200-1, or even high. Reliable low flow data from the terminals allows central fans and pumps to be controlled by supply requirements at the neediest terminal device rather than by the energetically wasteful fixed pressure in the supply duct. Dissipation of excess pressure is responsible for excessive noise generation in the terminal devices. Moreover, a higher turndown ratio results in a streamlined product portfolio and/or a consolidation of several product portfolios into one. This results in reduced manufacturing costs, installation costs and lower life cycle costs for the building.

Merely by way of example, the high turndown ratio allows the LFFC to be shipped more easily at an earlier timeframe to the job site. The high turndown allows for one part number which allows for shipping the product earlier and decreasing the time to completion of a building. According to some embodiments, the LFFC can provide a single approach that is universally applicable for many HVAC designs, rather than having one design for each operating range. In today's fast-paced construction business, shipment lead times are a major factor into the construction cycle planning and timing. By reducing the number of product variations and/or making one product cover a much larger dynamic operating range, building architects and engineers are freed up to focus on the overall project and the details of the design. Incorporation of the LFFC allows for phasing of shipments later in the construction cycle without having to deal with difficulties about whether the air moving and/or water controlling equipment will still work after all the last minute changes are made by the building owner.

In another example, the high turndown LFFC allows the LFFC and any ancillary components to have lower pressure drops, which further reduces fan horsepower and energy consumption. In practice, this may aid in achieving optimized performance of variable frequency drives ("VFDs"). The LFFC further facilitates lower condenser water temperature, which lends to energy savings utilizing condensing boilers, heat recovery etc. In another aspect, the LFFC allows for hot reheat temperatures to be reduced to 95-105° F. (37-40° C.) with higher delta temperatures and reduced GPM (gallons per minute) or LPM (liters per minute). In that case, pump horsepower may be reduced and efficient utilization of heat recovery, heat pump chillers, condensing boilers and optimum zone controllability may be realized. In yet a further aspect, the LFFC provides high turndown and accurate flow measurement for localized chilled water coil optimization design or performance.

It is noted that the LFFC air valve or damper described herein can be built/designed in countless geometric shapes/sizes, various materials, with several air flow sensors and actuators. The dampers can be installed in various geometric angles and various damper assemblies and linkages. The devices can be designed and manufactured with innumerable turndown ratios and numerous actuator/controls options. Furthermore, there are several variations of damper designs, such as designs more conducive for stand-alone dampers and equipment such as large air handlers and packaged roof top units.

In this way, it is contemplated that the LFFC disclosed herein provides at least the following: 1) Measurement and regulation of high and very low volumes of air and/or fluid flows with precision, inexpensively and with superior acoustics and less energy; 2) A high turndown device that permits use at lower velocities, greatly reducing noise generation and eliminating the need for sound-attenuating liners such as fiberglass and double walls; 3) A high rangeability device that allows streamlining product portfolios by combining several product part numbers into much smaller number of offerings; 4) An inexpensive device that allows equipment to be scaled back 100-1 or higher, rather than 10-1, which leads to energy savings, fewer product variations simpler and more robust application designs; 5) A device that provides better fluid, air volume and water temperature control, while conserving more energy, employing a fundamentally simpler design and meeting all new and old building fresh air, comfort and energy codes; and 6) A device that can be engineered, selected, and sized without sophisticated software programs.

Components of the LFFC

Turning now to FIG. 1, one embodiment of a flow device or LFFC 100 is illustrated. In general, the LFFC 100 comprises a damper assembly 102 operatively connected with an actuator assembly 104 through one or more rotating shafts. The damper assembly 102 is adapted to be positioned within a fluid flow pathway of a duct. The damper assembly 102 functions as an orifice plate that defines a variable opening 106 for receiving fluid flow therethrough to measure and control various types of air, gaseous, and liquid fluid flow. In a particular aspect, the damper assembly 102 permits measurement and control of very low flow that are not measurable or controllable by conventional technology. Merely by way of example, such flows may be 11 cubic feet per minute (CFM) or lower. Further, the LFFC 100 may be a standalone device for measuring and controlling fluid flow.

As shown in FIG. 1, the damper assembly 102 is a two-stage assembly that includes an outer damper 108 having a central opening 110 and an inner damper 112 extending through the central opening 110. The outer and inner dampers 108,112 are generally thin, flat rotary plates that rotate relative to each other about a common rotational axis R to vary an opening size, or a variable opening area $A_o$, of the variable opening 106. In particular, the damper assembly 102 defines the variable opening area $A_o$ by the position of the outer and inner dampers 108,112 relative to one another. Such positioning may include different angles or offset distances defined between the dampers 108,112. In this way, the variable opening area $A_o$ may be a summation of one or more holes in the damper assembly 102 where fluid flows through. For instance, FIG. 1 shows two passageways $A_1$ and $A_2$ defined by the damper assembly 102 that contribute to the total variable opening area $A_o$. In another aspect, the variable opening 106 comprises a plurality of additional openings that are arranged in parallel.

Rotation of the damper assembly 102 is driven by the actuator assembly 104 through one or more shafts. In the embodiment of FIG. 1, two rotating shafts are provided with one shaft corresponding to each of the two dampers 108, 112. A hollow outer shaft 114 extends from the outer damper 108 along the rotational axis R to the actuator assembly 112. An inner shaft 116 extends from the inner damper 112 and through the hollow outer shaft 114 along the same rotational axis R. The inner shaft 116 may be solid or hollow and in operative communication with the actuator assembly 112. The outer and inner shafts 114,116 are driven by the actuator assembly 104 to rotate relative to one another to alter the variable opening area $A_d$ for measurement and control of various types of fluid flow. It is contemplated that the damper assembly 102 and/or shafts 114, 116 can be formed from a variety of materials, including carbon fiber, 316 steel, injection molded elements, and other materials or combinations thereof. The dampers 108, 112 can be sized according to a size of the flow pathway or cross-sectional duct area $A_d$ defining the flow pathway. In one aspect, the inner damper 112 is sized corresponding to the central opening 110 of the outer damper 108. Merely by way of example, the outer damper 108 is about 10 inches in diameter and the nested inner damper is about 3.5 inches in diameter.

Figure 2A:
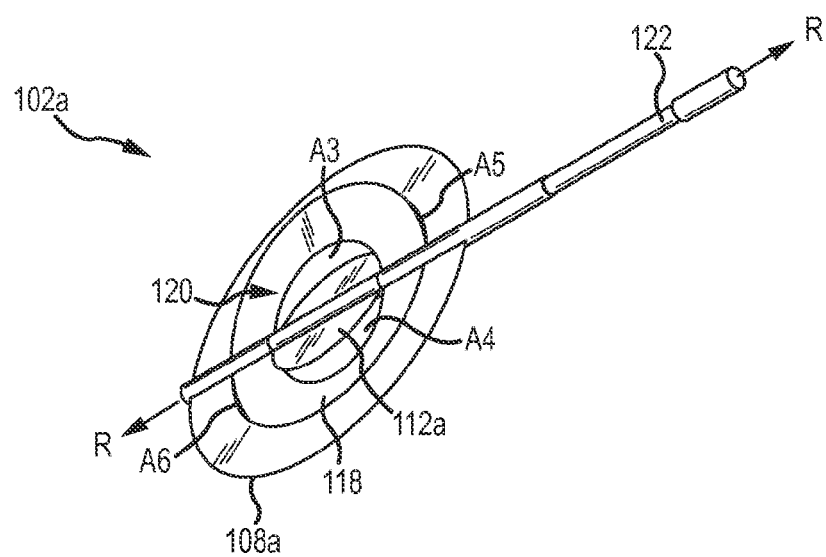
FIG. 2A is a side perspective view of a damper assembly having a plurality of nested dampers.

As shown in FIG. 1, the outer damper 108 is circular or ring-shaped and the inner damper 112 is a circular, non-perforated solid disk. The outer and inner dampers 108,112 are nested together. It is noted that other geometric forms and configurations can be provided, as illustrated in FIGS. 2A-D. For instance, FIG. 2A illustrates a three-stage damper assembly 102a comprising an outer damper 108a, an inner damper 112a, and an intermediary damper 118 nested therebetween. The three dampers 108a,112a,118 rotate relative to one another and/or independently, and/or are driven independently, about the common rotational axis R. The intermediary damper 118 is ring-shaped in similar fashion to the outer damper 108 such that the intermediary damper 118 defines an additional opening 120 that receives the inner damper 112a therethrough. It is contemplated that any of the dampers 108a,112a,118 can be provided and in any geometric shape. Single-stage, four-stage, five-stage, and n-stage damper assemblies can be contemplated. Selection of the number and shapes may be dependent on optimization of the damper assembly 102a in controlling a particular type of fluid flow.

Further, it is contemplated that any number of damper plates may be provided in a nested assembly as shown in FIGS. 1 and 2A or offset from each other such that the additional dampers are arranged side-by-side down the flow pathway. For instance, the damper assembly 102a may include an inner damper comprising a plurality of nested dampers, wherein at least one of the plurality of nested dampers comprises an additional opening. In another aspect, the damper assembly 102a may define an offset distance between one or more neighboring dampers through the flow pathway. It is contemplated that each of the plurality of dampers is operatively connected to a shaft that further connects to an actuator assembly, such as the actuator assembly 104 in FIG. 1. The shafts may comprise hollow and solid shafts nested concentrically to form a shaft assembly 122, as generally indicated in FIG. 2A. In this way, each of the plurality of dampers can rotate relative to one another. In another aspect, the total variable opening area A is defined by a total area of holes in the damper assembly 102a where fluid flows through. As shown in FIG. 2A, the total variable opening area $A_o$ includes four passageways $A_3$, $A_4$, $A_5$, and $A_6$.

Figure 2B:
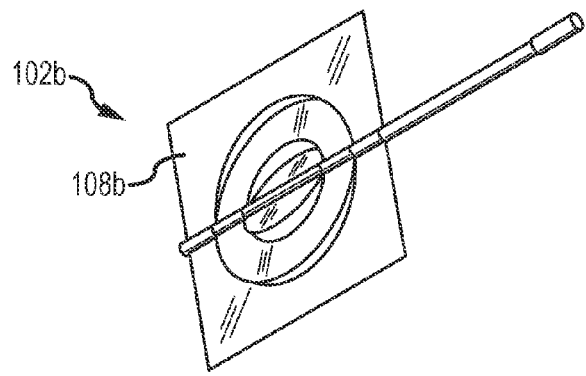
FIG. 2B is a side perspective view of a damper assembly having a rectangular outer damper and a plurality of nested dampers.
Figure 2C:
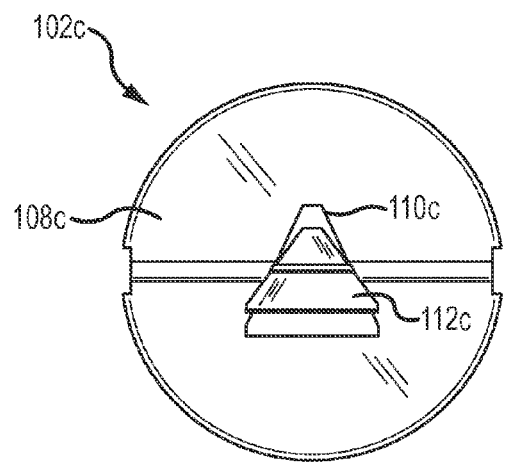
FIG. 2C is a front view of a damper assembly having different geometric form.
Figure 2D:
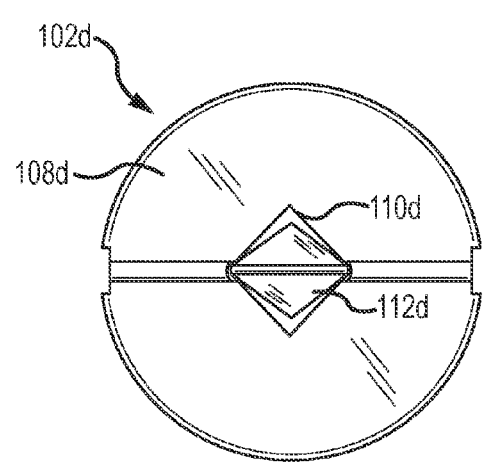
FIG. 2D is a front perspective view of a damper assembly having another geometric form.

FIG. 2B illustrates a damper assembly 102b that is similar to the three-stage damper assembly 102a, but with a rectangular outer damper 108b. The outer damper 108b may be formed in any shape. In an exemplary embodiment, the outer damper 108b is shaped corresponding to a shape of a flow pathway defined by the duct or housing surrounding the outer damper 108b. Merely by way of example, as further shown in FIGS. 2C-D, various other geometric shapes may be contemplated. FIG. 2C illustrates an outer damper 108c having a central opening 110c that is triangular or trapezoidal in shape. An inner damper 112c is defines a corresponding triangular or trapezoidal shape. FIG. 2D illustrates an outer damper 108d having a central opening 110d that is diamond-shaped and an inner damper 112d that is correspondingly diamond-shaped. Any of the inner, intermediate, and outer dampers can define any combination of shapes, such as shapes that are generally circle, triangle, diamond, trapezoid, rectangle, ellipsis, and dough-nut shaped. In another aspect, the dampers may be symmetrical, non-symmetrical, and/or irregular-shaped.

Figure 2E:
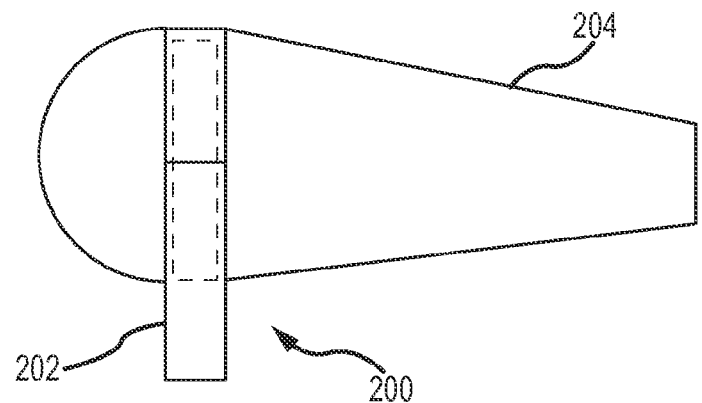
FIG. 2E is a cross-sectional view of a guillotine-damper assembly in a regain nacelle, according to some embodiments of the present disclosure.

Still, in another aspect, the damper assembly 102 is a butterfly damper nested within another butterfly damper (the inner damper 112 nested within the outer damper 108). The variable opening 106 is defined between the outer damper 108 and a surface defining the flow pathway, as well as between the butterfly dampers. The variable opening is a controllable opening that enables measurability and controllability over a wide flow range. It is contemplated that the controllable opening is substantially circular or rectangular. In still another aspect, the controllable opening is a sliding or guillotine-type opening. For instance, the primary damper is a sliding or guillotine-type damper 200. As shown in FIG. 2E, the guillotine-damper 200 may include a plurality of long, symmetrical parallel wings 204 with slots to accommodate the solid strips 202 in a movable flat plate containing many long narrow parallel slots. The plate slides so that the solid strips 202 are inside the wings (or regain nacelles) in a fully open position, and almost fully out sealing the paths in fully closed position.

In another embodiment of the guillotine-type damper, upstream half-cylinders 206 may be attached to, or integral with, a movable plate, such that the half cylinders slide. In another embodiment, it is contemplated that quarter-cylinders at the walls do not slide.

Turning back to FIG. 1, the actuator assembly 104 is shown comprising a first actuator 124 and a second actuator 126. The first and second actuators 124,126 are ganged together, collinearly, by a stacking bracket 128 comprising first and second shelves 130,132 secured together by four rods 134, whereby each shelf 130,132 is adapted to receive each actuator 124,126. The actuators 124,126 may be removed from the stacking bracket 128. In another embodiment, the actuators 124,126 are not ganged together or collinear and are arranged separately. It is contemplated that any number of actuators and/or corresponding number of shelves can be provided for the LFFC 100 and/or the stacking bracket 128. In some embodiments, one actuator is provided for each damper of the damper assembly to rotate the dampers independently. For instance, the first actuator 124 may be operatively coupled to the hollow outer shaft 114 and the second actuator 126 may be coupled with the inner shaft 116.

Figure 3A:
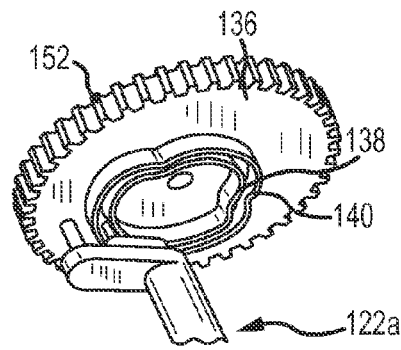
FIG. 3A is an angled view of a single gear for a one piece actuator that drives two damper shafts according to various embodiments of the present invention.
Figure 3B:
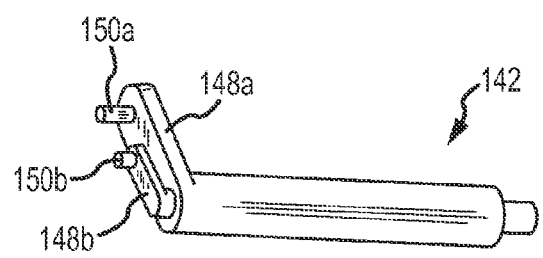
FIG. 3B is an angled view of the two damper shafts of FIG. 3A.
Figure 4:
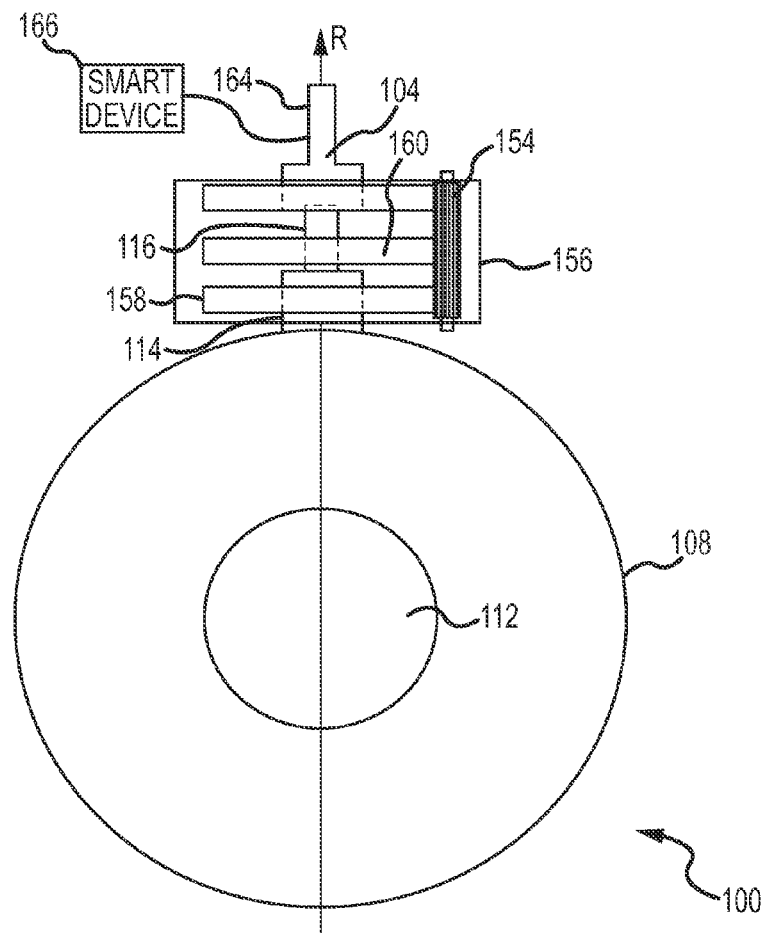
FIG. 4 is a schematic diagram of a damper assembly attached to a gear box and actuator according to various embodiments of the present invention.

Turning now to FIG. 3A, in some embodiments, the actuator assembly 104 comprises a single actuator in communication with a single gear 136 that provides dual concentric output to rotate the outer and inner dampers 108,112 relative to one another. In this case, the single gear 136 defines an inner track 138 for coupling with the inner shaft 116 and an outer track 140 operatively coupled with the outer shaft 114. More particularly, FIG. 3B shows a shaft assembly 142 for use with the single gear 136. The shaft assembly 142 comprises a hollow outer shaft 144 with a solid inner shaft 146 extending therethrough. A perpendicular leg 148a and peg 150a extends from the outer shaft 144 at an end of the shaft assembly 142 that is distal from the dampers 108,112. Similarly, a perpendicular leg and peg 148b,150b extends from the inner shaft 146. The pegs 150a,b are adapted to trace along the outer and inner tracks 140,138, respectively, upon rotation of the single gear 136 by the attached actuator of the actuator assembly 104. As shown in FIG. 3A, the single gear 136 includes a toothed edge 152 that interacts directly with the actuator and/or with the actuator through a pinion gear 154, as shown in FIG. 4. In this way, the actuator assembly 104 provides cam followers to drive the concentric shafts 144,146 from the single actuator.

Referring to the schematic diagram in FIG. 4, the outer and inner dampers 108,112 are attached to a gearbox 156 driven by the actuator assembly 104, which may comprise one or more actuators. The gearbox 156 can contain any number of gears to impart appropriate rotation to the damper assembly 102. In a particular embodiment shown in FIG. 4, the gearbox 156 includes the pinion gear 154, an outer damper gear 158 that is adapted to receive the outer shaft 114 connected to the outer damper 108, an inner damper gear 160 adapted to receive the inner shaft 116 of the inner damper 112, and an actuator gear 162. It is contemplated that the actuator assembly 104 is adapted to receive a distal end of the inner shaft 116 to drive the inner damper 112. It is further contemplated that the actuator assembly 104 drives the pinion gear 154 which in turn rotates the outer damper gear 158 connected to the outer shaft 114, and subsequently the outer damper 108. In this way, the outer and inner dampers 108,112 can be rotated along the rotational axis R relative to one another by a single actuator of the actuator assembly 104.

In a different aspect, the gearbox 156 may incorporate compound, nonconcentric driving and driven gears that may allow stationary and rotating gears to coexist simultaneously. In a particular aspect, the compound gear may include a partially-toothed gear that is ganged with a partial disk that locks a concave surface ganged with the driven, partially-toothed gear to prevent rotation while other shafts/gears are rotating. In an exemplary embodiment, the driving shaft may rotate 360 degrees per 90 degree rotations of the driven shafts, with the nonrotating shaft is held fixed at each driving stage. The compound driven gears may have twice a diameter of the compound driving gears. Further, clutches and brakes may be used alternatively or additionally to the partially-toothed gears.

Still referring to FIG. 4, in yet another embodiment, the actuator assembly 104, the gearbox 156, the damper assembly 102, and/or the LFFC 100 in general, is in operative communication with ancillary devices 164, such as an electro-mechanical or pneumatic device. Merely by way of example, LFFC 100 system or components is in communicative operation with another air distribution device. Such devices may be fan-powered devices, air handlers, chilled beams, VAV diffusers, unit ventilators, lights, fire or smoke dampers, control dampers, and pre-piped hydronics. Even further, ancillary devices 164 may comprise other controls, sensors, firmware, software, algorithms, air moving devices, fluid moving devices, motors, and variable frequency drives ("VFDs"). Still further, the LFFC 100 may be in communication or equipped with additional linkages, gears or special actuators to turn additional concentric tubes, dampers, valves or rods to optimize air flow measurement performance. The LFFC 100 may further be in combination with at least one thermal transfer unit installed upstream of the device where the duct may be larger in a cross-sectional direction, thereby increasing a heat transfer surface and allowing for at least one of a member selected from a group consisting of a lower air pressure drop, a lower water pressure drop, a localized heating and cooling, a re-setting chiller, a re-setting boiler, and a reduced pump horsepower.

Still referring to FIG. 4, in a different aspect, the LFFC 100 may be further equipped or in communication with an ancillary device 164 that is a built-in occupancy sensor, wherein the sensor is selected from a group consisting of an infrared sensor, a motion sensor, an ultrasonic sensor, a temperature sensor, and a humidity sensor. The built-in occupancy sensor may detect if a room is occupied by persons, pets, activity, and the like, to adjust an a flow of air thereto. For instance, if the room is detected as vacant, the LFFC 100 may not permit airflow to the room.

In still another embodiment, the actuator assembly 104 is further incorporated or in communication with a smart device 166 that may be local or remote from the actuator assembly 104. The communication may be a wireless communication with a remote controller that operates the actuator assembly 104. In another aspect, the smart device 166 includes an algorithm for flow measuring, orifice metering and/or actuator metering, and further controls the actuator assembly 104 depending on results obtained by the algorithm(s). In still another aspect, it is contemplated that the actuator assembly 104 outputs feedback, such as position feedback, from at least one of the first and second actuators 124,126 to a controller.

Figure 5A:
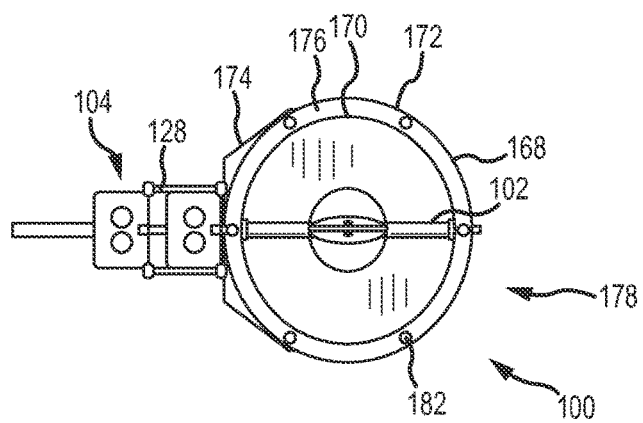
FIG. 5A is a front perspective view of the flow device of FIG. 1 within a housing.
Figures 5B, 5C:
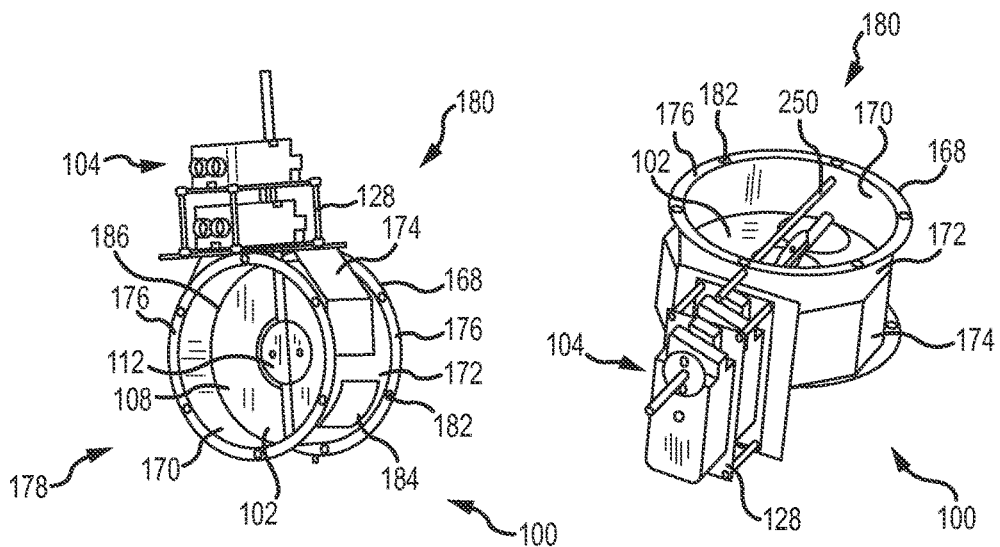
FIG. 5B is a front angled view of FIG. 5A.
FIG. 5C is a back angled view of FIG. 5A.

Turning now to FIGS. 5A-C, the LFFC 100 is shown mounted to a housing 168. The housing 168 may be any shape, such as cylindrical as shown, tubular, rectangular, and so on. 1. In a particular aspect, the flow pathway is defined by a hollow inner surface 170 configured to removably receive the damper assembly 102 therein and an opposing outer surface 172 configured to removably mount the actuator assembly 104 thereon. More particularly, the actuator assembly 104 and/or the stacking bracket 128 is removably secured to a mounting bracket 174 that removably engages the outer surface 172 of the housing 168. The mounting bracket 174 may be configured to wrap around a portion of the housing 168. In this way, the mounting bracket 174 may be shaped to the geometric form and measurements of the housing 168.

As further shown in FIGS. 5A-C, the housing 168 may include mounting flanges 176 at an upstream end 178 and/or a downstream end 180. The mounting flanges 176 may have a plurality of holes 182 for receiving a securing mechanism, e.g. screw, that further secures the housing 168 to a duct, such as a duct of an HVAC system. In that case, the fluid flow downstream of the damper assembly 102 or orifice plate may be discharged directly into an ambient space of a room. In another aspect, the housing 168 includes a door or plate 184 as shown in FIG. 5B. The door 184 covers an opening in the housing to permit permits access to the damper assembly 102 for maintenance, cleaning, and replacement of parts.

As shown in FIG. 5B, the inner surface 170 defining the flow pathway duct through the housing 168 may include a gasket 186, such as a ring-like compressible seal configured to compress and seal against the outer damper 108. Alternatively or additionally, the gasket 186 can be embedded on at least one of the outer and inner dampers 108,112, such as in a region where the inner and outer dampers overlap, or an outer peripheral edge of the outer damper 108. In reference back to FIG. 1, the overlap region may include an outer periphery 188 of the inner damper 112 and an edge of the outer damper 108 defining the central opening 110. In yet another embodiment, the gasket 186 may be provided on an air valve stop, such as a metal ring above an open damper area that provides a tight positive pressure seal when the damper is fully shut.

Figure 2F:
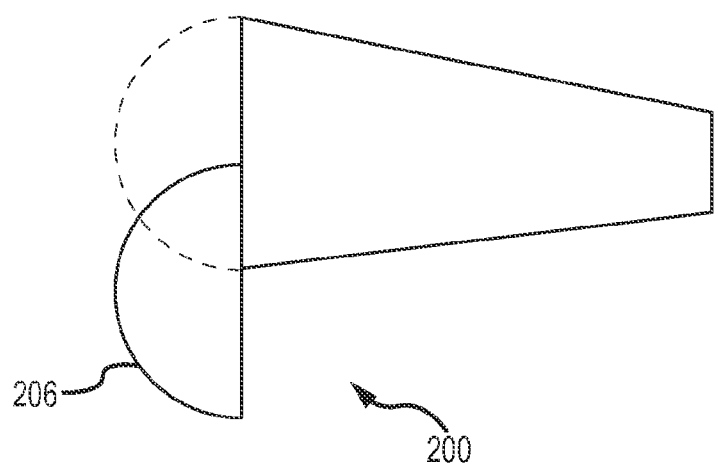
FIG. 2F is a cross-sectional view of another guillotine-damper assembly in a regain nacelle, according to some embodiments of the present disclosure.
Figure 6A:
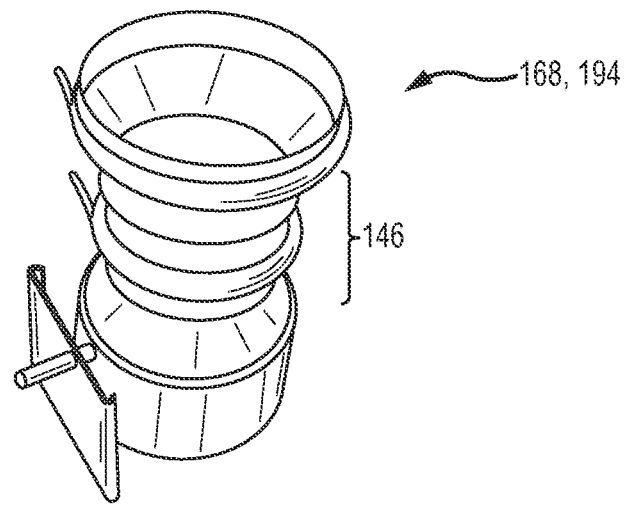
FIG. 6A is an angled perspective view of a venturi valve having the flow device of FIG. 1.
Figure 6B:
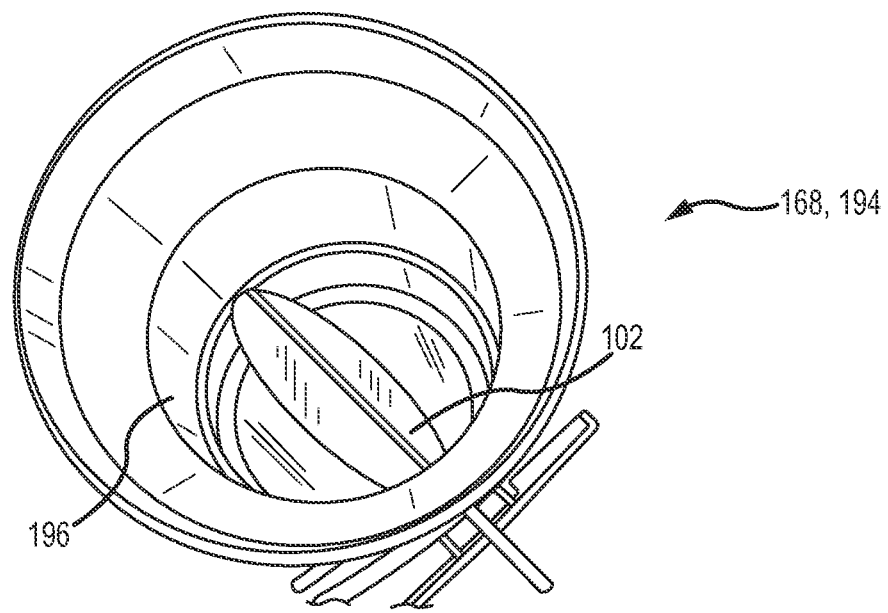
FIG. 6B is a front angled view of FIG. 6A.

Turning now to FIGS. 6A-B, the housing 168 may form a venturi valve 194 that defines a constriction section 196 for the flow pathway. The damper assembly 102 may be disposed in the constriction section 196. In one embodiment, it is contemplated that a plurality of venturi valves of different sizes are ganged together in series upstream of the damper assembly 102 to simulate multiple variable venturi flow measurement. In still another embodiment, it is contemplated that the housing is a double-duct housing having two or more different sized inner and outer dampers to replicate a two-stage damper. In yet another embodiment, the housing 168 further defines a regain section, such as a tear drop nacelle 204 (see FIGS. 2E and 2F), downstream of the damper assembly 102 to reduce losses from increased velocity venturi or Bernoulli effects imparted on the fluid flow upstream of the nacelle. In still another embodiment, the LFFC 100 is combined with 5 to 180 degree symmetrical elbows defining at least a portion of the flow pathway upstream or downstream of the damper assembly 102, wherein the elbows or angled walls projecting into the flow pathway to adapt the device to tight space constraints. For instance, the LFFC 100 may be installed with 45 or 90 degree elbows that use advanced fluid dynamics and can be turned 360 degrees for tight space constraints. It is contemplated that such elbows are aerodynamically enhanced to eliminate any HVAC system effects and optimize the LFFC performance in confined space constraints.

Still, in other embodiments, the flow device may be housed in or in communication with a wireless or hardwired variable air volume ("VAV") diffuser, a grill diffuser, and/or a linear diffuser. In another aspect embodiment, the HVAC diffuser having the LFFC 100 or the LFFC 100 itself further comprises an all-inclusive light, such as a lighting device integrated with and/or on the LFFC 100 to light a surrounding room or other environment. The all-inclusive light and/or an HVAC diffuser may be controlled by one onboard controller, such as the LFFC controller described below. Merely by way of example, the all-inclusive light may be one or more LED lights.

Referring back to FIG. 5C, a downstream sensor 250, such as a downstream tap, Pitot tube or electronic transducer, may be placed in a flow wake or still air portion of the flow pathway. In yet another embodiment, it is contemplated that a shaft of the damper assembly 102, such as the outer or inner shaft 114,116, provides or functions as an upstream and/or a downstream flow measuring device or sensor. In some embodiments, it is contemplated that the downstream or second sensor 250 measures a static pressure of the fluid flow. However, it is contemplated that the downstream sensor can measure any of a total or static pressure of the fluid flow.

Turning now to FIGS. 7A-D, the damper assembly 102 is shown disposed in various housings or ducts with upstream and downstream sensors. In one aspect, the housings or ducts may be existing housings or ducts and the damper assembly 102, and/or LFFC 100, is retrofit installed into the existing structures. FIGS. 7A-C illustrate a circular, cylindrical duct 252 with the two-stage damper assembly 102 disposed therein. The outer and inner shafts 114,116 may extend out of the duct 252 to an actuator assembly 104 (not shown). The downstream sensor 250 is disposed at the downstream end 180 of the cylindrical duct 252 adjacent to the shafts 114,116. As mentioned previously, the shafts 114,116 may be attached to the downstream sensor 250 and/or provide downstream pressure sensing. In some aspects, the downstream sensor 250 is referred to as a second sensor. A first or upstream sensor 254 is positioned in the flow pathway at the upstream end 178. It is contemplated that the first and second sensors 254,250 are used together to measure a first and second pressure, respectively, to obtain a pressure differential. The upstream sensor 254 may measure a total or a static pressure of the fluid flow. In some embodiments, it is contemplated that the first or second sensors 254,250 provide a fluid flow measurement amplification greater than 2.7 or 3. The sensor 254,250 may be a Pitot tube, an adjustable electronic transducer, a pressure sensing device, and/or a hot wire anemometer.

Still in reference to FIG. 7C, in yet another embodiment, an orifice ring 256 is installed upstream of the damper assembly 102 to impart an upstream stagnation circle from which total pressure may be tapped. For the circular duct 252, the orifice ring 256 may comprise an orifice plate having an opening diameter that defines an area $A_{op}$, whereby $A_{op}/A_d$ is approximately 0.8 or 0.9. In another aspect, the gasket 186 may be installed on the cylindrical duct 252 and/or in the damper assembly 102. Still, in another aspect, it is contemplated that a plurality of damper assemblies, having the same or different stages, may be installed in series upstream or downstream through the flow pathway. In that case, a pressure differential is determined based on a first pressure measurement taken upstream of the plurality of damper assemblies and a second pressure measurement taken downstream of the damper assemblies.

FIG. 7D illustrates a rectangular duct 258, whereby the damper assembly 102 is shaped to fit the rectangular duct 258. More particularly, a rectangular outer damper 108r defines the central opening 110 that receives the inner damper 112. It is contemplated that the orifice plate defined by the damper assembly 102 increases a pressure of the fluid flow for the purpose of measuring and controlling fluid flow or mass fluid volume. For instance, the orifice plate defines the variable opening 106. The variable opening 106 splits the fluid flow into multiple streams for the purposes of increasing velocity pressure or recovering velocity pressure for a more accurate measurement. Merely by way of example, a 10 inch round LFFC 100 can measure accurately down to about 5 FPM. In a different aspect, the LFFC 100 is in operative communication with a duct or plenum that splits fluid flow into multiple streams, such as a Y-shaped duct.

In yet another aspect, the LFFC 100 may be configured as a multiple outlet plenum with two or more fluid device assemblies, wherein the multiple outlet plenum permits multiple accurate room or zone control of multiple rooms or zones simultaneously with at least member selected from a group consisting of a single self-contained BTUH generating device, a multiple thermal transfer device, an air to air HVAC system, and a fluid based system. Merely by way of example, the BTUH generating device delivers heat energy to controlled rooms or zones. One BTUH device may be found in U.S. patent application Ser. No. 13/073,809 filed Mar. 28, 2011 titled "MODULAR BUILDING UTILITIES SYSTEMS AND METHODS", the contents of which is fully incorporated in its entirety herein.

LFFC Controller

Figure 8:
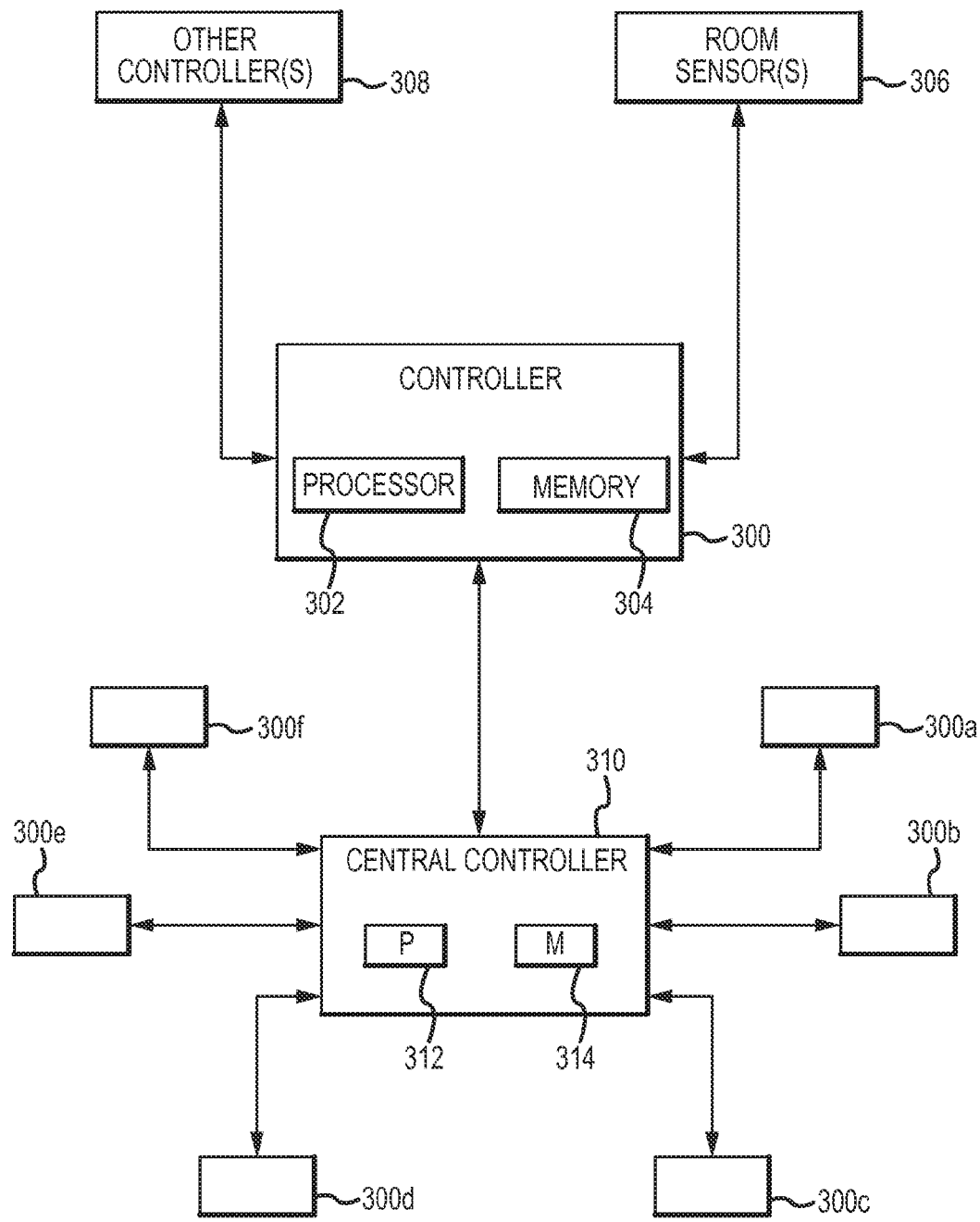
FIG. 8 is a schematic diagram of a controller and network according to various embodiments of the present invention.

Turning now to FIG. 8, the LFFC 100 may be in operative communication with a hardwired or wireless controller 300 that is local, onboard, or remote from the LFFC 100. The controller 300 comprises a processor 302 and a memory 304 communicatively coupled with and readable by the processor 302 and having stored therein processor-readable instructions that, when executed by the processor 302, cause the processor 302 to perform one or more steps. It is contemplated that the processor-readable instructions are programmed for optimal performance, acoustics, and energy of the controller and the controlled damper assembly. In a different aspect, the processor-readable instructions comprise an algorithm based on calculating fluid through orifices. The algorithm may be based on at least one of an orifice metering device, a fluid sensing element, an actuator resolution, and a transducer.

In some embodiments, the controller 300 is a single microelectronic controller in communication with a plurality of room sensors 306 in a plurality of room zones to control the plurality of room zones. In some embodiments, it is contemplated that the controller 300 operates the LFFC 100 such that the HVAC system meets prevailing energy codes, such as one or more of ASHRAE Standard 55-2010, ASHRAE Standard 62.1-2010, ASHRAE Standard 90.1-2010, ASHRAE Standard 62.2-2010, and ASHRAE Standard 90.1-2010.

For instance, the controller 300 may determine a pressure differential based on the first pressure measurement obtained by the first sensor 254 and/or a second pressure measurement obtained downstream of the first sensor 254 at the second sensor 250. Further, the controller 300 may determine a position of the outer and inner dampers 108,112 based on a position feedback received from the actuator assembly 104. Even further, the controller 300 regulates or controls the variable opening 106 based on the pressure differential and the position of the outer and inner dampers 108,112. In some embodiments, the controller 300 determines a new position setting for the damper assembly 102, such as a new angle of rotation for the dampers, based on a flow rate. Thereafter, the controller 300 may signal the actuator assembly 104 to adjust the damper assembly 102 to the new position. In other embodiments, the controller regulates the variable opening 106 based in part on a turndown ratio defined by a maximum volume of fluid flow through the variable opening 106 to a minimum volume of controllable fluid flow through the variable opening 106, wherein the turndown ratio is a high turndown ratio that is greater than 10:1. More preferably, the turndown ratio is greater than 100:1 or 250:1. With a high turndown ratio, the LFFC 100 may be self-commissioning.

In some aspects, self-commissioning allows for the LFFC to measure fluid flows within a system and set a damper position accurately, such as a damper extreme position, over any flow range required, without a need for typical onsite commissioning, for instance by a professional balancer. Further, it is contemplated that self-commissioning permits the LFFC to adjust any pre-commissioned settings, such as minimum and maximum flows, on the spot according to instructions sent from a network connection to the LFFC controller. For instance, an engineer may instruct the LFFC controller through their mobile phone to reset settings.

Still, in another embodiment, the controller 300 determines a magnification coefficient $M_F$ based on square of a ratio of the variable opening area $A_o$ to a flow pathway area, which may be a duct area $A_d$. It is contemplated that the magnification coefficient $M_F$ discussed herein is therefore a non-constant variable and $0 \geq M_F \leq 1$. The magnification coefficient $M_F$ may be based on the position of the outer and inner dampers 108,112 and/or determined based on a calculation or a look-up table comprising a plurality of magnification coefficients $M_F$ that were previously determined from testing, such as empirical data. In still another aspect, it is contemplated that the controller 300 automatically calculates the magnification coefficient $M_F$ based on a symmetry of the variable opening area $A_o$. The magnification coefficient $M_F$ calculation may be performed with a turndown ratio of 10:1 or greater.

In a particular aspect, a table of measured flow coefficients versus percentage open may be provided for each LFFC-based configuration and stored in the memory 304 of the controller 300. The table may be based particularly on the upstream sensor 254 being used. It is contemplated that if an actuator with significant hysteresis is mandated, no single table can be used unless the hysteresis is uniform and predictable, so that actual damper position can be calculated based on historical data, such as data collected from laboratory test. Alternatively, a theoretical formula for calculating the magnification coefficient $M_F$ coefficient provided and implemented by the controller. The theoretical formula may include the Flow and Discharge Coefficient Equations:

$$C_F = \frac{A_c}{A_o} = \frac{c}{1-(1-c)\left(\frac{A_o}{A_d}\right)^2},$$

for a magnification coefficient $M_F$ in combination with an upstream total pressure sensor, or $$C_d = \frac{c}{\sqrt{1-(1-c)^2\left(\frac{A_o}{A_d}\right)^2}},$$

for magnification coefficient $M_F$ utilized in combination with an upstream static pressure sensor.

In another aspect, the controller 300 may determine by calculation or a lookup table the flow rate based on the pressure differential and the magnification coefficient $M_F$. The flow rate may be determined based on multiplying the magnification coefficient $M_F$ with a square root of the determined pressure differential and then calibrated to read mass fluid flows in desirable engineering units. In a different aspect, the controller 300 determines a flow rate further based on a flow coefficient that is applied at a maximum fluid flow to determine a maximum flow rate for use in calibration, further wherein the flow coefficient is a constant coefficient. The controller may further compare the flow rate to a target flow F that is based on a desired temperature setting and/or operate the actuator assembly to maintain or change the variable opening area $A_o$ defined by the damper assembly 102 based on the comparison. The target flow F may be one of a plurality of target flow F's stored in the memory 304, or communicated to the controller 300 based on input from a user or other wireless/hardwired system.

Still referring to FIG. 8, in yet another embodiment, the controller 300 outputs at least one of the pressure differential, the variable opening area $A_o$, the magnification coefficient $M_F$, and the flow rate to an external controller or another controller 308. The controller 300 or 308 may be a cloud-based control computing and wireless control components. In another aspect, the controller 300 is further monitored and controlled by BAS software of a BAS system, which may be represented as the other controller 308. For instance, the controller 300 balances the damper assembly 102 in real time from a front end software building automation system (BAS). Such real-time balancing data is displayed at a front end software BAS system, a controller installed on self-contained compressor, a fluid moving device, and a room air discharge device to allow the moving device to be controlled and interface with another equipment controller. In another aspect, the controller 300 provides real-time turn down capabilities of a fluid moving device in operative communication with the damper assembly 102.

In reference again to FIG. 8, the controller 300 may output the flow rate to a central controller 310 at a central system that supplies the fluid flow to the flow device, LFFC 100. The controller 300 may further output the pressure differential to the central controller 310 to control a variable frequency driver or inverter of the central system, such as an air flow movement device placed downstream or upstream of the damper assembly 102. More particularly, the controller 300 may operate a motor of the air flow movement device based on the pressure differential. In some embodiments, the air flow movement device comprises one or more fans. In a further aspect, the controller 300 may communicate to the central system's central controller 310 that a limit of a control range has been reached, e.g., the damper assembly 102 is nearly wide open, and/or the damper assembly 102 is out of the control range, e.g., the damper assembly 102 is wide open.

Still referring to FIG. 8, the central controller 310 may be a central controls system for use in an HVAC system. The central controller 310 may comprise a central processor 312 and a central memory 314 communicatively coupled with and readable by the central processor 312 and having stored therein processor-readable instructions that, when executed by the central 312 processor, cause the central processor 312 to perform a plurality of steps. Merely by way of example, the central controller 310 may receive and send data to and from a plurality of flow controllers generally indicated as 300a-f. Each of the plurality of flow controllers 300a-f may operate a flow device, such as an LFFC 100, positioned remotely from the central controller 310. The data received by the central controller 310 may comprise one or more of a pressure differential measured at each of the plurality of flow controllers 300a-f, a variable opening area of a flow pathway provided by each flow device, a magnification coefficient $M_F$ based on square of a ratio of the variable opening area to a flow pathway area at each of the plurality of flow devices, wherein the magnification coefficient $M_F$ is a non-constant coefficient and $0 \geq M_F \leq 1$, and a flow rate based on the pressure differential and the magnification coefficient $M_F$.

Furthermore, the central controller 310 may send operational parameters to each of the plurality of flow controllers 300 a-f independently. The central controller 310 may also adjust a volume of a supply fluid flow to at least a portion of the plurality of flow devices based on the data received. Further, it is contemplated that the central system may operate such that at all times, at least one LFFC 100 reports to it that a limit of the control range is reached and no LFFC 100 reports that it is out of the control range. If an LFFC 100 reports that it is out of the control range, the central system may increase fan output. If no LFFC 100 is at a limit or out of the control range, the central system may feather back fluid flow supply. In a different aspect, if at startup, the central system operates with an LFFC 100 wide open and the plurality of LFFC's 100 report operation out of the control range, then the central system may be preprogrammed to temporarily reset selected, less essential delivery zones/rooms to receive a smaller portion of the total supply flow. For instance, preprogramming may include temporarily resetting certain remote temperature setpoints. Such normal setpoints may be gradually restored until no remote LFFC 100 reports out-of-range operation and at least one LFFC 100 reports operation at a limit of the control range. Normal setpoints may be restored and supply flow may be controlled by the fans. In a further aspect, the central controller 310 may be programmed to feather back rooms or zones that are not expected to be occupied and/or to precondition certain rooms expected to be occupied.

Figure 9:
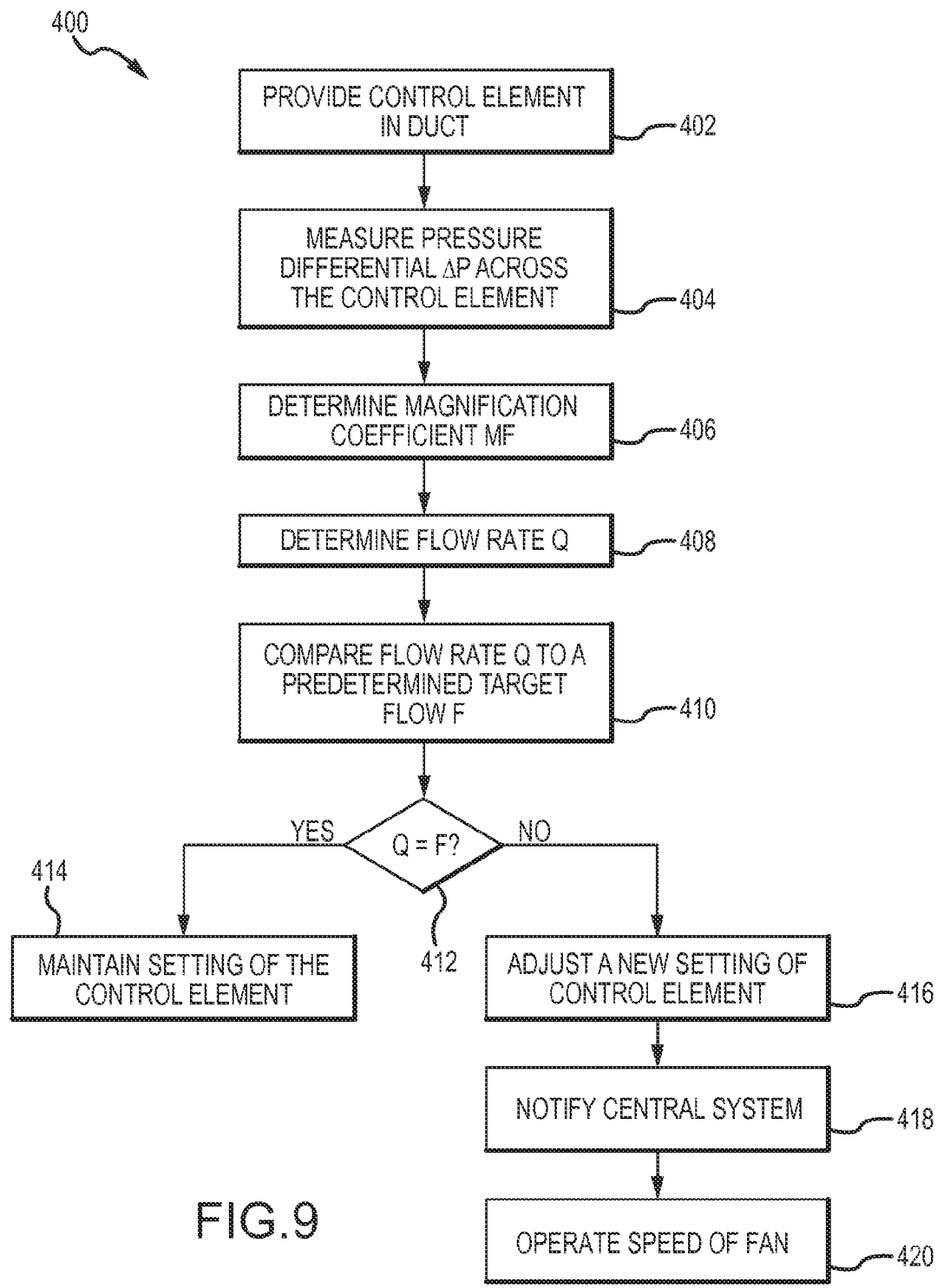
FIG. 9 is a flow diagram of a method according to various embodiments of the present invention.

Turning now to FIG. 9, a method 400 for controlling fluid flow through a duct defining a cross-sectional area $A_d$ is shown. The method includes the step of providing 402 a control element in the duct, whereby the control element defines a variable opening area $A_O$ that amplifies a velocity pressure of the fluid flow through the control element. The control element may refer to the damper assembly 102 described above. In some embodiments, the control element is a thin blade control element and the pressure differential $\Delta P$ is measured across the blade to enhance readings. The method further includes measuring 404 a pressure differential $\Delta P$ across the control element, determining 406 a magnification coefficient $M_F$ based on a square of a ratio of $A_O/A_d$, and determining 408 a flow rate Q based on a product of the magnification coefficient $M_F$, the duct area $A_d$, and a square root of the pressure differential $\Delta P$. Further, the method may include comparing 410 the flow rate Q to a predetermined target flow F to determine 412 if Q=F. If Q=F, the method includes the step of maintaining 414 a setting of the control element defining the variable opening area $A_O$. If Q≠F, the method includes at least one of the steps of adjusting 416 the setting of the control element to a new setting defining the variable opening area $A_O$, notifying 418 a central controller of a central system that supplies the fluid flow to the control element to increase or reduce the fluid flow, and/or operating 420 a speed of a fan disposed upstream or downstream of the control element based on the pressure differential $\Delta P$. In a different aspect, the central controller is a central zone or room controller that adds fluid flow into and/or out of a controlled room or zone, and/or laboratory. In this way, two LFFC 100 devices (and/or their respective controllers) may be paired, providing an "in" device and an "out" device to provide a tracking pair for CFM tracking. In another aspect, a single controller may controller one or more LFFC 100 devices.

In another aspect, the method may include the steps of checking if the predetermined target flow F has changed, and/or signaling an actuator to adjust the control element to the new setting. Still, the method may include one or more steps of providing a plurality of control elements in series or in parallel in the flow pathway, measuring the pressure differential $\Delta P$ across the plurality of control elements, and determining the magnification coefficient $M_F$ based on the variable opening area $A_O$ of the control element that is furthest downstream in the plurality of control elements. In still another embodiment, the method includes the step of enhancing or magnifying the measured pressure differential $\Delta P$ across the control element and calculating the flow rate Q based on the enhanced or magnified pressure differential $\Delta P$ along with the magnification coefficient to achieve a precise flow rate Q.

Figure 10A:
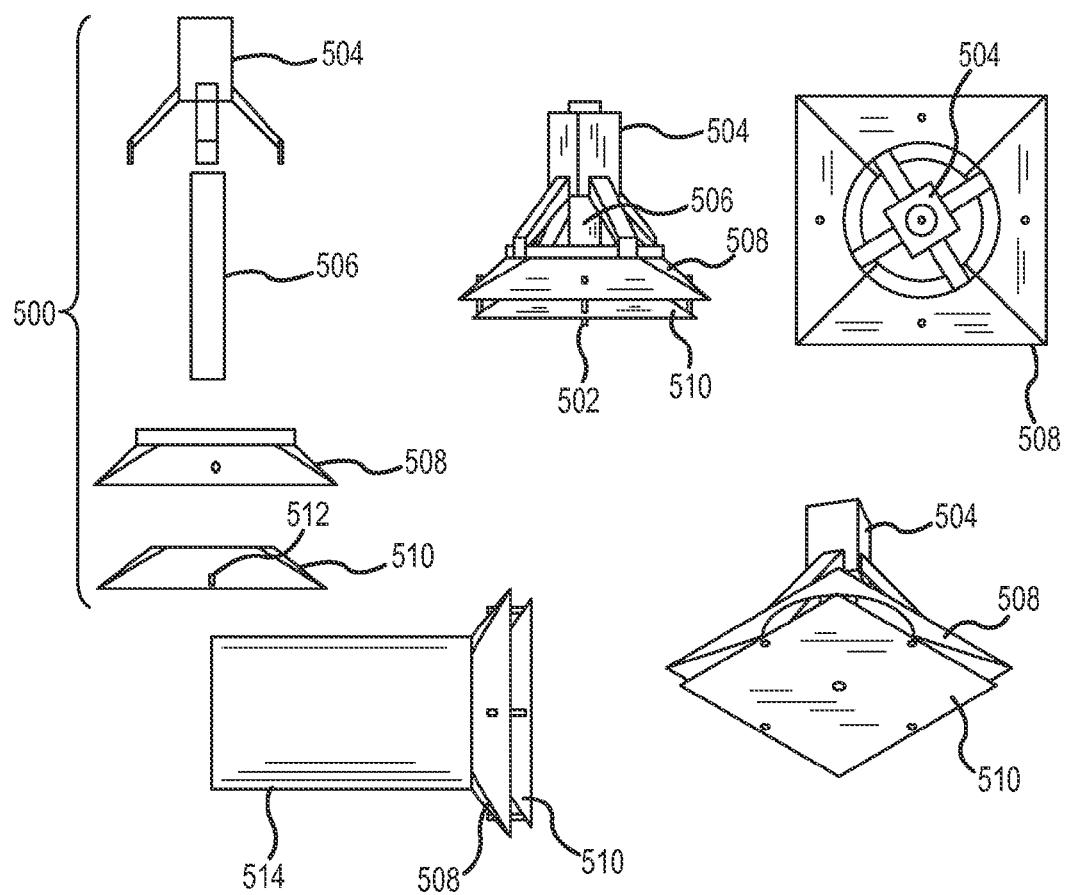
FIG. 10A illustrates an SBAD adjustable diffuser with temperature sensing, according to various embodiments of the present invention.

Turning now to FIG. 10A, the LFFC 100 may be in operative communication or housed in a smart self-balancing air distribution (SBAD) adjustable diffuser 500. The diffuser 500 may have a temperature sensor 502, such as a thermostat. The diffuser 500 may further comprise a motor 504 operatively attached to a drive screw 506, that is further operatively connected with a plaque diffuser body 508 and an adjustable diffuser 510. In particular, the adjustable diffuser may provide a recess 512 for receiving an end of the drive screw 506 therein. It is contemplated that the diffuser 500 is inserted in a ductwork 514 tubing, such that the motor 504 and drive screw 506 are housed within the ductwork 514. The plaque diffuser body 508 and the adjustable diffuser 510 extend out of the ductwork 514 and may extend into a room. In operation, it is contemplated that the motor 504 moves the adjustable diffuser 510 toward and/or away from the plaque diffuser body 508 to control an amount of airflow from the ductwork 514, through the plaque diffuser body 508 and out around the adjustable diffuser 510. For instance, the motor 504 may be regulated by a sensed temperature of the temperature sensor 502.

Figure 10B:
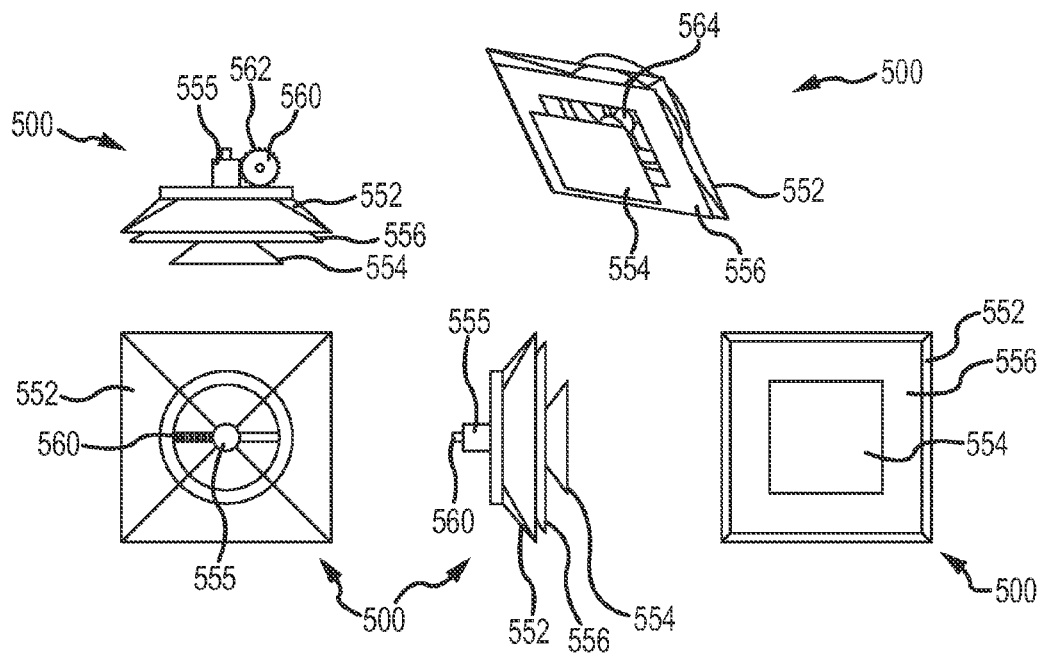
FIG. 10B illustrates an SBAD motorized diffuser.

Turning now to FIG. 10B, a motorized SBAD diffuser 550 is shown. The diffuser 550 may be similar to the diffuser 500 except for the differences noted herein. In particular, the motorized diffuser 550 comprises a plaque body 552, an adjustable diffuser 554, and an intermediary diffuser 556 disposed therebetween. The adjustable diffuser 554 and/or the intermediary diffuser 556 are adapted to move toward or away from one another, and/or from the plaque body 552. The movement may be effected by vertical movement of a drive screw 558 that is connected to the diffuser components 552,554,556. In particular, a motor 560 having a toothed ring 562 may engaged corresponding teeth 555 provided on the drive screw 558. In a particular aspect, the intermediary diffuser 556 provides an intermediary opening 564 that may be sized corresponding to the geometric shape and size of the adjustable diffuser 554, such that the adjustable diffuser 554 may extend or overlap with the opening 564. As shown in FIG. 10B, the plaque body 552, adjustable diffuser 554, and intermediary diffuser 556 are rectangular, although any shape and size, or combinations thereof, may be contemplated.

Figure 10C:
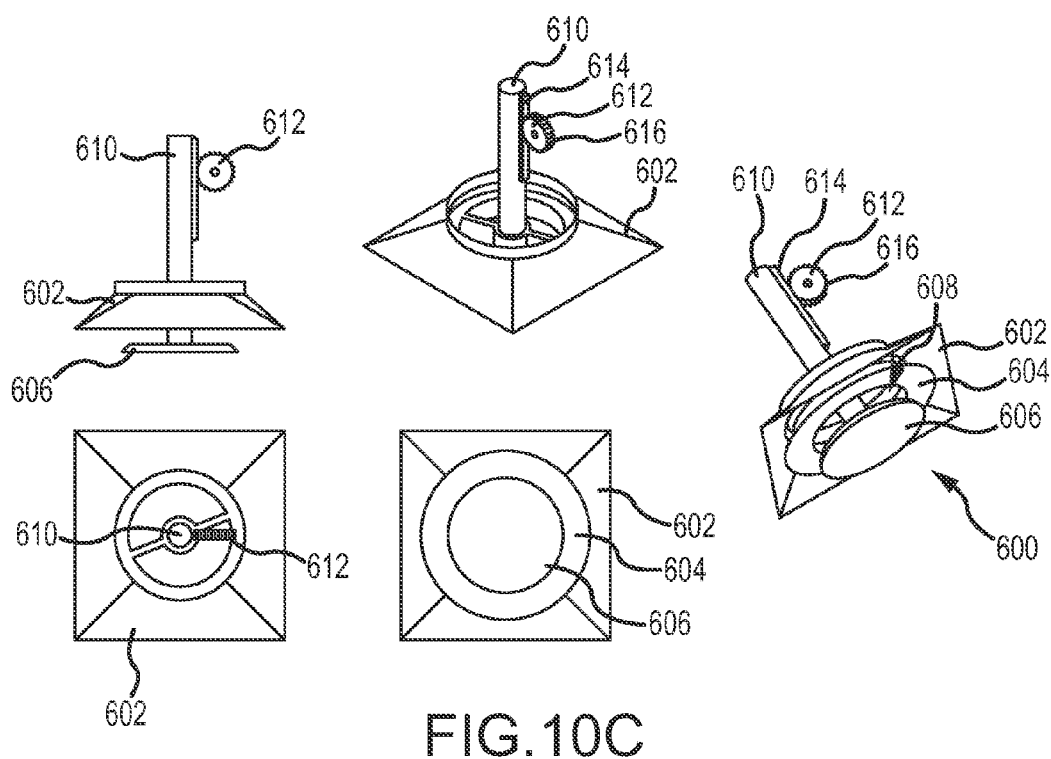
FIG. 10C illustrate an SBAD diffuser damper.

Turning now to FIG. 10C, a SBAD diffuser damper assembly 600 is illustrated. The diffuser damper assembly 600 may be similar to the motorized SBAD diffuser 550 and the diffuser 500 described above, except for the differences noted herein. The diffuser damper assembly 600 comprises a plaque body 602, an outer damper 604, and an inner damper 606. In a particular aspect, the outer damper 604 is ring-shaped with a damper opening 608 defined centrally. The central opening 608 may be circular or otherwise and shaped corresponding to the geometric form of the inner damper 606, which is also circular as shown in FIG. 10C. A drive shaft 610 is operatively connected with a motor 612 by a toothed column 614 disposed along the drive shaft 610 that engages a toothed ring 616 of the motor 612. In a particular aspect, the motor 612 rotates to move the drive shaft 610 in a linear fashion, so that the outer damper 604 and/or the inner damper 606 are moved toward or away from the plaque body 602.

Figure 11:
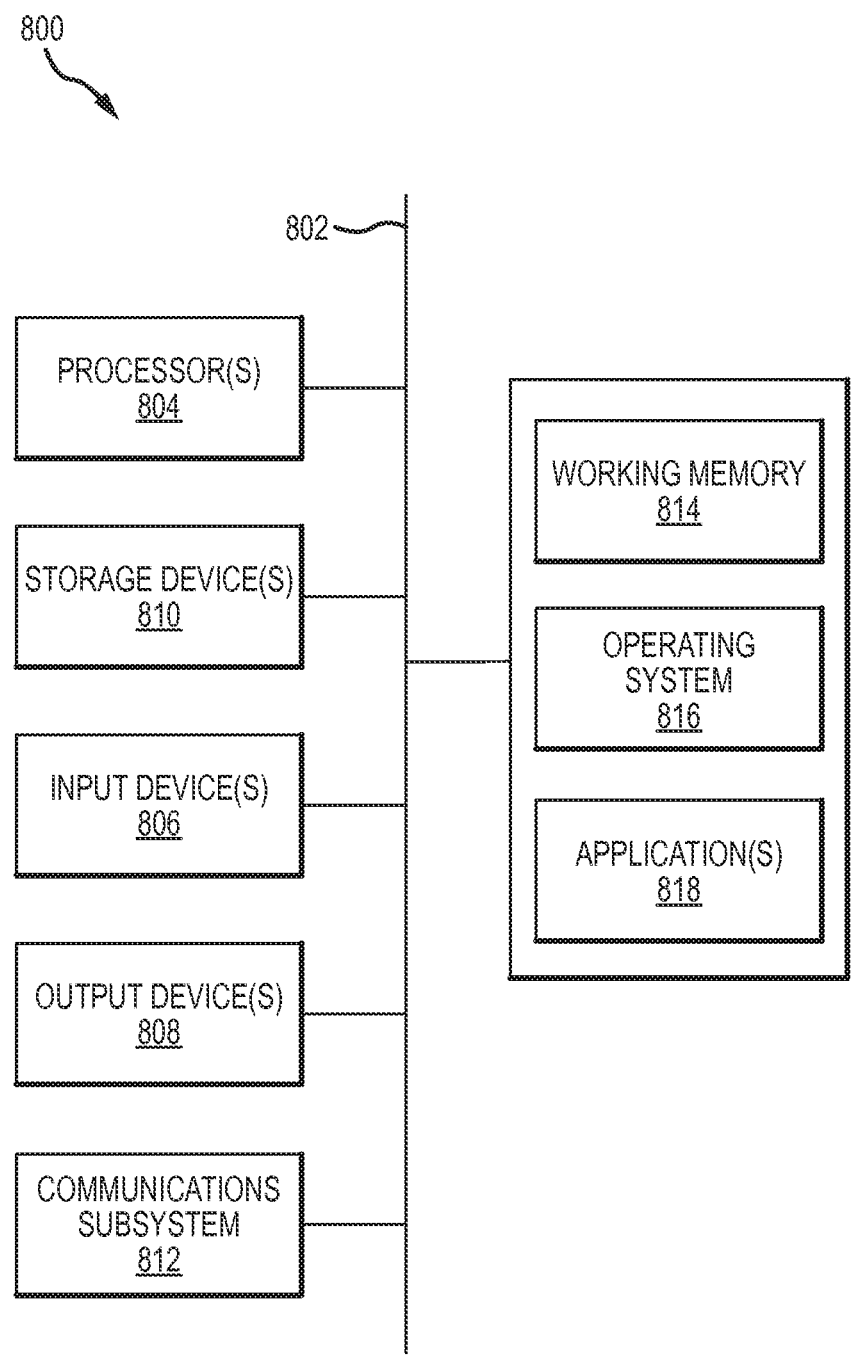
FIG. 11 shows a schematic diagram of a controller or computer device.

FIG. 11 shows an example computer system or device 800, such as the controller 300, in accordance with the disclosure. An example of a computer system or device includes an enterprise server, blade server, desktop computer, laptop computer, tablet computer, personal data assistant, smartphone, and/or any other type of machine configured for performing calculations. Any particular one of the previously-described computing devices may be wholly or at least partially configured to exhibit features similar to the computer system 800, such as any of the respective elements of at least FIG. 8. In this manner, any of one or more of the respective elements of at least FIG. 8 may be configured to perform and/or include instructions that, when executed, perform the method of FIG. 9 and/or other instructions disclosed herein. Still further, any of one or more of the respective elements of at least FIG. 8 may be configured to perform and/or include instructions that, when executed, instantiate and implement functionality of the controller 300, other controllers 308, and/or the central controller 310.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., controller screen), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, controllers, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

Operational Algorithms

The LFFC described herein may be used in combination with a custom algorithm based on several mechanical construction features, such as construction, type of blade design, the material of the damper assembly/air valve (high end vs. low end version), and the like. This feature may allow for cost effective production. The algorithm may further depend on a type of actuator being used, based on resolution and application. In another aspect, the algorithm depends on a type of air flow sensing device being used, e.g., orifice ring, linear probe, cross flow sensor, electronic, etc. In still another aspect, the algorithm may depend on the type of application, such as Chemical and Biological Pharmaceutical, HVAC, Industrial Process Control and Equipment OEM.

In practice, it is contemplated that a cost effective first article build of the air valve designed around performance parameters and channel application is manufactured. The first article is then installed on a specially calibrated test stand/wind tunnel and tested/calibrated to the algorithm. Then, the algorithm is updated and the air valve is tested again. Once characterized and tested, air valves are ordered and shipped to the field for Beta and cycle testing. The algorithm is then scalable over the various sizes of the air valve commensurate to the actuator, air valve design and air flow sensor (above mentioned items). New actuator and flow instrumentation performance and accuracy can be calculated, rather than laboratory tested making introduction of new variations faster. This feature may bring a new product to market much more rapidly than has been the case in the past.

Wind Tunnel Testing and Results

Three wind tunnel configurations were fabricated and employed. Industry standards covering testing, like AMCA210.1999 Laboratory Methods for Testing Fans for Aerodynamic Performance Ratings do not adequately address the wide operating range. Finding a test setup that could test a device with high range-ability was a challenge in and of itself. In one test setup, the Wind Tunnel uses two different inlets (Hi & Lo) to cover the performance range of the LFFC since a single fixed setup could not designed to cover the range. Existing micro-manometer air pressuring sensing technology also makes accuracy testing over a broad operating range difficult. Furthermore, special software programs had to be written for the base software program, the sophisticated lab type controllers, and the highly accurate and calibrated sensors for verification purposes. Unlike other air flow tests, this test included the resolution points from the electronics such as actuators at the various performance parameters, the type of fluid sensing element being used, the construction of the device, the various fluid patterns at various performance spectrums and the type of transducer commensurate to the algorithm. All this data collected at thousands of points of performance parameters, as we mirrored real time operation of an actual building system. Therefore, the test stand/wind tunnel was complex and validated the LFFC described herein. Moreover, the test stand/procedure executed and reduced the R & D time by several years.

A ratio test on a 10" low flow damper/flow meter was undertaken. In particular, the study utilized a 2-stage damper calibrated to function as a flow station. At any fixed damper position the device serves as an orifice plate, with flow coefficient[1] which may be considered a fixed number over a wide range of Reynolds numbers. Each damper position has an associated critical Reynolds number below which the coefficient can be regarded as Reynolds-dependent.

[1] $C=(duct\ VP/DeviceDP)^{0.5}$

Test results showed that with the instrumentation at hand, no Reynolds dependence was noted over the entire range of annulus positions (disk 100% open). The flow coefficient may be regarded as constant at each annulus setting; i.e., a function of damper position only. With annulus closed, a possible critical Reynolds number was determined at disk openings 40% and 80%.

Low Flow Air Valve 3 Inch Ratio Test

A disk at 40% open ratio was tested and yielded a chart that plots $C^2$, the ratio of the Setra reading on the disk, to the MKS 3" Venturi reading at disk 40% open. The ratio remains substantially constant until the lowest two points are reached. At the lowest point, $C^2$ reads ~10% high, so C ~5% high. Velocity 31 FPM (6109 MPS), 17 CFM (481 LPM) in the 10" (25.4 CM) duct (note that this is about 1/10 walking speed). Turndown ratio 97 with respect to a full flow duct velocity of 3000 FPM (590 kMPS) and still 39 with respect to 1200 FPM (236 kMPS), still an excellent turndown relative to the low fluid flow velocity, which is uncontrollable in existing systems. Venturi Reynolds number ~9000, still in the flat flow profile range. Reynolds number 2600 in the Duct, so velocity profile moving toward parabolic, which would increase the Damper delta P, possibly slightly offset by a decrease in orifice ring amplification, but not so abruptly as in the curve.

A disk at 80% open ratio was tested and yielded a chart that plots $C^2$ at disk 80% open. The ratio remains substantially constant until the lowest point is reached. At that lowest point, $C^2$ reads ~10% low, so C ~5% low. Velocity 44 FPM (8663 MPS), 24 CFM (670 LPM) in the 10" (25.4 CM) duct (note that this is about 1/10 walking speed). Turndown ratio 68 with respect to FPM full flow duct velocity of 3000 FPM (590.7 KMPS), 27 with respect to a still controllable 1200 fpm (236.2 KMPS) full flow. Venturi Reynolds number ~12000, well into the flat range. Reynolds number 3800 in the Duct, so velocity profile moving a little toward parabolic, which would increase the Damper delta P, possibly slightly offset by a decrease in orifice ring amplification, but the displayed ratio drops abruptly in the curve. In the wrong direction to be a Reynolds effect. Therefore, look at sensor and transducer limitations.

[1] $C=(duct\ VP/DeviceDP)^{0.5}$

Calibration of the 1" (249 Pa) Setra yields a chart that plots the ratio of readings of the 1" (249 Pa) Setra used in these tests to the MKS standard. The Setra tracks well down to 0.02" w.g (4.98 Pa). It reads 8% high at 0.01" (2.49 Pa), corresponding to 4% in flow coefficients. The Setra remained above 0.02" (49.8 Pa) in these tests which is not the problem. May need to calibrate sensors against each other at these low flows.

This data will be refined using a 0.1" (24.9 Pa) delta pressure MKS transducer (on order), encompassing more disk settings than the 40% and 80% considered here, and extending to even lower flows. In the process the current contradiction between 40% and 80% low end behavior will be resolved.

Flow Coefficient Data and Curves

In this series, 2-1 minute averages were taken over each 2 minute long damper setting, labeled Early and Late or 1st pt, 2nd pt. It may not have been possible to align sampling with repositioning, so Early average may include data from previous setting and repositioning interval.

Low Flow Air Valve 3 Inch Char Test JCI

The 1" (249 Pa), 2" (498 Pa) and 10" (2490 Pa) Setra tracked each other quite well up to 60%, where the 1" Setra maxed out. The 2" (498 Pa) Setra maxed out at 65%, and the 10" (2490 Pa) Setra at 90% opening, 85% closing. The artificial hysteresis caused by sensor saturation at 90-100% open is evident in the graph. Saturation lowered those plotted values, particularly at 100% Open. Similar artifacts are evident in the considerably lowered 1" (249 Pa) and 2" (249 Pa) Setra saturation curves. The JCI actuator introduced no significant hysteresis: opening and closing data were often identical to 4 decimal places, occasionally differed by a few percent. Early readings were not noticeably contaminated by vestiges of the previous setting.

Low Flow Air Valve 3 Inch Char Test GAP Actuator

The late (2nd minute) data shows the 1"(249 Pa), 2" (498 Pa) and 10" (2490 Pa) Setra again tracked each other quite well up to 60%. Above that, and over the entire early (1st minute) range, very considerable hysteresis is apparent. Since 2nd minute data is greatly improved over 1st minute data, we may try testing at 3 minutes; 3 readings per setting: a long relaxation time may be involved. In 2 minutes at the 100% setting the damper had not achieved 100% opening from indicated 95%. The 100% early reading is higher than the later reading. The 90 and 95% early readings reduce to about the late 100% reading, but the late 95% reading is the highest of the whole set, giving the appearance that the actuator oscillates back and forth several times when commanded to reverse direction, before settling into (in this case) closing mode, lagging about 9 degrees behind the opening path early, reducing to about 2 degrees after 2 minutes in position. Satisfactory agreement may be achieved 3 or 4 minutes after a position-changing command.

Benefits of the LFFC in HVAC Systems

The LFFC described herein may be incorporated in an HVAC system to facilitate the HVAC system in providing comfort at low-as-possible energy consumption levels. The American Society of Heating, Refrigerating and Air-Conditioning Engineers ("ASHRAE") established standards outlining room conditions that are acceptable for most, i.e. 80%, of building occupants. In particular, the ASHRAE provides a psychometric chart that shows comfort zones as defined in ASHRAE Std. 55 for summer and winter seasons. The ASHRAE Std. 55 identifies the comfort zone or range of conditions that satisfy most people who are appropriately dressed and performing light work, e.g. office work. People wearing heavier clothing and undertaking heavy work may need cooler conditions. Comfort in a controlled space depends on a combination of air flow temperature control and humidity.

Further, comfort is interrelated with ventilation of fresh air. Supplying metered amounts of outside air prevents the indoor air from becoming stale and unhealthful. The LFFC described herein measures and meters fluids, such as air or fresh air, into controlled zones to provide comfort to people in those rooms. It is noted that outdoor air standards have become more strict and created a demand for a higher turndown air controlling device. With the high turndown LFFC described herein, the LFFC can be incorporated into the HVAC system to promote conditioning of supply air and help provide each space or zone a portion of the conditioned fresh air within a comfort zone that has acceptable combinations of humidity and temperature.

Further, as defined in ASHRAE Std. 62 Fresh Air Standard, the HVAC system should provide sufficient amounts of outside air for human comfort ventilation. The effectiveness of the system to accomplish this depends on two main factors: 1) Quantity of supply air, which may be measured in cubic feet per minute ("CFM") or liters per minute ("LPM") and 2) temperature of the supply air, which may be measured in degrees Fahrenheit or Centigrade. To heat or cool a space, the quantity and temperature factors are combined in different ways depending upon the type and design of the particular HVAC system. A thermodynamic equation that incorporates these factors is shown below for sensible heating and cooling where humidity is not included. In the equation below, the constant ("Constant") and mass flow ("CFM") may be adjusted for liquid fluid flows.

$$BTU = (Constant \times CFM \times \text{Difference in Temperature}) \quad \text{Equation 1}$$
BTU Equation Relating Flow and Temperature to Energy Transfer The above equation shows that BTUs delivered to condition a space are affected by the amount of air and/or air temperature. Changing either variable, the mass flow CFM (LPM) or temperature ° F. (° C.), can change the temperature in a controlled zone. In a particular aspect, the LFFC described herein measures and meters the mass flow CFM and gallons per minute ("GPM") flows, and other variables, into controlled spaces.

In some cases, commercial offices utilize ventilation systems that provide indoor climate conditions that comply with fresh air and energy codes. The airflow may be independent of room occupancies, and therefore, existing ventilation systems may waste energy in unnecessarily supplying fresh conditioned air to unoccupied zones, e.g., zones without people. Wasted energy generates unnecessary utility costs. In order to comply with new energy standards, HVAC systems should reduce air flow when people are not present. The LFFC described herein may facilitate the adjustment of air flow so the necessary ventilation is provided, while not sacrificing temperature quality and CO2 concentrations. In particular, by providing cool conditioned air at 55° F. (13° C.) simultaneous cooling, heating and humidity control are possible. The cool 55° F. (13° C.) air can remove the excess heat and humidity generated by people, plug loads, computers and incoming sunlight. In other cases, zones within buildings may require both heating, cooling and humidity control all in a short time period, e.g. a single day. In that case, the HVAC system can be capable of reheating air, which is heating air that was previously cooled to 55° F. (13° C.). The LFFC described herein can measure smaller air and fluid volumes with high turndown. Further, the LFFC described herein offers precise fluid flow measurement that also generates lower sound levels, while providing fresh air to zone occupants and reducing energy consumption, in particular by reducing the need for reheat.

In another aspect, humidity increases and decreases along with indoor air temperature variation. The LFFC described herein may facilitate the HVAC system in maintaining indoor humidity within the comfort zone. For instance, an HVAC system in a dry climate may include an added humidifier unit in the central air handler to increase the moisture level in the conditioned air when required. An HVAC system in a humid climate may dry or remove moisture from the supply air by overcooling the conditioned air and then reheating it back to the comfort zone temperature. The LFFC described herein makes these processes more efficient by more accurately measuring and controlling air and fluid quantities.

In a further aspect, the LFFC described herein can be used in both central HVAC and zone HVAC systems, including air to air and water/fluid-based systems. Central HVAC systems may include large heating and cooling equipment that condition massive amounts of air for large areas on multiple floors of buildings. Such equipment may be located in basements and/or on roofs of the buildings and include, for example, steam boilers, hot water heaters, chillers, cooling towers and backup generators. Zone HVAC Systems may comprise smaller pieces of heating and cooling equipment. Such equipment may be placed within buildings to control zone or room level spaces. Zone control systems may control individual occupied spaces and represent a majority of cooling and heating equipment installed in the building. It is contemplated that the LFFC described herein can be implemented in both of the central and zone systems, with and without firmware and software.

It is worthy to note that an HVAC system for a building can provide a variety of different heating and cooling zones, particularly for a large building having numerous spaces. Different zones within a building may have different heating and cooling needs, which may depend on thermal heat gains, geographic locations, number of floors, numbers and sizes of windows and doors. For instance, large buildings with inner cores insulated from the outdoors may not require heating during the winter months, but may require cooling instead. On the other hand, outer zones or perimeter spaces along the outer walls may require heating due to cold air convection and electromagnetic ("EM") radiation passing through the windows. Further, all zones, whether heating or cooling, require fresh air ventilation. It is contemplated that the LFFC described herein aids the HVAC system to meet both new fresh air standards and energy standards at the same time, while providing the variety of heating and cooling zones. The LFFC-incorporated HVAC system is capable of adjusting air flow without causing significant pressure differences that may lead to considerable amounts of turbulence, i.e. sound that is distracting to building occupants.

Application of the LFFC in VAV Systems

One type of HVAC system is a variable air volume ("VAV") system. It is contemplated that the LFFC described herein can be incorporated in VAV systems. In particular, the VAV system may include one or more supply ducts that distribute supply air at 55° F. (13° C.). The supply air temperature in the VAV system may be held constant. The air flow rate in the VAV system may be varied to meet varying heat gains or losses within the thermal zone served. The VAV system may further include VAV fan capacity control through electronic variable speed drives or electronically communicated motor ("ECM")/solid state motor technology. Such VAV fan capacity control may greatly reduce the energy consumed by fans and thus a substantial part of the total energy requirements of the building served. The capacity controlling supply and return fans modulate the air volume up and down depending on thermal loads. Further, the VAV system may provide dehumidification control in a cooling mode, whereby supply air volume is reduced and reheat is introduced for dehumidifying. In larger commercial systems, the VAV system may include one or more VAV air handlers to serve multiple thermal zones such that the air flow rate to each zone may be varied. In that case, the VAV system may utilize the LFFC described herein, which may replace or be used in additional to traditional VAV terminal boxes.

VAV terminal boxes may be implemented as a primary zone-level temperature flow control device. The VAV terminal box may include a calibrated air damper equipped with an automatic actuator and air flow sensor. The VAV terminal box is connected to a local or a central HVAC system. In VAV systems, fan capacity control is critical, since ever-changing duct pressures can influence the amount of air (CFM) delivered to zones. Without proper and rapid flow rate control, the VAV system can deliver too much air or generate excessive noise and potentially damage ductwork by over-pressurization.

In VAV cooling mode, the VAV terminal box closes to limit flow of cool air into spaces where zone temperatures are satisfied. When the zone temperature increases again, the VAV terminal box opens to introduce larger volumes of fixed temperature air in order to cool the zone space temperature. In the VAV system, a central fan may maintain a variable supply of air, by maintaining a constant duct static pressure regardless of the position of the plurality of VAV terminal boxes distributed in the system. Such VAV terminal boxes operate independently of each other as they supply conditioned air throughout the building zones. As the VAV terminal boxes close, duct static pressure increases and the control system slows the fan down to restrict the volume of air going through the VAV system. As the VAV terminal boxes open, the fan speeds up and allows more air flow into the duct system. In some cases, centralized building controllers measure and maintain constant static pressure in the supply ducts.

The VAV terminal box may be placed in a ceiling or plenum space along with other duct work or under the floor. The VAV terminal box regulates the volume of the air to the zone by measuring the air volume and opening or closing the air damper to meter in conditioned air, thus controlling the temperature of each zone. In some cases, each zone has a thermostat that controls the VAV terminal box by indicating when to open or shut the air damper based upon the zone heating or cooling demand. For instance, a controller in the terminal box may take the thermostat's measured room temperature as an input, calculate the rate or volume of air necessary to cool and/or heat the zone, and subsequently take a second air volume input to check that the calculated amount of air volume is being delivered to the zone under control. In this way, the VAV terminal box delivers fixed supply air temperature at variable volume rates.

The VAV terminal box may contain several operational parts. A casing, such as an outer box or shell, may be formed from 22 gauge galvanized steel and have various internal insulation options depending on acoustics and application. When sizing the VAV terminal box, a substantial number of sizes may be required for accurate flow measurement commensurate with acoustical requirements. To maintain flow measurability and control, an inlet of a VAV terminal box requires high pressure/high velocity entering air, which can be dissipated within the casing of the device to provide required low velocity/low pressure output air. The inlet is connected to an inlet duct that is in communication with the Central Air Handling Unit. An outlet is in communication with an outlet duct leading to one or more zone diffusers. Inside the VAV terminal box, an air volume damper or metal door may open or close to control the amount of conditioned air flow needed. The air damper may be controlled automatically by a motor, also referred to as an actuator, which is controlled by the controller based on inputs from the thermostat and air volume sensors. The thermostat may be placed in the zone to detect temperature and instruct the damper or metal door of the VAV terminal box to open or close. This controls the amount of fixed temperature conditioned air into the zone. In some cases, 21 differently sized VAV terminal boxes along with various size coils may be manufactured. In addition, several various sizes of fan powered boxes, dual duct, under floor, chilled beams, fan coils and other air and water based devices may be manufactured.

Several types of VAV terminal boxes may be provided, including single zone (with and without reheat), fan-powered (with and without reheat), and dual duct. The single zone VAV terminal box includes a VAV terminal box with an integral damper that is controlled by a thermostat. The fan-powered VAV terminal box is similar to the single zone, but also contains a fan that runs continuously to mix plenum air with conditioned air. In that case, the fan provides additional air circulation when there is less demand for conditioned air. In cold climates the fan-powered VAV terminal may shower windows with a constant volume of air to avoid frost build up. The single zone and fan-powered VAV terminal boxes may come with electric or hot water coils built-in to reheat the air depending on zone temperature or humidity conditions. This feature allows the VAV terminal box to heat specific zones as opposed to heating the entire building. It also gives VAV terminal boxes control of humidity in cooling mode. The dual duct VAV terminal box may be used with a centralized VAV system that provides two ducted air streams of respectively cold and hot air. In this way, the dual duct VAV terminal box can blend the two air streams into a variable temperature, variable air volume to achieve the desired zone temperature. In general, the dual duct systems can provide high quality air temperature and humidity control.

The VAV terminal box may be designed for a multi-zoned building, where cooling needs vary in each zone of the building. Such multi-zoned buildings have many zones and may frequently utilize a plurality of large central Air Handling Units ("AHUs"). Each AHU may include multiple VAV terminal boxes to provide proper control of the zones. Further, such VAV systems may have the ability to run at part load when not at full capacity and have a higher level of independent room control than constant volume systems. The VAV terminal box may be used in a variety of building types, e.g. retail stores, auditoriums, office spaces, hospitals, churches, airports, casinos, education, pharmaceutical, data centers, factories and some larger homes.

In assembly, the VAV terminal box along with the air flow sensors may be supplied by sheet metal manufacturers. Controls companies may install the direct digital VAV controller ("DDC") with actuator and transducer after the fact, connecting into the air flow sensor and operating the damper shaft. Testing of VAV terminal boxes may include noise and leakage rates. In some cases, the VAV terminal box is oversized an installed in uncontrollable spaces or zones, thereby generating control problems that result in reduced indoor air comfort, increased energy costs, zone controllability problems and maintenance problems. The ASHRAE RP 1353 standard validates the poor performance of VAV terminal boxes with DDC controls at low flow.

A new standard, the ASHRAE TEST STD 195, which went into effect January 2014, requires for all inclusive testing of the VAV terminal box, air flow probe, transducer, and the DDC controller. The new standard requires specifiers and installers to view the controls and sheet metal as one assembly.

Traditional VAV terminal boxes in VAV systems have turndown ratios in the 5-1 range. Traditional laboratory control air terminals have slightly higher turndown ratios of up to 10-1 ratios. It is contemplated that the LFFC described herein may be incorporated into the VAV system described above and offer higher turndown ratios that are greater than 10-1, or greater than 100-1, or greater than 250-1. Turndown is important for a variety of reasons, including the following: 1) Accurate measurement of the air and water (glycol and water used interchangeably) volumes being supplied, particularly important in laboratories where infectious diseases and toxic chemicals are present. 2) fewer part numbers, i.e. fewer devices are required to cover operating ranges. This allows for fundamentally simpler designs and systems, including streamlining and/or combining product portfolios and reduced manufacturing costs. 3) Lower pressure drops providing quieter air/fluid delivery systems and lower energy costs and superior acoustics. 4) Reduced Life Cycle costs of the building and cost of ownership. 5) Lower installed and first cost due to fundamentally fewer components and simpler equipment sizing. 6) Stream-lined controls system architecture and software hosted in the cloud or through enterprise/legacy system. It is contemplated that the LFFC described herein provides a minimum turn down ratio of over 100-1 with respect to legacy device velocities, at a much more desirable energetically and acoustically FPM, depending on the design with multiple orifices, dampers and/or valves. This lends to fewer part numbers, lower manufacturing costs, lower system installed costs, smaller footprints, reduced cost of ownership and lifecycle, more standardized HVAC duct designs, quieter systems and less energy used to move fluids to the occupied zones.

Application of the LFFC in Dampers

In another embodiment, it is contemplated that the LFFC described herein provides an air flow damper assembly that can be used in conjunction with VAV or other HVAC systems. In particular, the damper assembly can be formed in many geometries and shapes, and used additionally or alternatively with existing damper devices, which may often be custom-ordered due to special size and configuration constraints. The damper assembly of the LFFC disclosed herein can be used in a variety of applications, including in emergency fire and smoke situations. In particular, the damper assembly of the LFFC may be utilized for turning air on and off and modulating in between the two extremes. The damper assembly disclosed herein may also be used in or with fan coils and unit ventilators that heat and cool spaces. Such unit ventilators may be similar to fan coils, but also introduce outside air into the ventilation system. Merely by way of example, unit ventilators may be larger with higher BTU capacities. Therefore, the high controllability of the damper assembly and/or LFFC disclosed herein may offer significant improvements in the efficiency of such systems.

In another aspect, it is contemplated that the damper assembly and/or LFFC disclosed herein can be used in laboratory spaces for fire and contamination control purposes, such as in fume hoods where chemical reactions take place. The damper assembly disclosed herein may also regulate the fresh air into hospital rooms.

In another aspect, the LFFC disclosed herein may provide a damper assembly for use in Central Building Air Handlers ("AHUs") to control air supply into the building, exhaust air out of the building, and mix the two air streams to conserve energy. The damper assembly disclosed herein may replace or be used in conjunction with an existing damper in the AHU to simplify control of the damping mechanism. The damper assembly disclosed herein may be used in ductwork and in air distribution devices which deliver air into the zone. Further, the damper assembly may be used in refineries and process applications, including industrial applications and air pollution equipment. Still further, it is contemplated that the damper assembly can be used in conjunction with thermal transfer devices, e.g. facilitate design of more efficient thermal transfer units, which may reduce energy, product, and installation costs. In another aspect, the damper assembly described herein may be controlled by controllers and tied into networks. In that case, the amount of equipment required and the amount of control points may be reduced, yielding more cost efficient control networks with sophisticated capabilities that can be integrated in buildings and controlled/monitored through cloud computing and centralized locations. In this way, the damper assembly and/or LFFC disclosed herein may utilize open source controls, as opposed to proprietary legacy systems.

Implementation and Operation of LFFC in HVAC Systems

It is contemplated that the LFFC described herein controls temperature and air flow for an HVAC system by utilizing air flow measurements and the damper configuration described herein, which allow for more precise air measurement and regulation. The LFFC may be retrofit into existing HVAC systems, replace and/or be used in conjunction with existing VAV terminal boxes, and/or be incorporated in new HVAC system designs.

In one aspect, the LFFC utilizes lower pressure models for controller delta-pressure ($\Delta P$) transducers. In this way, air pressure measurement enables or makes possible pressure independent control. Transducers are the most costly electronic element in typical HVAC VAV controllers. Furthermore, the LFFC can be used with more expensive pressure, silicon and electronic transducers for even greater control.

Control Algorithms—Pressure Independent PI Control of Temperature

The LFFC described herein may be utilized in pressure independent control of airflow, wherein the control of the airflow is independent of inlet air pressure conditions. For instance, when several LFFC devices are on the same supply air duct branch and each is opening and closing to control local zone temperature, they impact the air pressure down the supply duct. Pressure independent LFFCs may continuously measure the supply air CFM and adjust it to compensate for the variations in the supply duct and room space (zone).

The LFFC may further be used with a Pitot sensor for sampling air pressures in the conditioned air stream that is further piped to the air flow transducer on the DDC controller. In one embodiment, a dead end sensor is used, i.e. air does not flow through the sensor, which may prevent clogged sensors since air contaminates are not trapped therein. Such sensors may be implemented in hospital ventilation systems, since air in hospitals tend to be filled with lint, which clogs transducers. It is contemplated that the LFFC requires little or no maintenance, due at least in part to reliable air flow measuring for an extended period of time.

Air Velocity Measuring, CFM, Flow Coefficient and Calculations

Air in a duct has two components to be measured. The first component typically measures flow Total Pressure by creating a stagnation zone where air impinges directly on the face of the sensor. It is noted that the term "transducer" used herein will refer to a device that measures air pressure and converts to electrical signals that is located on or near the electronic DDC controller. The flow pickup or sensor is a metal device located in the airflow stream that samples the flowing air and sends to the transducer. The second air component measures static pressure, which pushes in every direction with the same force with or without air flow.

Air velocity is measured in feet per minute using the two air components, total pressure and static pressure, each measured separately and subtracted from one another to obtain velocity pressure, in accordance with Bernoulli's Principle. This pressure difference is referred to as delta pressure and it is abbreviated as ΔP. The mathematics of this measurement is as follows:

$$\Delta P = \text{Total Pressure} - \text{Static Pressure} = \text{Velocity Pressure} \quad \text{Equation 2 Total Pressure Equation}$$

Air velocity in feet per minute, abbreviated as FPM, is calculated relative to DP in inches H2O and fluid density in lb./ft3 using the following equation:

$$\text{Air Velocity in FPM} = 1097 * \sqrt{(\Delta P / \text{density})} \sim 4004 * \sqrt{\Delta P} \quad \text{Equation 3 Air Velocity Equation}$$

Readings of electronic pressure transducers in common use are highly dependent on ambient temperature. In high precision applications, "Auto-zeroing" greatly reduces this effect. Auto-zeroing involves connecting the transducer inputs together so that the transducer voltage drift at zero pressure can be measured and used to compensate readings with restoration of the transducer sensor connections. The sensor used herein may provide total pressure in the "High" pressure tube and the static pressure in the "Low" pressure tube. The subtraction is accomplished at the controller transducer by putting total pressure on one side of a diaphragm and static pressure on the opposite side. This provides a mechanical subtraction of the two separate signals.

Air velocity pressure is commonly measured in inches of water column. For reference purposes, there are 27.7 inches of water column in one PSI (6.89 kPa).

Air Volume Calculations $$CFM = FPM \times \text{Duct Area in square feet (as measured at LFFC inlet)} \quad \text{Equation 4 Total Volume CFM Formula}$$

$$\text{Duct Area (round duct)} = \pi \times (\text{duct diameter in feet}/2)^2 \quad \text{Equation 5 Duct Area Calculation}$$

Airflow in CFM (cubic feet per minute) is calculated from FPM (feet per minute) and multiplied by the LFFC inlet duct area or the opening area which the flow pickup sensor is located within. Airflow or velocity pressure ("VP") is the difference in the total pressure (Tp) and static pressure (Sp), or high and low. A cone around the Tp port artificially increases the Tp relative to the Sp, thereby making readings higher and more sensitive at low flows where pressures may become as low as 0.008 inches of water (1.992 Pa). In particular, the cone forms an obstruction that raises local velocity around its wake, thereby lowering the static pressure at the tap located therein and making the pressure differential readings higher.

Air flow may hit a front of the sensor where total pressure is measured. Static pressure may be measured behind the total pressure, such that none of the direct air influences the static pressure reading. The cone around the Tp port stabilizes the stagnation pressure at the port against upstream disturbances and lowers static pressure behind the cone by raising velocity locally in the flow surrounding the shadow zone behind the cone. This artificially amplifies VP=Tp−Sp. Amplification at low flows is highly desirable, where the VP becomes too small to be measured with a typical inexpensive pressure transducer. Since the reading is no longer representative of the actual flow, the amplification can be removed from the ultimate reading to arrive at an accurate air flow calculation. This may be performed by modifying a flow coefficient and/or the magnification coefficient.

A flow pickup may artificially depress Sp at the downstream tap to improve flow pickup sensitivity. To get a calibrated, accurate CFM (LPM) reading, this enhancement can be mathematically removed from CFM (LPM) readings. Further, duct inlet conditions in field locations vary dramatically and can negatively impact pickup sensor accuracy. To obtain a good reading, there may be three to five straight duct diameters of straight duct piping in front of the pickup. In some cases, this may be prohibited due to construction constraints. Flexible duct may be used to make short length connections between straight round duct other inlets. The flex duct imparts a circular swirl to incoming air.

The flow pickups may have multiple ports to get an average of pressures. If duct inlet conditions are less than optimal and air piles up, the maximum flow reading can be adjusted to be more accurate using a flow coefficient. Note the calibration adjustment can take place only at one flow reading and this is always maximum airflow. This means that at all other readings the pickup & transducer combination calculate may be slightly inaccurate; the modulating closed loop control will adjust the air flow to a flow that is necessary to thermodynamically balance the temperature of the room. Various air volumes of interest may include a maximum, minimum, and zero volume.

In other aspects, horizontal or diagonal set of pipes may be used to collect air samples. Such ducts may be bent only in the horizontal dimension, such that averaging the air sample in the vertical dimension is not critical.

Furthermore, a relationship between ΔP and CFM (LPM) may be plotted. To make such a plot linear, the scale may be log X, log Y. It is contemplated that there is no intrinsic difference between multiplying $\sqrt{\Delta P}$ by C and multiplying ΔP by $C^2$ before taking the square root. However, if C is large, there is a big difference in the scale at which the controller performs the multiplication and the square root.

$$CFM = \text{Flow Coefficient} \times 4004 \times \sqrt{\Delta P} \times \text{Duct Area} \quad \text{Equation 6 Total Air Volume Calculation}$$

Flow pickup adjustment may be positive, thereby increasing the smallest measurable flow rate. Consequently, the Flow Coefficient, which adjusts for the flow pickup gain, may be a fraction less than one and the reciprocal of the pickup gain or slope.

Air Velocity Transducers

It is contemplated that the LFFC described herein can be used in conjunction with various sensor technologies in HVAC applications. The sensor can be a printed circuit board ("PCB") mounted sensor, such as the Honeywell Microswitch and Kavlico sensor. The sensor can also be a standalone transducer, such as devices made by Setra. It is contemplated that any sensor can be used in conjunction with the HVAC controls. Merely by way of example, a PCB mounted transducer may be used in HVAC systems as well as fuel injection systems in automobile engines.

The Honeywell device is a micro-machined bridge using hot wire anemometer principles. Anemometers are by design optimized for very low air flows. The second sensor Kavlico is a dead ended diaphragm sensor. It becomes more accurate as airflow increases. Its automotive heritage makes it a very rugged device. The third device is a capacitive based transducer manufactured by Setra and is very widely used in HVAC field mounted controls. It is very rugged as well. The table below provides specifications for a sensor, such as the Kavlico transducer, contemplated herein.

TABLE 1

| Possible specifications for a pressure sensor described herein | |
| --- | --- |
| Pressure Range | 0-1.5 inches of H2O (373 Pa) |
| Supply Voltage | 0-5 VDC |
| Output | .25-4.0 VDC |
| Error Band | 2% of FS |
| Operating Temperature | 0-60° F. (−17.7-15.5° C.) |

Controller I/O Scanning Times

It is contemplated that the controller utilized in conjunction with the LFFC 100 ma scan, i.e. make A/D to conversions, once a second. Analog input data may be updated once a second. Loop calculation rates may also be made at the same rate. The rate at which the controller calculates the loop outputs may directly affect the size of the gain parameters. It is contemplated that loop output calculation is scheduled on regular intervals to enhance controller performance.

Air Velocity Averaging & Electrical Noise Concerns

Air velocity readings may vary widely. Readings can be averaged to obtain consistent control action. In some aspects, this may be accomplished by using a 4 byte or 8 byte adding FIFO buffer, and then performing a 2 or 3 step bit rotate to divide the number by 4 or 8. This method may average the data, with new incoming data and old data rotating out. If performing the averaging in a high level programming language in decimal format, it is contemplated that the following Equation 9 can may be used.

$$\mu = \Sigma \text{Air Velocity Readings } (FIFO)/ (\text{Number of measurements}) \quad \text{Equation 7}$$

Averaging Algorithm used with Air Velocity Measurement to smooth turbulent readings Electrical noises on the room temperature readings may disturb control action. When a large step change goes through the P equation, the control loop proportional gain multiplies the step and the controller remembers the change in subsequent calculations. It is contemplated that good A/D conversions is important and free from spurious electrical noise. Such conversions should be consistently reliable, whereas all common mode 60 Hz noise is removed. Well-designed instrumentation amplifiers may guarantee clean, noiseless A/D conversions.

Controller Hardware RS 485 Twisted Pair Galvanic Isolation Network Interfaces

RS 485 refers to a transmission standard that uses differential voltages to code transmission data for multipoint, multi-drop LAN systems. RS 485 is the de facto standard for HVAC Building Automations System LAN networks.

Many semiconductor manufacturers make RS 485 interface chips that follow similar industry guidelines. Equation 10 below may describe a RS 485 chip Common Mode Voltage rejection ratio. The RS 485 maximum Vcm rejection is specified as −7V to +12V.

$$Vcm = Vos + Vnoise + Vgpd$$
(Ref: National Semiconductor) Equation 8
RS485 Hardware Interface Electrical Limits This equation shows that if any of the above parameters exceed −7V to +12V, the chip fails to remove common mode noise. A key parameter when discussing galvanic isolation is Vgpd or voltage ground potential difference. Anytime the grounds between successive LAN nodes exceed the specified limits, the network fails. Nodes can be separated by thousands of feet. In cases when a 24 VAC is miswired, the controller may be forced to be 24 VAC above ground and cause network failure. To alleviate problems, using a transformer or a DC to DC converter may galvanic isolate the RS 485 interface. It may further keep RS 485 chips from burning due to wiring faults.

Triac Motor Driver Circuitry and Protection, Different Vendor Products

It is contemplated that pressure independent controls may be operated with actuators having interfaces called 3 point or floating modulating. One such actuator may be a Belimo actuator that is double insulated. In floating point control, the controller microprocessor sends the actuator to full close by sourcing 24 VAC to the CW or CCW wires. Only one wire can be energized at a time. Energizing both wires at the same time causes the actuator to freeze and heat up. One wire rotates the actuator in one direction and one rotates the actuator in another direction. The percentage the damper blade moves may be determined by a run time or time 24V is applied to the CW or CCW wire. Direction is reversed by applying signal to the other wire. Direct action refers to actuator movement that opens the damper when temperature increases. Reverse action refers to actuator movements that closes the damper when temperature increases.

Tabulated below are representative actuator manufacturers' data. The key item in the table is the actuator run time. For a controller to accurately calculate damper blade percentage open, the controller can be configured to the correct run time. Generally, operation in the 60 second time frame is preferred. Faster actuation may be used in laboratory control. For instance, the 35 second actuator below is a laboratory actuator and is used on VAV controllers for pressurizing laboratories.

TABLE 2

| Possible Actuator Motor Specifications | | | |
| --- | --- | --- | --- |
| Manufacturer | Product No. | Torque | Running Time |
| Belimo | LM24 | 45 in-lbs. (5.08 Nm) | 95 Seconds |
| Belimo | LM24 | 35 in-lbs. (3.05 Nm) | 35 Seconds |
| Siemens | GDE | 44 in-lbs (4.97 Nm) | 108 Seconds |
| JCI | M9104 | 35 in-lbs (3.05 Nm) | 60 Seconds |

UL Specifications, UL916 Low Voltage Regulating Equipment

UL916 is the standard of choice for building controls. UL916 is for low voltage regulating equipment or control equipment that energizes or de-energizes electrical loads to achieve a desired use of electrical power. The equipment is intended to control electrical loads by responding to sensors or transducers monitoring power consumption, by sequencing, by cycling the loads through the use of preprogrammed data logic, circuits, or any combination thereof. Summarized below are the key design concerns related to UL compliance:

PCB digital output traces thickness in ounces of copper, width and separation to adjacent traces.

Class 2 transformers, PC mounted relays, PCB manufacturer; plastic molder all can be UL recognized components/manufacturers.

Plastic material used in the plenum air space, 94-VO flame retardant epoxy.

Mixing NEC Class 1 line voltage with Class 2 low voltage in same enclosures.

UL Specifications, UL864 Smoke Control

The products covered by this UL standard are intended to be used in combination with other appliances and devices to form a commercial fire alarm system. These products provide all monitoring, control, and indicating functions of the system. The criteria for compliance with this standard are significantly higher than UL916 and involve all the components that make up a system. For an LFFC and/or LFFC incorporated in a Zone Control Unit ("ZCU") to comply with this standard, the controller, metal enclosure, transformers and wiring can form a complete approved solution. An UL864 compliant ZCU may fit into an entire control system with other hardware, software and mechanical components to form a commercial fire alarm smoke control system.

UL tests cover life safety issues and functionality of the tested device. In that regard, UL tests may force fundamental design decisions and tradeoffs to be made prior to a product becoming manufacturing ready. To comply with this standard, the "Controller under Test" should pass the test described in Section C.

Opportunities in a Segmented Industry where Equipment and Controls Remain Separate It is contemplated that the LFFC described herein and/or the central system may be controlled electronically with Direct Digital Control (DDC) or with pneumatic (air) control systems. Digital systems are computer controlled systems that can employ sophisticated calculations and algorithms to implement control sequences. Pneumatic systems use air signals to change control sequences. As mentioned earlier, pressure independent refers to controller ability to measure air flow and ride through system variations that result when different zones within the building put different loads on the heating and cooling system.

Digital control systems have many advantages. They do not require frequent calibration, last longer, and do not require air compressors equipped with special air dryers and lubrications systems. DDC systems can perform complex calculations and sequences. DDC systems can receive instructions from a master computer and share data with multiple operators located anywhere with a Web interface. Further, DDC systems transmit to master front end computers information such as damper and valve position, room temperature, supply air quantity, and supply air temperature.

Multi-Zone AHU System

The LFFC described herein may be used in a central air, or a multi-zone system that meets the varying needs of multiple and different zones within larger buildings. Such systems may be a mix of centralized and zone HVAC equipment. Multi-zones have a separate supply air ducts to serve each zone in a building. There is a heating and cooling water (glycol and water used interchangeably) coil in the central air handling unit. Both coils are in operation at the same time. Dampers after the coils mix the hot and the cold supply air to the temperature are needed to satisfy each zone. The supply air to each zone is mixed to a temperature somewhere in between the hot and the cold supply air.

Dual Duct AHU System

The LFFC described herein may further be incorporated in a dual duct system that has two separate supply ducts from the HVAC unit to the outlets in the spaces. One duct supplies cold air, and the other supplies heated air. In this system both the heating and cooling coils operate at the same time, just as with the multi-zone system, but at the zone level. The hot air and the cold air are mixed with dampers at each zone in order to obtain the air temperature needed for that zone. This system comes in many variations, including variable air volume, constant volume, fixed temperature and variable temperature.

Variable Air Volume Systems

The LFFC 100 described herein may be utilized in a variable air volume (VAV) system to be more energy efficient and to meet the varying heating and cooling needs of different building zones. A zone may be a single room or cluster of rooms with the same heat gain and heat loss characteristics. Such a VAV system can save at least 30 percent in energy costs as compared to conventional systems. In addition, it is contemplated that the LFFC 100 is economical to install and to operate. In some embodiments, the system utilizes 55° F. (10° C.) primary air. Room thermostats may control the amount of primary air delivered to each zone through modulating dampers or diffusers for each zone. Such dampers may vary the volume of air to each zone according to the cooling needs.

In some aspects, the fan CFM output may be varied according to the total need of the zones. The fan may be sized with diversity ~90% of worst case load. As the air volume for the zones vary, the static pressure (SP) in the main duct may vary. A SP sensor in the main duct may control the fan output to maintain a constant supply duct static pressure. Further, the fan output may be varied either by fan inlet vanes or by a damper at the fan outlet. These systems may be variable volume, constant temperature. In some systems that provide cooling only, a separate source of heat may be utilized as needed for outer rooms. This may be supplied by perimeter heating in the rooms. Other units in the system may include a water coil and control valve to provide heating. A big advantage of VAV systems that utilize the LFFC described herein is that they are able to meet the comfort requirements of different zones in a building without heating and cooling at the same time.

Pressure Independent Control for Air and Water Systems

Such VAV systems incorporating the LFFC described herein may be either pressure dependent or pressure independent. In a pressure dependent system, the volume of air supplied by the unit containing the LFFC may vary depending upon the static pressure (SP) in the primary air duct. The primary-air damper in the unit may further be controlled by a thermostat in the space. However, the airflow through the damper may vary according to the SP in the main duct. Units that are close to the supply fans may oversupply primary air, while units farthest from the supply fan may undersupply primary air.

On the other hand, pressure independent terminal units may include flow sensing devices that limit the flow rate through the unit. They may control the maximum and minimum CFM (LPM) that can be supplied and are therefore independent of the SP in the primary air duct. It is contemplated that pressure independent systems can be balanced and can allow the correct airflow from each terminal.

Varying Central Supply Air Fan

It is contemplated that the volume (CFM/LPM) of primary air delivered by the central air handling unit can vary according to the demands of the individual units containing the LFFC's in the system. In this way, the supply fan in the central air handling unit may vary its output in order to meet the needs of all the units. If the primary air dampers of terminal units are full open, the CFM (LPM) required for the entire system may be high. If most unit dampers are closed, the CFM (LPM) required for the system may be less.

The RPM (speed) of the central supply fan may be regulated by the control system to meet the changing demands of the system. A static pressure (SP) sensor in the primary air duct may send a signal to a controller that regulates the fan speed to maintain a constant SP in the primary air duct. The location of the SP sensor in the primary duct is critical to the performance of the system. It may be best placed near the unit that is most difficult to supply, i.e., furthest from the central system. This may be the location that has the greatest pressure drop from the fan. If the sensor is placed too close to the supply fan, the SP in the supply duct may be too high during periods of low CFM demand.

Applications of the LFFC in Burners and Boilers

It is contemplated that the LFFC described herein may be utilized for burner boiler fluid control. Merely by way of example, the LFFC can be utilized in a large fire tube boiler, which can mix natural gas and air in the burner to produce a flame that converts water to steam. The steam may be used to heat buildings and industrial processes. Large equipment efficiencies are important, since small changes in efficiency translate into large changes in fuel input. Therefore, the LFFC can be applied for high turndown air control in burner boilers.

In particular, new energy efficiency standards drive burner boiler manufacturers toward $O_2$ trim control. In $O_2$ trim control, burner exhaust gas $O_2$ concentrations are monitored and used to modulate gas and supply air to obtain the highest efficiency air/fuel mixture or Stoichiometric ratio. Tracking controls proportion fuel and air ratios by applying the Bernoulli equation. As combustion air and gas flow change through metering devices, air pressure changes with the square of air and/or gas velocity. The blower and damper are adjusted together. It is contemplated that the LFFC be applied to both the air blowers and fuel metering valves to more precisely meter air into the combustion chamber and allow boiler to throttle down further. The LFFC may be used alternatively or in combination with linkage-less actuators that are currently used in burner boilers.

It is noted that CFM measurement may not be required from the LFFC in burner boiler applications. Rather, the LFFC provides the high turndown resolution on both the air and fuel side. The combustion controller frequently does not need to calculate the mass air flow rate and simply positions the damper so the control feedback variable, $O_2$ approaches the set point value.

Industrial Applicability

The LFFC described herein has application in any industrial sector that measures and throttles air or fluids. Such industrial sectors may include, but are not limited to: Biotechnology and drugs, Hospitals and Healthcare, Laboratories and Pharmaceuticals, Pollution and Treatment Controls, Water Utilities, Treatment and Filtration, Selected Manufacturing Industries, Semiconductor fabrication, Mining and Metals, Data Centers, and Diversified Machinery and Farming.

It is contemplated that multiple industrial applications are possible for the LFFC due to the accurate turndown of the damper design, advanced firmware, and software integration. For example, the LFFC can be used in devices for controlling multiple zones through multiplexing of dampers commensurate to thermal conductivity requirements and resetting of ancillary equipment such as fans, pumps, chillers and boilers at the zone level or system level. Localized zone heating and cooling now becomes affordable as several devices are being incorporated into one. This permits shutting down or going to minimum set points in unoccupied zones, thus conserving energy and maintaining IAQ and occupant comfort. The high turndown and accurate flow measurement makes the LFFC a natural integration into process type applications and refineries where an accurate air fuel mixture is commonly required resulting in increased productivity and reduced energy costs. The LFFC can be made out of various materials for caustic environments and various ancillary components such as sensing elements, transducers, firmware and software.

It is contemplated that the invention disclosed herein provides for a device that measures and regulates high and very low volumes of air and/or fluid flows with precision, inexpensively and with superior acoustics and less energy. The disclosure also provides for a high turndown device that permits use at lower velocities, greatly reducing noise generation and eliminating the need for sound-attenuating liners such as fiberglass and double walls. Further, the disclosure provides for a high rangeability device that allows streamlining product portfolios by combining several product part numbers into much smaller number of offerings. In another aspect, the disclosure provides for an inexpensive device that allows equipment to be scaled back 100-1 or higher, rather than 10-1, which leads to energy savings, fewer product variations simpler and more robust application designs. Still further, the disclosure provides for a device that provides better fluid, air volume and water temperature control, while conserving more energy, employing a fundamentally simpler design and meeting all new and old building fresh air, comfort and energy codes. The disclosure is also directed to a device that can be engineered, selected, and sized without sophisticated software programs.

Related Device, System, and Method Embodiments

Figure 12:
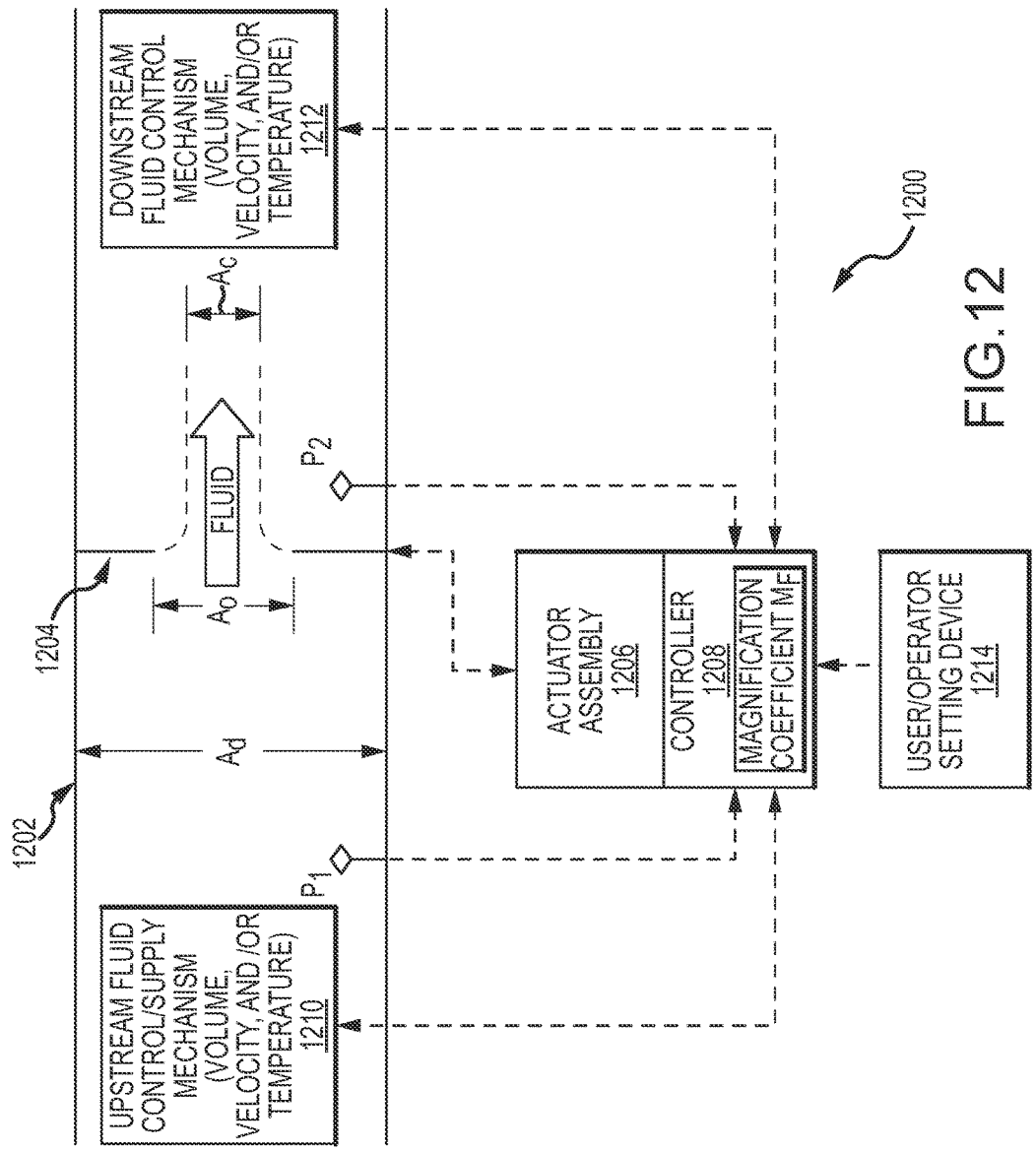
FIG. 12 depicts aspects of low flow fluid control systems and methods according to embodiments of the present invention.

FIG. 12 depicts aspects of a fluid system 1200 according to embodiments of the present invention. As depicted here, system 1200 can include a device for measuring and controlling a fluid flow. In some cases, the fluid flow can be through a flow pathway in a duct 1202 of a heating, ventilation, and air conditioning (HVAC) system. The device can include an orifice plate 1204 positioned within the flow pathway and defining a variable opening $A_o$ for receiving flow therethrough. In some cases, the system or device can include an actuator assembly 1206 in operative association with the orifice plate 1204. As shown here, the system or device can also include a controller 1208 in operative association with the actuator assembly 1206, orifice plate 1204, or both. The controller 1208 can include a processor, and a memory communicatively coupled with and readable by the processor. Further, the controller memory can include stored processor-readable instructions that, when executed by the processor, cause the processor to determine a pressure differential based on a first pressure measurement obtained by a first sensor $P_1$ and a second pressure measurement obtained by a second sensor $P_2$. In some cases, the instructions cause the processor to determine a position, configuration, or orientation of the plate 1204 (or components thereof), for example based on a position feedback received from the actuator assembly 1206. In some cases, the instructions cause the processor to operate the actuator assembly 1206 so as to regulate the variable opening $A_o$ based on the pressure differential and the position, orientation, or configuration of the plate 1204.

According to some embodiments, processor-readable instructions, when executed by the processor, cause the processor to determine one or more of (i) a pressure differential based on a first pressure measured upstream of the damper assembly or plate 1202, for example by sensor $P_1$, and a second pressure measured downstream of the damper assembly or plate 1202, for example by sensor $P_2$, (ii) a variable opening area $A_o$ defined by the damper assembly or plate 1202, (iii) a magnification coefficient $M_F$, and (iv) a flow rate based on the pressure differential and the magnification coefficient.

In some cases, operation of the plate 1204, the actuator assembly 1206, an upstream fluid control and/or supply mechanism 1210, and/or a downstream fluid control mechanism 1212, as controlled by the controller 1208, can be based on input received by the controller 1208 from a user/operator setting device 1214, the plate 1204, the actuator assembly 1206, the upstream fluid control and/or supply mechanism 1210, the downstream fluid control mechanism 1212, the upstream sensor $P_1$, and/or the downstream sensor $P_2$.

Torricelli (1643) observed that water issuing from a small hole in a large tank contracts as it passes through the hole. Newton also noticed the contraction in the vein of issuing water and called the phenomenon the Vena Contracta. Newton measured the contracted area to be about half the orifice area, and published this in the $2^{nd}$ edition of his Principia (1713). In 1738 Bernoulli published his famous principle:

$$SP + \frac{1}{2}\rho v^2$$

is conserved along flow streamlines. In modern terminology TP (total pressure)=SP (static pressure)+VP (velocity pressure) constant on streamlines. So, if $\Delta p$ is the difference in static pressure inside the tank (at the level of the opening but far away so the velocity can be taken as 0) vs outside the tank, then $\frac{1}{2}\rho v^2 = \Delta p$. Newton's Law of conservation of momentum, applied to fluids, gives $\rho v^2 A_o = \Delta p A_o$, $A_o$ the area of the opening, for one unaware of the Vena *Contracta*. This contradicts the previous equation unless $A_o=0$: no "vein." Borda (1760) noticed that the momentum balance becomes $\rho v^2 A_c = \Delta p A_o$, $A_c$ the area of the contracted flow, when one takes the Vena Contracta into account, and the contradiction disappears if $$\frac{A_c}{A_o} = \frac{1}{2},$$

where $$\frac{A_c}{A_o} = \frac{\text{Area of contracted stream}}{\text{Area of orifice} = \pi r_o^2}.$$

Embodiments of the present invention encompass systems and methods that provide consistency between nature and nature's laws for $$\frac{A_c}{A_o},$$

for example between 0.536 and 0.753.

In some cases, an infinite reservoir with a flat wall containing an orifice of area $A_o$ is assumed, along with axisymmetric flow about a circular hole of radius $r_o$. The flow can be complex in the area of the opening, but simple far upstream and beginning a short distance downstream of the hole. Upstream, at a radius $r \gg r_o$, the flow can become uniformly radial inward on concentric hemispheres:

$$v_r \to -\frac{Q}{2\pi r^2},$$

where Q is the total flow; $v_\theta = v_\varphi = 0$. $r \gg r_o$ [Equation (12.1)]. Equation 12.1 can satisfy the incompressible Navier-Stokes equation in that region. Downstream of the Vena *Contracta* the flow can be characterized as follows: velocity is 0 outside of $A_c$, with uniform parallel flow (Velocity $v_c = Q/A_c$) in the z direction within $A_c$ downstream of the region of contraction.

According to some embodiments, viscosity and, at the indicated scale, gravity are not at issue. With water issuing into still water or air into air, viscosity soon diffuses away the shear boundary of the vein and the flow spreads in a generally turbulent fashion. Nonetheless, the contracted jet does persist over a sufficient distance to validate aspects of the analysis provided herein. In some cases, it is possible to balance the z component of Force and Momentum Flux. The other components can be balanced automatically in axisymmetric flow. The terms "Force and Efflux" can refer here to respective components in the z direction. Although Bernoulli's equation applies individually to each streamline, all streamlines in the present flow arise from uniform still fluid at r=∞, so Total Pressure (TP) can reasonably be equated on all streamlines. According to some embodiments, this can't be said for the still fluid downstream of the plate, which does not originate in the upstream reservoir, need not even consist of the same type of fluid, and will be seen to have a uniform TP less than the TP just defined for the flow originating upstream.

$$S_1: \text{Efflux} = -\int_{S_1} \rho v v_2 \, dS \quad \text{(Equation 12.2a)}$$
$$= -\rho\left(\frac{Q}{2\pi r_1^2}\right)^2 (2\pi r_1^2)$$
$$\int_0^{\pi/2} \cos\theta \sin\theta \, d\theta$$
$$= -\left(\frac{\rho Q^2}{4\pi r_1^2}\right) r_1 \gg r_o$$

$$\text{Force} = \int SP_1 \cos\theta \, dS \quad \text{(Equation 12.2b)}$$
$$= \left(TP - \frac{\rho}{2}\left(\frac{Q}{2\pi r_1^2}\right)^2\right) 2\pi r_1^2$$
$$\int_0^{\pi/2} \cos\theta \sin\theta \, d\theta$$
$$= TP\pi r_1^2 - \left(\frac{\rho Q^2}{8\pi r_1^2}\right) r_1 \gg r_o$$

$$S_2: \text{Efflux} = \rho V_c^2 A_c = \rho \frac{Q^2}{A_c} \quad \text{Equation 12.3}$$

Forces on $S_2$ and downstream face of $S_o$ balance for $r \geq r_0$, leaving $$\text{net Force} = -SP_c A_o \quad \text{(Equation 12.4)}$$
$$= -\left(TP - \frac{\rho}{2}\left(\frac{Q}{A_c}\right)^2\right) A_o \text{ for } r < r_0.$$

$$S_o: \text{ of upstream face of plate} = \quad \text{(Equation 12.5)}$$
$$-\int SP dS_0 = -\int_{r_0}^{r_1} \left(TP - \frac{\rho}{2} v_r^2\right) 2\pi r \, dr =$$
$$-TP(\pi r_1^2 - \pi r_0^2) + \frac{\rho}{2}\int_{r_0}^{r_1} v_r^2 2\pi r \, dr.$$

TP terms cancel leaving $$\frac{1}{r_1^2}$$

terms which drop out when we let $$r_{1\to\infty}.\frac{\rho Q^2}{2}$$

will then factor out of remaining terms, if we write $$-v_r = \frac{Q}{2\pi r^2}(1+f): \begin{matrix} f \to 0 \\ r \to \infty \end{matrix}, v_r \approx -\frac{Q}{4\pi r^2}$$

asymptotically for $r \gg r_0$, but continuity of v along the constant velocity, constant pressure streamlines issuing downstream from the orifice edge requires $$-v_r(r_0) = v_c = \frac{Q}{A_c} > \frac{Q}{2\pi r_0^2} = \frac{Q}{2A_o} \cdot \left(\frac{A_c}{2A_o} \approx \frac{.62}{2} = .31\right).$$

Setting $$f(a_o) = \frac{2\pi r_0^2}{A_c} - 1$$

accomplishes this.

$$v_r^2 = \left(\frac{Q}{2\pi r^2}\right)^2 + \left(\frac{Q}{2\pi r^2}\right)^2 f(2+f),$$

and $$\begin{aligned}\frac{\rho}{2}\int_{r_0}^{r_1} v_r^2 2\pi r dr &= \frac{\rho Q^2}{2}\int_{r_0}^{r_1}\left(\frac{1}{2\pi r^2}\right)^2 2\pi r\, dr + \\ &\quad \frac{\rho Q^2}{2}\int_{r_0}^{r_1}\left(\frac{1}{2\pi r^2}\right)^2 f(2+f)2\pi r\, dr \\ &= \frac{\rho Q^2}{2}\int_{r_0}^{r_1}\frac{1}{2\pi}r^{-3}dr + \\ &\quad \frac{\rho Q^2}{2}\int_{r_0}^{r_1}\frac{1}{2\pi}r^{-3}f(2+f)dr \\ &= \frac{\rho Q^2}{2}\frac{1}{2\pi}\frac{r^{-2}}{-2}\bigg]_{r_0}^{r_1} + \\ &\quad \frac{\rho Q^2}{2}\int_{r_0}^{r_1}\frac{f(2+f)}{2\pi r^3}dr \\ &= \frac{\rho Q^2}{2}\left(\frac{1}{4\pi r_0^2}-\frac{1}{4\pi r_1^2}\right) + \\ &\quad \frac{\rho Q^2}{2}\int_{r_0}^{r_1}\frac{f(2+f)}{2\pi r^3}dr.\end{aligned}$$ (Equation 12.6)

Note:

$$\begin{aligned}f(a_o)(2+f(a_o)) &= \left(\frac{2\pi r_0^2}{A_c}-1\right)\left(\frac{2\pi r_0^2}{A_c}+1\right) \\ &= \left(\frac{2\pi r_0^2}{A_c}\right)^2 - 1 \\ &= \left(\frac{2A_o}{A_c}\right)^2 - 1.\end{aligned}$$

Letting $r_{1-\infty}$ now and factoring out $$\frac{\rho Q^2}{2},$$

the force-efflux balance becomes $$\frac{A_o}{A_c^2} + \frac{1}{4A_o} + \int_{r_o}^{\infty}\frac{f(2+f)}{2\pi r^3}dr = \frac{2}{A_c}.$$ (Equation 12.7)

We put this in dimensionless form by 1) multiplying through by $A_o$:

$$\left(\frac{A_o}{A_c}\right)^2 - 2\left(\frac{A_o}{A_c}\right) + \frac{1}{4} + A_o\int_{r_o}^{\infty}\frac{f(2+f)}{2\pi r^3}dr,$$

and 2) passing to a dimensionless variable $$x = \frac{A_o}{\pi r^2} = \left(\frac{r_o}{r}\right)^2$$

so $$dx = -\frac{2A_o}{\pi r^3}dr,$$

giving:

$$\left(\frac{A_o}{A_c}\right)^2 - 2\left(\frac{A_o}{A_c}\right) + \frac{1}{4} + \frac{1}{4}\int_0^1 f(2+f)dx = 0$$ (Equation 12.8)

$$\frac{Q}{2\pi r^2}$$

represents the lowest order (n=0; mass flow) term in an expansion of the axisymmetric potential flow in the upstream infinite hemisphere using harmonic potentials $$\varphi_{2n} = \frac{P_{2n}(\cos\theta)}{r^{2n+1}}.$$

The even order Legendre Polynomials $P_{2n}(\cos\theta)$ form an orthogonal basis on $$\left[0, \frac{\pi}{2}\right],$$

and the flow terms $\propto \nabla \varphi_{2n}$ give radial velocities $$\frac{c}{r^{2n+2}}$$

at the boundary $$\theta = \frac{\pi}{2};$$

the upstream surface of the orifice plate. We take $$f_n = \left(\frac{2A_o}{A_c} - 1\right)\left(\frac{r_o}{r}\right)^{2n} = \left(\frac{2A_o}{A_c} - 1\right)x^n$$

there, so $$-V_r = \frac{Q}{2A_o} x \left(1 + \left(\frac{2A_o}{A_c} - 1\right)x^n\right),$$

so $$\frac{1}{4}\int_0^1 f_n(2 + f_n)\,dx =$$

$$\left(\frac{A_o}{A_c}\right)^2 \frac{1}{2n+1} + \left(\frac{A_o}{A_c}\right)\left(\frac{1}{n+1} - \frac{1}{2n+1}\right) - \frac{1}{4}\left(\frac{1}{n+1} - \frac{1}{2n+1}\right),$$

so Equation 12.8 becomes $$\left(\frac{A_o}{A_c}\right)^2\left(1 + \frac{1}{2n+1}\right) - \qquad \text{(Equation 12.9)}$$
$$2\frac{A_o}{A_c}\left(1 - \frac{.5}{n+1} + \frac{.5}{n+1}\right) + \frac{1}{4}\left(1 - \frac{2}{n+1} + \frac{1}{2n+1}\right),$$

and $$\frac{A_c}{A_o} = \frac{1 + \frac{1}{2n+1}}{1 - \frac{.5}{n+1} + \frac{.5}{2n+1} + \sqrt{\left(1 - \frac{.5}{n+1} + \frac{.5}{2n+1}\right)^2 - \frac{1}{4}\left(1 + \frac{1}{2n+1}\right)\left(1 - \frac{2}{n+1} + \frac{1}{2n+1}\right)}} \qquad \text{(Equation 10)}$$

Values of the contraction coefficient $$\frac{A_c}{A_o}$$

using a single higher order $\varphi_{2n}$ are plotted in the table below.

| n | $\frac{A_c}{A_o}$ |
|---|---|
| 1 | .753 |
| 2 | .675 |
| 3 | .638 |
| 4 | .617 |
| 5 | .603 |

-continued

| n | $\frac{A_c}{A_o}$ |
|---|---|
| 6 | .593 |
| 7 | .585 |
| 8 | .58 |
| ↓ | ↓ |
| ∞ | .536 |

The lower limit 0.536 is rigorous and obtainable independently and for more general orifice shapes, without recourse to the axial symmetry and zonal harmonics employed above. According to some embodiments, the upper limit 0.753 is dependent on a single higher harmonic $\varphi_{2n}$ dominating the flow. A more complex model can provide values to non zero coefficients for more, possibly all, of the $\varphi_{2n}$ would be needed to further narrow the range of, or possibly completely define, $$\frac{A_c}{A_o}.$$

According to some embodiments, including more zonal harmonics just fills in $$\frac{A_c}{A_o}$$

between the table above and also a bit above 0.753.

The preceding can stand as a limiting case of ducted orifice plates for $$\frac{A_o}{A_d} \to 0 \text{ (duct area } A_d \to \infty\text{)}.$$

A similar analysis can apply for finite $A_d$.

With regard to a ducted orifice plate for measuring fluid flow, for an orifice in a duct the contraction ratio $$\frac{A_c}{A_o}$$

may not remain constant at values of 0.61 or 0.62 as $$\frac{A_o}{A_d} = \frac{\text{orifice area}}{\text{duct area}} \to 1:$$

at $$\frac{A_o}{A_d} = 1$$

there is no orifice plate, so $$\frac{A_c}{A_o} = 1$$

also. In 1872 Weisbach summarized contemporary experimental results in the expression $$\frac{A_c}{A_o} = .62 + .38\left(\frac{A_o}{A_d}\right)^3. \quad \text{(Equation 12.11)}$$

It is possible to test (Equation 12.11) and similar expressions for compatibility with z-force and momentum and mass flux balance:

On $S_1$, z-flux = $-\rho V_d^2 A_d$

On $S_2$, z-flux = $\rho V_c^2 A_c$

On $S_1$, z-force = $SP_d A_d = TPA_d - \frac{\rho v_d^2}{2} A_d$

Here, we take TP constant across streamlines far upstream, with duct face velocity $v_d$. The periphery of the upstream surface of the orifice plate is a stagnation zone: $V=0$, so $SP=TP-0=TP$ there. The velocity along the upstream face has been observed to increase to $V_c$ as it nears the edge of the opening, so SP drops from TP to $TP-VP_c$ at the edge.

For $r>r_o$ forces in the back of the orifice plate and at $S_2$ are in balance, leaving net force $$-SPA_o = -\left(TP - \rho \frac{v_c^2}{2}\right) A_o.$$

For duct radius $r_d \gg r_o$, it is possible to expect a region of radial flow $$v_r = -\frac{Q}{2\pi r^2},$$

with departures near $r=r_o$ and $r=r_d$.

Embodiments of the present invention encompass $f_n$ satisfying conditions at $r=r_o$, or $$x = \left(\frac{r_o}{r}\right)^2 = 1.$$

According to some embodiments, $1+f$ vanishes at the stagnation point $r_d$, where the plate meets the duct at 90°. It is possible to plot the $(1+f)^2$ and $(1+f_n)^2$ integrands. It is possible to seek $$x_o \text{ s.t. } \int_{x_o}^1 (1+f_n)^2 = \int_{A_o/A_d}^1 (1+f)^2.$$

Replacing the lower limit of integration 0 in (Equation 12.8) with $x_o$ expands (Equation 12.10) to $$\frac{A_o}{A_c} = \frac{1 + \frac{1 - x_o^{2n+1}}{2n+1}}{1 - \frac{1 - x_o^{n+1}}{2(n+1)} + \frac{1 - x_o^{n+1}}{2(n+1)} + \sqrt{\left(1 - \frac{1 - x_o^{n+1}}{2(n+1)} + \frac{1 - x_o^{n+1}}{2(n+1)}\right)^2 - \left(1 + \frac{x_o^{2n+1}}{2n\pi}\right)\left(\frac{1 - x_o}{4} - \frac{1 - x_o^{n+1}}{2(n+1)} + \frac{1 - x_o^{n+1}}{4(n+1)}\right)}} \quad \text{Equation 12.12}$$

According to some embodiments, $x_o$ is not constant and it catches up with $$\frac{A_o}{A_d}$$

as $$\frac{A_o}{A_d} \to 1$$

and the integral vanishes. A choice for this function, $$x_o = \frac{A_o}{A_d}\left(\varepsilon + (1-\varepsilon)\frac{A_o}{A_d}\right),$$

yields a good match between Weisbach's curve and $A_c/A_o$ from (Equation 12.12), with $\varepsilon=0.2$ and $n=4$.

These results in hand, it is possible to proceed to examination of orifice plate flow/discharge coefficients.

Bernoulli's Principle relates velocities and pressures along streamlines: at arbitrary points 1 and 2 on any streamline, $$SP_1 + \rho\frac{v_1^2}{2} = SP_2 + \rho\frac{v_2^2}{2}. \quad \text{Equation 12.13}$$

For flow uniform across areas $A_1$ and $A_2$ enclosing the same bundle of streamlines, and with Q the common total flow through the $A_i$, (Equation 12.13) becomes $$\Delta P = \quad \text{(Equation 12.14)}$$
$$SP_1 - SP_2 = \frac{\rho}{2}\left(\frac{Q}{A_2}\right)^2 - \frac{\rho}{2}\left(\frac{Q}{A_1}\right)^2 = \frac{\rho Q^2}{2}\left(\frac{1}{A_2^2} - \frac{1}{A_1^2}\right).$$

Equation 12.14 expresses differences in static pressure as a function of $Q^2$ and a coefficient with dimensions $$\frac{1}{A^2}.$$

It rearranges directly into an expression of Q in terms of pressure differences:

$$Q = \frac{\sqrt{\frac{2\Delta p}{\rho}}}{\sqrt{\frac{1}{A_2^2} - \frac{1}{A_1^2}}} \quad \text{(Equation 12.15)}$$

It is possible to redefine Equation 12.15 in terms of flow through a reference area $A_o$ and a dimensionless constant which we call $C_F$. Multiplying and dividing by $A_o$ in (12.15), we get $$= \frac{A_o\sqrt{\frac{2\Delta p}{\rho}}}{\sqrt{\left(\frac{A_o}{A_2}\right)^2 - \left(\frac{A_o}{A_1}\right)^2}} \equiv C_F A_o \sqrt{\frac{2\Delta p}{\rho}}, \quad \text{(Equation 12.16)}$$

$$C_F = \frac{1}{\sqrt{\left(\frac{A_o}{A_2}\right)^2 - \left(\frac{A_o}{A_1}\right)^2}} \quad \text{the Flow Coefficient}$$

According to some embodiments, Equation 12.16 is applicable to any inviscid system in which the same flow passes uniformly through at least 2 distinct areas $A_1$ and $A_2$.

$$\sqrt{\frac{2\Delta p}{\rho}}$$

has the dimensions of a velocity: multiplied by $A_o$, it can be thought of as the mean flow through that area. The physical system being modeled may not actually possess a section of area equal to the reference $A_o$, and in case $A_o$ does refer to a physical location in the system, the flow need not be uniform or even measurable there. $A_o$ may refer to one of the actual measurement areas $A_1$ or $A_2$; in the case next considered, it does not.

An orifice plate discharge coefficient is disclosed. Something like (Equation 12.16) can be widely used with a great variety of flow measuring devices, along with tables and graphs of the flow coefficient $C_F$, or the related discharge coefficient $C_d$. In families of devices in which the areas $A_1$ and $A_2$ may approach arbitrarily closely to each other, $C_F$ graphs may not be complete: $C_F = \infty$ if $A_1 = A_2$. For orifice plates, particularly in the US, a variant of (Equation 12.16) is developed in which the explosive behavior as $A_2 \to A_1$ has been factored out.

In an orifice plate tap arrangement according to embodiments of the present invention, the downstream tap can be located just downstream of the plate, where it measures still air at e.g. $SP_c$, the static pressure in the contracted stream. According to some embodiments, in still air, SP is constant, and by continuity of pressure, equals the constant pressure $P_c$ in the contracted stream. The upstream tap measures $SP_d$ in the undisturbed flow at a fixed distance upstream of the plate. $A_o$ is the area of the orifice itself. (Equation 12.16) becomes $$Q = \frac{A_o \sqrt{\frac{2\Delta p}{\rho}}}{\sqrt{\left(\frac{A_o}{A_c}\right)^2 - \left(\frac{A_o}{A_d}\right)^2}} = \quad \text{(Equation 12.17)}$$

$$C_F A_o \sqrt{\frac{2\Delta p}{\rho}} : C_F = \frac{1}{\sqrt{\left(\frac{A_o}{A_c}\right)^2 - \left(\frac{A_o}{A_d}\right)^2}}.$$

The variant is $$Q = \frac{C_d A_o}{\sqrt{1 - \left(\frac{A_o}{A_d}\right)^2}} \sqrt{\frac{2\Delta p}{\rho}} \quad \text{(Equation 12.18)}$$

which differs markedly from (Equation 12.17), and can be useful.

According to some embodiments, the measured Coefficient of Discharge $C_d$ varies little between $$\frac{A_o}{A_d} = 0$$

and 0.5, and by only about 10% on [0,1]. In some cases, it can arise from ignoring the Vena Contracta, so $$\left(\frac{A_o}{A_c}\right)^2$$

is replaced by 1 in (Equation 12.17), then bringing in $C_d$ as an adjustment factor. Comparing Equation 12.17 and Equation 12.18 we see $$C_d = \sqrt{\frac{1 - \left(\frac{A_o}{A_c}\right)^2}{\left(\frac{A_o}{A_c}\right)^2 - \left(\frac{A_o}{A_d}\right)^2}} \quad \text{(Equation 12.19)}$$

According to some embodiments, Equation 12.19 can resolve the coincidence of $C_d$ and $$\frac{A_c}{A_o}$$

values for small $$\frac{A_o}{A_d}.$$

Setting $$\frac{A_o}{A_d} = 0$$

gives $$C_d(0) = \sqrt{\frac{1}{\frac{A_o}{A_c}(0)^2}} = \frac{A_c}{A_o}(0).$$

According to some embodiments, Equation 12.19 can be nearly independent of $$\frac{A_o}{A_d}.$$

Assuming $$\frac{A_o}{A_c}$$

smooth, and noting $A_o = A_d$ means no orifice plate, so $A_c = A_d$ also, we find a removable singularity at $$\frac{A_o}{A_d} = 1: C_d(1) = \sqrt{\frac{0}{0}}$$

before $$1 - \frac{A_0}{A_d}$$

is factored out of numerator and denominator. According to some embodiments, it is possible to implement Weisbach's formula in Equation 12.19:

$$C_d = \sqrt{\frac{1-\left(\frac{A_o}{A_d}\right)^2}{\left(.62+.38\left(\frac{A_o}{A_d}\right)^3\right)^{-2}-\left(\frac{A_o}{A_d}\right)^2}} =$$

(Equation 12.20)

$$\left(.62+.38\left(\frac{A_o}{A_d}\right)^3\right)\sqrt{\frac{1-\left(\frac{A_o}{A_d}\right)^2}{1-\left(.62+.38\left(\frac{A_o}{A_d}\right)^3\right)^2\left(\frac{A_o}{A_d}\right)^2}} =$$

$$\left(.62+.38\left(\left(\frac{A_o}{A_d}\right)^3\right)\sqrt{\frac{1-\left(\frac{A_o}{A_d}\right)^2}{1-\left(.62\left(\frac{A_o}{A_d}\right)+.38\left(\frac{A_o}{A_d}\right)^4\right)^2}}\right.$$

The denominator is an $8^{th}$ degree polynomial which vanishes at $$\frac{A_o}{A_d} = 1.$$

In some cases, $$1 - \frac{A_o}{A_d}$$

(but not $$1 - \left(\frac{A_o}{A_d}\right)^2)$$

can be factored out of numerator and denominator, leaving $$1 + \left(\frac{A_o}{A_d}\right)$$

divided by a seventh degree polynomial. Equation 12.20 sags from 0.62 at $$\frac{A_o}{A_d} = 0$$

to 0.61 at 0.4 then works its way up to over 0.68 at 1. Since $C_d$ is considered a slowly and steadily increasing fraction of $$\frac{A_o}{A_d},$$

this would seem to eliminate Weisbach's formula for $$\frac{A_c}{A_o},$$

although it does demonstrate weak dependence of $C_d$ on $$\frac{A_o}{A_d}.$$

Looking again at Equation 12.19, we see that if $$\frac{A_o}{A_c}$$

were a polynomial in $$\left(\frac{A_o}{A_d}\right)^2,$$

equal to 1 at $$\frac{A_o}{A_d} = 1,$$

then $$1 - \left(\frac{A_o}{A_d}\right)^2$$

could factor out of $$\left(\frac{A_o}{A_c}\right)^2 - \left(\frac{A_o}{A_d}\right)^2.$$

The unique $1^{st}$ degree polynomial in $$\left(\frac{A_o}{A_d}\right)^2$$

satisfying these requirements and $$\frac{A_c}{A_o}(0) = c;$$

e.g. c=0.62 (Weisbach), c=0.611 (Kirchoff 1869: infinite slot; 2-d conformal mapping), is $$\frac{1}{c} - \left(\frac{1}{c}-1\right)\left(\frac{A_o}{A_d}\right)^2, \text{ or}$$

$$\frac{A_c}{A_o} = \frac{c}{1-(1-c)\left(\frac{A_o}{A_d}\right)^2}$$

(Equation 12.21)

With c=0.62, $$A_c/A_o = \frac{.62}{1-.38\left(\frac{A_o}{A_d}\right)^2}$$

lies within a few percent above Weisbach's $$.62 + .38\left(\frac{A_o}{A_d}\right)^3:$$

in fact the c=0.60 and c=0.62 curves tightly bracket Weisbach's. Equation 12.21 is of the same complexity as Weisbach's (Equation 12.11), which is similarly adjustable for $$\frac{A_c}{A_o}(0) = c : viz \cdot c + (1-c)\left(\frac{A_o}{A_d}\right)^3.$$

Substitution of Equation 12.21 into Equation 12.19 gives $$C_d = \frac{c}{\sqrt{1-(1-c)^2\left(\frac{A_o}{A_d}\right)^2}} \quad \text{(Equation 12.22)}$$

The square on the (1−c) factor: ((1−0.62)²=0.1444) together with the square root ($\sqrt{1.1444} \approx 1.07$), combine to create gently increasing curves compared to the Equation 12.21; increasing only 7% at 1.

According to some embodiments, the theoretical (e.g. Equation 12.17) and the practical US standard (Equation 18) are not irreconcilably incompatible and a link has been forged. In the process, it has been found that the functions $$\frac{A_c}{A_o} = \frac{c}{1-(1-c)\left(\frac{A_o}{A_d}\right)^2} \quad \text{(Equation 12.21)}$$

and $$C_d = \frac{c}{\sqrt{1-(1-c)^2\left(\frac{A_o}{A_d}\right)^2}} \quad \text{(Equation 12.22)}$$

can facilitate development of low flow fluid controller systems and methods as disclosed herein.

According to some embodiments, $$\left(\frac{A_o}{A_d}\right)^2 = \beta^4.$$

In some cases, $$\sqrt{\frac{2}{\rho}}$$

is about 4005 f.p.m/√(in. wg.) in English units.

An orifice plate coefficient is disclosed. According to some embodiments, it is possible to use the term "discharge coefficient" in connection with Equation 12.18, and/or in the combination $$\frac{C_d}{\sqrt{1-\left(\frac{A_o}{A_d}\right)^2}} \text{ to form the more general } C_F.$$

In some cases, the term "low coefficient" can be used for the coefficient $C_F$ in Equation 12.16, $$\frac{C_d}{\sqrt{1-\left(\frac{A_o}{A_d}\right)^2}}$$

being available as a replacement in cases in which $C_F$ blows up for $$\frac{A_o}{A_d} \to 1.$$

In some instances, $C_F$ does blow up, and can be replaced by $$\frac{C_d}{\sqrt{1-\left(\frac{A_o}{A_d}\right)^2}},$$

particularly some US cases, for example in a standard tap setup. The static pressure can become the same upstream and downstream as $$\frac{A_o}{A_d} \to 1$$

and the plate disappears, so the above denominator→0.

If $$\frac{A_o}{A_d}$$

is not ≈1, and the upstream face of the orifice plate meets the duct wall cleanly at 90° that corner is a stagnation point or circle. In some cases, v=0 right there, so TP=SP and a sufficiently small tap at that point will read TP. Or, a Pitot tube can be used in the undisturbed upstream flow. Either way, it is possible to get $$\Delta P = TP - \left(TP - \rho\frac{v_c^2}{2}\right) = \rho\frac{v_c^2}{2} = \frac{\rho}{2}\left(\frac{Q}{A_c}\right)^2, \quad \text{(Equation 12.23a)}$$

so $$Q = A_c\sqrt{\frac{2\Delta P}{\rho}} = \left(\frac{A_c}{A_o}\right)A_o\sqrt{\frac{2\Delta P}{\rho}}. \quad \text{(Equation 12.23b)}$$

Comparing Equation 12.16:

$$C_F = \frac{A_c}{A_o}$$

According to some embodiments, the contraction coefficient, which is discussed herein, can be referred to or analogous with as the flow coefficient. In some embodiments, not only does $C_F$ not blow up; it does not exceed 1. In some cases, with amplifying downstream tap, the maximum drops even lower (higher magnification).

A useful embodiment is disclosed: upstream TP tap, so $$C_F = \frac{A_c}{A_o} = \frac{c}{1-(1-c)\left(\frac{A_o}{A_d}\right)^2}, \frac{A_o}{A_d}$$

as described elsewhere herein. When static upstream taps are used or mandated, it is possible to use the Equation 12.22 with Equation 12.18, or Equation 12.21 with Equation 12.17.

When Pitot tubes are ruled out or not used, for example if the fluid contains particulates which would eventually block a pitot tube, it is possible to proceed without using static upstream taps. An orifice ring, or for example an orifice plate with $$\frac{A_o}{A_d} \sim .8 \text{ or } .9,$$

installed upstream of the low flow fluid controller, affords an upstream stagnation circle from which TP may be tapped. In some cases, there is even a small magnification effect just downstream, close in to the ring.

According to some embodiments, the butterfly damper can be viewed as a variable orifice plate with projected open area $A_o = A_{duct} - A_{damper} \cdot \cos(\theta)$. In some embodiments, a positive seal is possible using an annular seat, either very precisely machined or with a gasket working in compression.

According to some embodiments, a two-stage damper can overcome certain limitations of a butterfly damper as a flow measuring device. The Vena Contracta of the inner disk is controlled, not by the area projected normal to the duct as in the butterfly damper, but by the projection of the inner annulus opening $A_o$ normal of the faces of the annulus and opening disk itself. $A_o = A_{disk} \sin \theta$ (not cos). Opening the disk and annulus in sequence, it is possible to get:

$$A_o \approx A_{duct} \sin \theta_{disk} + (A_{duct} - A_{disk})(1 - \cos \theta_{annulus}) \quad \text{(Equation 12.24)}$$

According to some embodiments, as with the annulus, the first few degrees of disk opening are concerned with initial gasket decompression. After that, it is possible to get a delayed $\sin(\theta - \theta_o)$ curve. Gasket set and relaxation may not substantially affect this curve, which can be controlled by flow along the disk face and annulus face. In some cases, full gasket decompression may not occur simultaneously at all points around the disk. The point farthest from the shaft may decompress fully at 2°, say; then the opening appears in the shape of a widening smile as the disk opens. In some cases, this actually affects the curve very little, but accounting for it may impact the flow coefficient formula.

At 100% open, the open area may not be quite 100%. The shaft and, if used, annular gasket can remain as obstructions in an otherwise clear flow field. These account for nearly the entire pressure drop at 100% open, and can be modeled in the formula. These are assembled in accord with the implementation to give the appropriate flow coefficient as function of % open. In certain implementations, readings are obtained from a TP sensor upstream of the damper and a downstream SP tap in specified amplifying locations tight to the back of the annulus, slightly depressing the curve. In some cases, lower flow coefficient represent higher magnification. Since between for example 2% and 10% the flow coefficient can increase linearly from 0 (e.g. if no leakage), the maximum magnification is theoretically infinite, subject to practical considerations of actuator consistency at setting and defining angular position.

According to some embodiments, theoretical expressions can be useful in the design phase. In some cases, a table of measured flow coefficients vs % open rather than the theoretical formula can be provided for each low flow fluid controller-based product and configuration, for example based on the upstream sensor being used. If an actuator with significant hysteresis is mandated or used, in some cases a single table will not be used unless the hysteresis is uniform and predictable, so that actual damper position can be calculated based on usage. In some cases, it is possible to use an actuator without significant hysteresis.

Measurement at very low Reynolds numbers is disclosed. Many commonly used flow and fitting loss coefficient values are valid only at sufficiently high Reynolds Numbers. In some cases, it is possible to build in, for each product configuration, markers indicating when aspects of the system are operating outside of the high Reynolds-constant coefficient regime. Control can extend well into this low-Reynolds regime. In some cases, display accuracy may be affected. In some cases, the boundary occurs at around 20 CFM.

In applications where accurate readout is required or desired into this very low flow regime, a low flow coefficient table (which may be larger) that is dependent not only on damper setting, but also on the low Reynolds number as well, can provide this extension.

In some embodiments, it is possible to use two ganged actuators driving concentric shafts, and it is also possible to use isolated actuators at each end of the damper shaft. A single actuator with two-stage concentric output can also be used.

In some cases, it may be difficult for a flow sensing device to give an accurate measure of total flow in the presence of a severely disturbed flow profile. In some cases, manufacturers may recommend, but seldom get, about 5 diameters of straight duct upstream of a sensor. According to some embodiments, for example for tight installations, it is possible to provide and calibrate for profile-preserving elbows for installation immediately upstream of the sensor/damper.

Legacy VAV boxes can require ~2000 FPM or more maximum entry velocity in order to achieve turndowns of even 3 or 4. Since downstream devices require more like 700 FPM, this high velocity air is then dumped, and can require extensive silencing to reduce the familiar rumble issuing from the ceiling. Low flow fluid controllers according to embodiments of the present invention can provide 40:1 turn-down from 1200 FPM, using a ordinary 1" w.g. transducer. To take advantage of the 4:1 energy savings and 25 dB. noise reduction provided by such designs, in some embodiments the final splits in the upstream duct work can be designed to deliver 1200 FPM full flow, not 2000 or 2500 FPM, to the low flow fluid controller at the end of the run, for example.

In some instances, sensors can be very sensitive to environmental temperature. When realizing the low flow capabilities of the sensor/damper as disclosed herein, it may be useful to to provide automatic means to periodically tie the sensor inputs together to a common source and update zero-offset.

According to some embodiments, to obtain energy savings and terminal (as well as central) noise reduction made possible by the low flow fluid controller, system pressure control can be based on keeping the neediest low flow fluid controller in each control cycle at the lower edge of its local control range. Optionally, ad-hoc tuning of the central control algorithm may be implemented to achieve stable and timely control.

Annulus opening characteristics are disclosed. Butterfly dampers are not commonly made with diameter exactly equal to duct diameter. In some cases, extreme accuracy and rigidity may be required to prevent such an arrangement from jamming on the one hand or leaking on the other. The situation appears to ease somewhat under slight elliptical elongation of the damper, so it closes a degree of two shy of perpendicular to the duct. The above-mentioned difficulties still apply, however and this easement is seldom seen. According to some embodiments, an arrangement can employ dampers with diameter slightly larger than duct diameter, but with the outermost few percent made of a flexible gasket material that bends and or compresses to seal against the duct surface. A simple projected area formula of the form $$A_{damper} = \text{MAX}(A_{duct} - A_{damper} \cos \theta_{damper}, 0) \quad \text{(Equation 12.25)}$$

can provide excellent agreement with experiment. In some cases, an annular duct-mounted gasket working purely in compression can remove concerns that gasket abrasion and set may eventually compromise damper seal in arrangements such as those described above. The flow picture can be complicated by flow squeezing between the opening damper and just-cleared gasket. The effect can be negligible in the two-stage damper, where the open area is denominated by the wide open (or nearly so, depending on possible staging overlap) inner disc. For completeness it is possible to describe development of the controlling formula. The gasket can be is compressed when $\varphi=0$, and expands with the damper until it reaches its uncompressed extension and begins to open, starting at plane angle $$\psi = \frac{\pi}{2}.$$

At general angle $\psi$ the normal from point $P_{gasket} = (r_g \cos \psi, r_g \sin \psi, \in)$ (in Cartesian coordinates) to the point $P_{damper} = (r_g \cos \psi, \cos \varphi (r_g \sin \psi + \in \sin \varphi), \sin \varphi (r_g \sin \psi + \in \sin \varphi))$ has length $\delta = r_g \sin \psi \sin \varphi - \in \cos \varphi$. The gasket opening area differential is $$dA_g = \delta \left| \frac{d}{d\psi} \left( \frac{P_{damper} + P_{gasket}}{2} \right) \right| d\psi$$

$$= (r_g \sin\psi \sin\varphi - \epsilon\cos\varphi) * r_g \sqrt{1 - \frac{3}{4}\cos^2\psi \sin^2\varphi} \, d\psi,$$

which separates into a term that integrates readily and an elliptic integral of the second kind, which can be suitably approximated. $dA_g$ is the differential area of flow squeezing through narrow space between the annular gasket and plate: where the damper is farther from the gasket than the duct wall we pass to the differential form of (e.g. Equation 12.22);

$$dA_w = \int_{r_a}^{r_d} \frac{r \, dr \, d\psi}{\sqrt{1 + \sin^2\psi \tan^2\psi}} \quad \text{(Equation 12.26)}$$

$$= \frac{1}{2}\left(r_d^2 - \frac{r_a^2}{1 + \sin^2\psi \tan^2\psi}\right) d\psi$$

At the crossover point $dA_g = dA_w$, $\sin(\psi)$ satisfies a fourth degree algebraic equation, which, for sufficiently large $\varphi$, has two positive roots. We can call the smaller of these, when they exist, $\psi_1$. Otherwise $$\psi_1 = \frac{\pi}{2}.$$

The annulus open area is then $$A_{annulus} = 4 \int_{\psi_o}^{\psi_1} dA_g + 4 \int_{\psi_1}^{\frac{\pi}{2}} dA_w. \quad \text{(Equation 12.27)}$$

$$\psi_0 = A\sin\left(\frac{\epsilon}{r_g \tan\varphi}\right)$$

is the angle at which, for given damper opening angle $\varphi$, the damper just clears the gasket. Nothing may happen until $$\geq \varphi_o = a\tan\left(\frac{\epsilon}{r_g}\right),$$

the damper angle at which the tip $$\left(\psi = \frac{\pi}{2}\right)$$

of the annulus just clears the gasket. The opening sequence is:

$$A = 0: \psi_o = \psi_1 = \frac{\pi}{2}$$

until $\varphi \geq \varphi \approx 2.2°$, $\approx 1.24\%$ of the full 2 stage sequence, and $\psi_o$ drops below $$\frac{\pi}{2}.$$

At around 3°, 1.7% of range, $\psi_1$ drops below $$\frac{\pi}{2}. \quad \psi_1 \text{ and } \psi_o \to 0 \text{ as } \varphi \to \frac{\pi}{2}.$$

The annular gaskets end at around $\psi=4°$, where they meet the damper bushings at the duct wall. The bushings together with the shaft between act as small obstruction, not limiting the effective area of opening but providing a small contribution to the wide open damper $\Delta P$. Letting $\psi_1$ and $\psi_o \to 0$ allows these losses to be treated separately from the orifice plate opening characteristic.

Disk opening characteristics are disclosed. In some cases, the central disk slightly overlaps the annulus opening, which is often but not necessarily circular. The overlap region is provided with compressible gasket material, embedded in either or both the annulus and/or disk. The normal distance from the point $P_{ann}=(x,y,s)$, $x^2+y^2=r^2$, on the opening near edge to the disk surface is $\delta = y \sin\theta - s\cos\theta - t$, with $\theta$ the disk opening angle relative to the annulus, s half the annulus thickness, and t half the disk thickness. The projected opening area is $$A_{disk} = 4\int_0^{r_o} \text{MAX}(\delta, 0)\,dx \quad \text{(Equation 12.28)}$$

$$= 4\int_0^{r_o} \text{MAX}(\sqrt{r^2-x^2}\sin\theta - s\cos\theta - t, 0)\,dx$$

$$= 2\left[r^2 a\sin\left(\frac{x_o}{r}\right) - x_o(s\cos\theta + t)\right],$$

with $$x_o = \sqrt{\text{MAX}\left(r^2 - \left(\frac{s\cos\theta+t}{\sin\theta}\right)^2, 0\right)}$$

The disk clears the gasket for $x<x_o$. $x_o>0$ when $\theta \geq \theta_o$, the angle at which the tip of the disk just clears the gasket. $\theta_0$ satisfies $r\sin\theta_0 = s\cos\theta_0 + t$. If $t \ll s$, this becomes $$\theta_o = a\tan\frac{s}{r};$$

if $s \ll t$, $$\theta_o = a\sin\frac{t}{r}.$$

The open area of the 2-stage flow station/damper is then $$A_o = A_{disk} + A_{annulus} \quad \text{(Equation 12.29)}$$

The device functions as a variable area orifice plate almost over its entire range. Until the device is almost 100% open, a common pool of still or mostly still air in the shadow of the damper unites the venae contractae of flows emerging from (in this case) up to four separate areas of varying shape and orientation, so that various areas are simply added together, as was done in Equation 12.29, to produce $A_o$ for use in the formula $$C_F = \frac{A_c}{A_o} \quad \text{(Equation 12.21)}$$

$$= \frac{c}{1-(1-c)\left(\frac{A_o}{A_d}\right)^2}$$

$A_d$ is the total duct area. C=0.611 gives Kirchoff's 1869 result asymptotically.

Residual effects at 100% open are disclosed. At 100% open, there is no orifice plate, and $C_F$ is nearly 1, assuming the upstream tap reads TP. The downstream tap, out of the airstream tucked in behind, which may be integral with the damper shaft, can read a little lower than surrounding SP because the flow is moving slightly faster around the obstructing shaft, and SP+VP is conserved. It is possible to combine this effect together with residual pressure drops due to the upstream sensor, wall friction, and annular gasket (if employed) into a constant $C_o$, and replace (23a) by $$\Delta P = TP - \left(TP - \frac{\rho}{2}\left(\frac{Q}{A_c}\right)^2 - C_o\frac{\rho}{2}\left(\frac{Q}{A_d}\right)^2\right) \quad \text{(Equation 12.30a)}$$

$$= \rho\frac{Q^2}{2}\left(\frac{1}{A_c^2} + \frac{C_o}{A_d^2}\right), \text{ or}$$

$$Q = \frac{A_o\sqrt{\frac{2\Delta\rho}{\rho}}}{\sqrt{\left(\frac{A_o}{A_c}\right)^2 + C_o\left(\frac{A_o}{A_d}\right)^2}} \quad \text{(Equation 12.30b)}$$

so $C_F$ becomes $$\frac{\frac{A_o}{A_c}}{\sqrt{1 + C_o\left(\frac{A_c}{A_o}\right)^2\left(\frac{A_o}{A_d}\right)^2}} \quad \text{(Equation 12.30c)}$$

$C_o$ can be measured individually in each configuration for incorporation into (Equation 12.30c). This, with $$\frac{A_c}{A_o} = \frac{c}{1-(1-c)\frac{A_o}{A_d}}(21)(c \sim .61), \text{ and } \frac{A_o}{A_d}$$

from (Equation 12.29), comprises a theoretical foundation for the fluid station control/measurement device.

Embodiments of the present invention provide accurate flow measurement devices and methods. For example, such techniques can allow for control of fans which automatically saves 30 percent of energy in a building and it substantially cuts part numbers and skews as one device has such a broad measuring range. By measuring accurately at such a long range makes it more efficient to control flow. In addition when only 20 cfm of outside air is required in a zone the device can meter in exactly 20 cfm of outside air. Currently known VAV boxes cannot measure down that low due the minimum it could bring in would be 300 cfm which means 280 cfm per zone needs to be re heated or re cooled thus operating the chillers and the boilers. Additional energy savings and better occupancy comfort are achieved.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Any of the modules or components of system 1200, or any combinations of such modules or components, can be coupled with, or integrated into, or otherwise configured to be in connectivity with, any of the fluid flow control embodiments disclosed herein. Relatedly, any of the hardware and software components discussed herein can be integrated with or configured to interface with other flow control systems used in a single location or across multiple locations.

Each of the calculations or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A flow device for a fluid flow along a flow pathway extending at least in part along a flow axis parallel to disposed within an inward facing wall, comprising:
   A. an orifice plate positioned within the flow pathway and defining a variable opening for receiving fluid flow along the flow pathway, wherein the orifice plate comprises:
      i. an outer damper assembly comprising an outer damper plate extending about an outer plate central axis to an outer plate perimeter with at least a portion matching in shape a corresponding portion of the inward facing wall, and including an outer plate opening passing therethrough, wherein the outer damper plate is adapted for pivotal motion at angle $\phi$ about an outer damper axis that extends across the outer damper plate and transverse to the flow pathway from a closed position wherein $\phi=0$ whereby the matching portions of the outer plate perimeter and inward facing wall are adjacent, thereby blocking fluid flow past a periphery of the outer damper plate along the flow pathway, to an open position angularly offset therefrom; and
      ii. an inner damper assembly comprising an inner damper plate extending about an inner plate central axis to an inner plate perimeter with at least a portion matching in shape to a corresponding portion of the outer plate opening and coupled to the outer damper plate at the outer plate opening, wherein the inner damper plate is adapted for pivotal motion at angle $\theta$ with respect to the outer damper plate about an inner damper axis that extends across the inner damper plate and transverse to the flow pathway from a closed position wherein $\theta=0$ whereby the matching portions of the inner plate perimeter and outer plate opening are adjacent, thereby blocking fluid flow between the inner damper plate and the outer damper plate, to an open position angularly offset therefrom;
   B. an actuator assembly operatively connected with the orifice plate, including:
      i. a first actuator coupled to the outer damper plate and adapted to effect direct actuator-driven pivotal motion of the outer damper plate, and
      ii. a second actuator coupled to the inner damper plate and adapted to effect direct actuator-driven pivotal motion of the inner damper plate,
      wherein the actuator assembly is adapted to effect independent pivotal motion of the inner damper plate and pivotal motion of the outer damper plate thereby effecting independent control of $\phi$ and $\theta$ over all $\phi$ and $\theta$, and
   C. a controller in operative communication with the orifice plate, wherein the controller comprises:
      i. a processor; and
      ii. a memory communicatively coupled with and readable by the processor and having stored therein processor-readable instructions that, when executed by the processor, cause the processor to:
         a. determine a pressure differential in the flow pathway across the orifice plate;
         b. determine a position of the outer damper plate and the inner damper plate based on a position feedback received from the actuator assembly; and c. regulate the variable opening based on the determined pressure differential and the position of the outer damper plate and the inner damper plate;

whereby, when starting from θ=0 and φ=0 and initially increasing θ followed by increasing φ, a coefficient for fluid flow past the outer damper plate and the inner damper plate, is a function of sin θ and 1−cos φ, and wherein the processor is responsive to the position feedback and the pressure differential, to regulate the variable opening over time in a closed loop manner whereby a set point is attained.

2. The flow device of claim 1, wherein the inner damper plate and the outer plate opening of the outer damper plate are offset with respect to the central axis.

3. The flow device of claim 1, wherein at least one of the inner damper plate and the outer damper plate defines a shape selected from a group consisting of a circle, a half circle, a triangle, a diamond, a trapezoid, a rectangle, an ellipse, a sphere, a half sphere, and a quarter sphere.

4. The flow device of claim 1, further comprising a gasket disposed on a duct and configured to compress and seal against the outer damper plate.

5. The flow device of claim 1, wherein the inner damper plate and the outer damper plate overlap to define an overlap region, and wherein the overlap region comprises a compressible gasket embedded on at least one of the inner damper plate and the outer damper plate.

6. The flow device of claim 1, further comprising a gasket that provides a positive pressure seal of at least two members from a group consisting of an air valve stop, the inner damper plate, and the outer damper plate.

7. The flow device of claim 1, further including a regain section defined by a tear drop nacelle defining at least a portion of the flow pathway downstream of the orifice plate, wherein the tear drop nacelle reduces losses from increased velocity venturi or Bernoulli effects imparted on the fluid flow upstream of the tear drop nacelle.

8. The flow device of claim 1, further comprising a hollow outer shaft extending from the outer damper plate and an inner shaft extending from the inner damper plate through the hollow outer shaft, wherein the inner shaft and the outer shaft are operatively connected with the actuator assembly.

9. The flow device of claim 8, wherein the actuator assembly comprises a first actuator operatively coupled to the hollow outer shaft and a second actuator operatively coupled to the inner shaft.

10. The flow device of claim 9, wherein the first actuator and the second actuator are collinear and ganged together to enable measurability and controllability over a defined flow range.

11. The flow device of claim 9, wherein the first actuator and the second actuator are mounted in parallel.

12. The flow device of claim 8, wherein the actuator assembly comprises an actuator having a gearing with dual concentric output to pivot the inner damper plate and the outer damper plate relative to one another, and wherein the gearing comprises an inner track operatively coupled with the inner shaft and an outer track operatively coupled with the hollow outer shaft.

13. The flow device of claim 1,
A. wherein the outer damper plate is adapted for pivotal motion between a first position and a second position angularly displaced from the first position, and wherein in the first position, the outer damper plate extends across and forms a fluidic seal with a duct, and B. wherein the inner damper plate is adapted for pivotal motion between a third position and a fourth position angularly displaced from the third position, and wherein in the third position the inner damper plate extends across the outer plate opening and forms a fluidic seal with the outer damper plate.

14. The flow device of claim 1 further comprising a fluid flow pathway section that splits a single fluid stream of the flow pathway into multiple fluid stream pathways.

15. The flow device of claim 1, further comprising a gasket disposed on at least one of the inner damper plate and the outer damper plate at a region where the inner damper plate and the outer damper plate overlap when the inner damper plate is in the first position.

16. The flow device of claim 1, further comprising a gasket disposed at an outer peripheral edge of the outer damper plate.

17. The flow device of claim 1, further comprising:
A. a first pressure sensor in communication with the flow pathway upstream of the orifice plate; and
B. a second pressure sensor in communication with the flow pathway downstream of the orifice plate.

18. The flow device of claim 1, further comprising a total pressure (TP) upstream sensor disposed along the flow pathway upstream of the orifice plate and a static pressure (SP) downstream sensor disposed along the flow pathway downstream of the orifice plate,
wherein the TP upstream sensor is adapted to provide, for a fluid passing along the flow pathway, a signal $TP_{upstream}$ representative of the total pressure of the fluid at the TP upstream sensor, and
wherein the SP downstream sensor is adapted to provide, for a fluid passing along the flow pathway, a signal $SP_{downstream}$ representative of the static pressure of the fluid at the SP downstream sensor, and
wherein the processor is operatively coupled to the TP upstream sensor and the SP downstream sensor to determine the pressure differential, and wherein the coefficient is a flow coefficient $C_F$.

19. The flow device of claim 18, wherein the processor is further operative to determine $C_F$ in accordance with $C_F = A_c/A_o$ wherein $A_c$ is a total cross-section area normal to fluid flow of vena contractae of a fluid passing through the variable opening, and $A_o$ is the representative of a total cross-section area normal to fluid flow through the variable opening.

20. The flow device of claim 19, wherein $A_d$ is the cross section area normal to fluid flow of the entire flow pathway, and $A_c/A_o = 0.61/[1-0.39(A_o/A_d)^2]$.

21. The flow device of claim 18, wherein the processor is further operative to determine a flow rate Q of a fluid passing through the variable opening.

22. The flow device of claim 21 wherein the processor is further operative to determine Q in accordance with $Q = C_F A_o \sqrt{[2(TP_{upstream} - SP_{downstream})/\rho]}$, wherein ρ is representative of density of the fluid.

23. The flow device of claim 1, further comprising
a static pressure (SP) upstream sensor disposed along the flow pathway upstream of the orifice plate and a static pressure (SP) downstream sensor disposed along the flow pathway downstream of the orifice plate,
wherein the SP upstream sensor is adapted to provide, for a fluid passing along the flow pathway, a signal $SP_{upstream}$ representative of the static pressure of the fluid at the SP upstream sensor, and
wherein the SP downstream sensor is adapted to provide, for a fluid passing along the flow pathway, a signal $SP_{downstream}$ representative of the static pressure of the fluid at the SP downstream sensor, and wherein the processor is operatively coupled to the SP upstream sensor and the SP downstream sensor to determine the pressure differential, and wherein the coefficient is a discharge coefficient $C_D$.

24. The flow device of claim 23, wherein the processor is further operative to determine a flow rate Q of a fluid passing through the variable opening.

25. The flow device of claim 24, wherein the processor is further operative to determine $C_D$ in accordance with $C_D = c/\sqrt{[1-(1-c)^2(A_o/A_d)^2]}$ wherein $c=0.61$, $A_o$ is representative of a total cross-section area normal to fluid flow through the variable opening, and $A_d$ is representative of a cross-section area normal to fluid flow through the entire flow pathway.

26. The flow device of claim 25 wherein the processor is further operative to determine Q in accordance with $Q = C_D A_o \sqrt{[2(SP_{upstream} - SP_{downstream})/\rho/\sqrt{[1-(A_o/A_d)^2]}}$, wherein $A_o$ is representative of a total cross-section area normal to fluid flow through the variable opening, and $\rho$ is representative of density of the fluid.

27. The flow device of claim 1, wherein the first actuator and the second actuator are operatively coupled to the outer damper plate and inner damper plate respectively throughout the operative ranges of motion of the first damper plate and the second damper plate.

* * * * *